United States Patent
Connell et al.

(10) Patent No.: US 6,841,652 B2
(45) Date of Patent: Jan. 11, 2005

(54) SPACE ENVIRONMENTALLY DURABLE POLYIMIDES AND COPOLYIMIDES

(75) Inventors: John W. Connell, Yorktown, VA (US); Joseph G. Smith, Jr., Smithfield, VA (US); Paul M. Hergenrother, Yorktown, VA (US); Kent A. Watson, New Kent, VA (US); Craig M. Thompson, Newport News, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 10/095,340

(22) Filed: Mar. 8, 2002

(65) Prior Publication Data

US 2003/0045670 A1 Mar. 6, 2003

Related U.S. Application Data

(60) Provisional application No. 60/292,262, filed on May 17, 2001.

(51) Int. Cl.$^7$ ......................... C08G 69/26; C08G 69/72
(52) U.S. Cl. ....................... 528/337; 528/335; 528/338; 528/339.3
(58) Field of Search ................................ 528/335, 337, 528/338, 339.3

(56) References Cited

U.S. PATENT DOCUMENTS

| | | |
|---|---|---|
| 3,933,745 A | 1/1976 | Bargain |
| 3,948,835 A | 4/1976 | Greber et al. |
| 3,950,308 A | 4/1976 | Greber et al. |
| 3,970,714 A | 7/1976 | Bargain |
| 3,996,203 A | 12/1976 | Hand et al. |
| 4,012,361 A | 3/1977 | Bargain |
| 4,064,192 A | 12/1977 | Bargain |
| 4,088,670 A | 5/1978 | Bargain et al. |
| 4,118,377 A | 10/1978 | Snyder |
| 4,147,711 A | 4/1979 | Bargain et al. |
| 4,213,914 A | 7/1980 | Bargain et al. |
| 4,275,184 A | 6/1981 | Bargain et al. |
| 4,595,548 A | 6/1986 | St. Clair et al. |
| 4,603,061 A | 7/1986 | St. Clair et al. |
| 4,963,635 A | 10/1990 | Kunimune et al. |
| 4,963,649 A | 10/1990 | Wright et al. |
| 5,055,549 A | 10/1991 | Maeda et al. |
| 5,073,607 A | 12/1991 | Katz |
| 5,084,304 A | 1/1992 | Lienert et al. |
| 5,101,037 A | 3/1992 | McGrath et al. |
| 5,112,942 A | 5/1992 | Blocker |
| 5,145,937 A | 9/1992 | Hergenrother et al. |
| 5,298,359 A | 3/1994 | Maeda et al. |
| 5,320,935 A | 6/1994 | Maeda et al. |
| 5,420,225 A | 5/1995 | Gungor et al. |
| 5,700,860 A | 12/1997 | Nishikawa et al. |
| 5,969,055 A | 10/1999 | Nishikawa et al. |
| 6,214,923 B1 | 4/2001 | Goto et al. |
| 6,224,788 B1 | 5/2001 | Ogawa et al. |
| 6,333,391 B1 | 12/2001 | Laycock et al. |
| 6,342,638 B1 | 1/2002 | Yoon et al. |

OTHER PUBLICATIONS

Chemical Abstracts 137: 64081, 2001 Watson, Kent A.; Smith, Joseph G., Jr.: & Connell, John W., "Polyimide/Carbon Nanotube Composite Films for Potential Space Applications," Journal, Society for the Advancement of Material & Process Engineering.

CA 78: 72639, 1972, Katsarava, R.D., Korshak, V.V.; Rusanov, A.L.; Kolesnikov, G.S.; Fedotova, O. Ya.; Paresishvili, O.I., "Synthesis and Investigation of Poly(benzoylenebenzimadazoles) Based on the Dianhydride of bis(3, 4–dicarboxyphenyl) Penylphosphine Oxide and Some Aromatic Tetraamines," Journal.

CA 136: 280340, 2001, Jeong, K.U.; Jo, Y.J.; Yoon, T.H., "Adhesion Property of Novel Polyimides Containing Fluorine and Phosphine Oxide Moieties," Journal, VSP BV.

W. Weber and M. Gupta, eds., Society of Plastics Engineers, Poughkeepsie, NY 1987, pp. 16–36.

A. K. St. Clair and W. S. Slemp, SAMPE Technical Conference Proceedings, 23, 1991.

I. K. Varma, G. M. Fohlen and J. A. Parker, Journal of Macromolecular Science–Chemistry, A19(2), 209 (1983).

I. K. Varma and B. S. Rao, Journal of Applied Polymer Science, 28, 2805 (1983).

I. K. Varma, G. M. Fohlen and J. A. Parker Journal of Polymer Science, Polymer Chemistry Edition, 28, 2017 (1983).

P. M. Hergenrother and S. J. Havens, Journal of Polymer Science, Polymer Chemistry Edition, 27, 1161 (1987).

C. D. Smith, H. F. Webster, A. Gungor, J. P. Wightman and J. E. McGrath, High Performance Polymers, 3(4), 211 (1991).

(List continued on next page.)

*Primary Examiner*—D. Margaret Seaman
(74) *Attorney, Agent, or Firm*—Robin W. Edwards

(57) ABSTRACT

Polyimides displaying low color in thin films, atomic oxygen resistance, vacuum ultraviolet radiation resistance, solubility in organic solvents in the imide form, high glass transition ($T_g$) temperatures, and high thermal stability are provided. The poly(amide acid)s, copoly(amide acid)s, polyimides and copolyimides are prepared by the reaction of stoichiometric ratios of an aromatic dianhydride with diamines which contain phenylphosphine oxide groups in polar aprotic solvents. Controlled molecular weight oligomeric (amide acid)s and imides can be prepared by offsetting the stoichiometry according to the Carothers equation using excess diamine and endcapping with aromatic anhydrides. The polyimide materials can be processed into various material forms such as thin films, fibers, foams, threads, adhesive film, coatings, dry powders, and fiber coated prepreg, and uses include thin film membranes on antennas, second-surface mirrors, thermal optical coatings, and multilayer thermal insulation (MLI) blanket materials.

2 Claims, No Drawings

OTHER PUBLICATIONS

J. W. Connell, J. G. Smith, Jr. and P. M. Hergenrother, Journal of Fire Science, 11, 137 (1993).

J. G. Smith, Jr., J. W. Connell and P. M. Hergenrother, Polymer, 35, 2834 (1994).

(J. W. Connell, J. G. Smith, Jr. and P. M. Hergenrother, Polymer, 36, 5 (1995).

J. W. Connell, J. G. Smith, Jr. and P. M. Hergenrother, Polymer, 36, 13 (1995).

J. E. McGrath, H. Grubbs, M. E. Rogers, A. Gungor and W. A. Joseph, SAMPE Technical Conference Proceedings, 23, 119 (1991).

J. M. Wescott, T. Toon, L. Kiefer and J. E. McGrath, Polymer Preprints, 33(2), 235 (1992).

Y. N. Lin, S. Joardar and J. E. McGrath, Polymer Preprints, 34(1), 515 (1993).

US 6,841,652 B2

SPACE ENVIRONMENTALLY DURABLE POLYIMIDES AND COPOLYIMIDES

CLAIM OF BENEFIT OF APPLICATION

This application claims the benefit of U.S. provisional application Ser. No. 60/292,262, filed May 17, 2001.

ORIGIN OF INVENTION

This invention was jointly made by employees of the United States Government and the National Research Council and may be manufactured and used by or for the Government for government purposes without payment of any royalties thereon or therefore.

BACKGROUND OF THE INVENTION

Thin films from relatively high molecular weight aromatic polyimides generally exhibit toughness, flexibility, solvent resistance, high glass transition temperatures ($T_g$) and thermal stability. In many cases these materials, due to their aromatic structure exhibit good ultraviolet (UV) radiation resistance; however they also display significant color (D. Wilson, H. D. Stenzenberger and P. M. Hergenrother, "Polyimides", Blackie and Son, Glasgow and London, 1990). Kapton® polyimide film is a good example of the typical amber color exhibited by thin films. No commercially available polyimides are resistant to degradation by atomic oxygen exposure. The preparation of low color polyimides that are UV resistant has been reported (A. K. St. Clair, T. L. St. Clair and W. S. Slemp "Recent Advances in Polyimide Science and Technology, W. Weber and M. Gupta, eds., Society of Plastics Engineers, Poughkeepsie, N.Y. 1987, pp. 16–36; A. K. St. Clair and W. S. Slemp, *SAMPE Technical Conference Proceedings,* 23, 1991; U.S. Pat. Nos. 4,595,548 and 4,603,061 issued Jun. 17, 1986 and Jul. 29, 1986, respectively to National Aeronautics and Space Administration). However none of these polyimides are resistant to atomic oxygen or oxygen plasma degradation.

Some reports detail the preparation of polyimides which contain phenylphosphine oxide units in the polymer backbone (I. K. Varma, G. M. Fohlen and J. A. Parker, *Journal of Macromolecular Science-Chemistry,* A19(2), 209 (1983); I. K. Varma and B. S. Rao, *Journal of Applied Polymer Science,* 28, 2805 (1983); I. K. Varma, G. M. Fohlen and J. A. Parker *Journal of Polymer Science, Polymer Chemistry Edition,* 28, 2017 (1983); P. M. Hergenrother and S. J. Havens, *Journal of Polymer Science, Polymer Chemistry Edition,* 27, 1161 (1987); U.S. Pat. No. 5,145,937 issued 1992 to the National Aeronautics and Space Administration). Recent reports show that phosphine oxide containing poly(arylene ether)s exhibit atomic oxygen and oxygen plasma resistance [C. D. Smith, H. F. Webster, A. Gungor, J. P. Wightman and J. E. McGrath, *High Performance Polymers,* 3(4), 211 (1991); J. W. Connell, J. G. Smith, Jr. and P. M. Hergenrother, *Journal of Fire Science,* 11, 137 (1993); J. G. Smith, Jr., J. W. Connell and P. M. Hergenrother, *Polymer,* 35, 2834 (1994)]. This was extended to show that polyimides containing phosphine oxide groups were also atomic oxygen and oxygen plasma resistant [(J. W. Connell, J. G. Smith, Jr. and P. M. Hergenrother, *Polymer,* 36, 5 (1995); J. W. Connell, J. G. Smith, Jr. and P. M. Hergenrother, *Polymer,* 36, 13 (1995)]. Other polyimides containing phosphine oxide groups have been reported [J. E. McGrath, H. Grubbs, M. E. Rogers, A. Gungor and W. A. Joseph, *SAMPE Technical Conference Proceedings,* 23, 119 (1991); J. M. Wescott, T. Toon, L. Kiefer and J. E. McGrath, *Polymer Preprints,* 33(2), 235 (1992); Y. N. Lin, S. Joardar and J. E. McGrath, *Polymer Preprints,* 34(1), 515 (1993)]. However, in all of these reports, the polyimides containing phosphine oxide groups exhibited high color that ranged from orange to brown and consequently they exhibited poor optical transparency and relatively high solar absorptivities.

The present invention constitutes new compositions of matter, which exhibit unique and unexpected combinations of properties. It concerns new diamines and dianhydrides that contain phenylphosphine oxide groups and polyimides and copolyimides prepared therefrom. The polymers prepared from these aromatic diamines and aromatic dianhydrides exhibit an unexpected combination of properties that include low color in thin film form (1–2 mils thick), low solar absorptivity, high optical transparency, atomic oxygen resistance, vacuum UV radiation resistance, solubility in organic solvents in the imide form, high $T_g$, and high thermal stability. These compositions of matter are also useful as adhesives, coatings, films, fibers, foams, moldings, powders, prepregs and composite matrices.

SUMMARY OF THE INVENTION

Polyimides with a unique, heretofore unprecedented combination of properties have been prepared and characterized. The combination of properties includes low color in thin films, atomic oxygen resistance, vacuum ultraviolet radiation resistance, solubility in organic solvents in the imide form, high glass transition ($T_g$) temperatures and high thermal stability. These materials are based on aromatic diamines and aromatic dianhydrides that contain phenylphosphine oxide groups. Polyimides were prepared by reacting the compounds with appropriate aromatic monomers using a 1:1 stoichiometry. Poly(amide acid)s were prepared by reacting the monomers in polar aprotic solvents. The poly(amide acid) solutions were used to cast thin films and to prepare polyimides by heating the solution in the presence of an azeotropic agent or by treatment with a dehydrating agent and catalyst at room temperature. In some cases the polyimides were synthesized in m-cresol. Copoly (amide acid)s and copolyimides were prepared using these phenylphosphine oxide monomers as well. In many cases, soluble polyimides were obtained. The solubility of the materials in the imide form was dependent upon the polymer chemical structure. Thin films (1–2 mils thick) prepared by solution casting of amide acid or imide solutions exhibited very low color as evidenced by visual observation and measurement of solar absorptivity as well as high optical transparency (>85%). The polyimides exhibited $T_g$s>200° C. depending upon chemical structure. Due to their unique combination of properties, these polyimides are useful in a variety of applications on spacecraft in all orbits. Examples of the applications include thin film membranes on antennas, second-surface mirrors, thermal optical coatings, sunshades, various components of deployable spacecraft and multilayer thermal insulation (MLI) blanket materials. They can be processed into various material forms such as thin films, fibers, foams, threads, adhesive film, coatings, dry powders, and fiber coated prepreg.

DESCRIPTION OF THE PREFERRED EMBODIMENTS

According to the present invention, the objects of the invention herein described can be obtained by synthesizing aromatic diamines (Equations I–VII) and aromatic dianhydrides containing phenylphosphine oxide groups (Equations VIII and IX), as further discussed in detail in this section.

The present invention concerns new compositions of matter comprised of aromatic diamines and aromatic dianhydrides containing phenylphosphine oxide groups and polyimides and copolyimides prepared therefrom. These polyimides exhibit a unique and unprecedented combination of properties including low color in thin film form (1–2 mils thick), low solar absorptivity, high optical transparency, atomic oxygen resistance, vacuum ultraviolet (VUV) radiation resistance, solubility in organic solvents in the imide form, high $T_g$s, and high thermal stability. This combination of properties makes these materials particularly useful in the fabrication of space durable spacecraft components such as multi-layer thermal insulation blankets (MLIs), thermal control coatings, sewing threads, adhesive tape, tethers, optical lenses, protective films, insulating foams, molded parts, and fiber reinforced parts.

The synthesis of the diamines and dianhydrides is a key feature of this invention. They are prepared from commercially available starting materials in two or more steps with relatively good yield and purity (Equations I–IX). The diamines and dianhydrides possess specific features that impart atomic oxygen resistance, low color, low solar absorptivity, high optical transparency, and solubility into the resulting polyimides and copolyimides. The diamines and dianhydrides are subsequently used to prepare poly(amide acid)s, polyimides and random copolyimides that have a particularly desirable combination of properties for applications on spacecraft. It should be understood that, in the context of the claims, the term "diamine-derived" when modifying the term "divalent radical(s)," means divalent radicals derived from diamines according to the teachings disclosed herein, and the term "dianhydride-derived," when modifying the term "tetravalent radical(s)," refers to tetravalent radicals derived from dianhydrides according to the teachings disclosed herein. The products derived therefrom include, but are not limited to, films, fibers, moldings, adhesives, composites, and foams.

The diamine represented in Equation I gives particularly good results when used to prepare poly(amide acid)s, copoly(amide acid)s, polyimides and copolyimides. The poly(amide acid)s, copoly(amide acid)s, polyimides and copolyimides are prepared by the reaction of stoichiometric ratios of an aromatic dianhydride with the diamines in polar aprotic solvents (Equation IX). Controlled molecular weight oligomeric (amide acid)s and imides can be prepared by offsetting the stoichiometry according to the Carothers equation using excess diamine and endcapping with aromatic anhydrides. In an analogous fashion, copoly(amide acid)s and copolyimides were prepared by reacting the novel diamines with another diamine and a dianhydride and by reacting the diamines containing phenylphosphine oxide groups with two different dianhydrides.

Polyimides are prepared from the poly(amide acid) solutions by cyclodehydration using several techniques. For example, poly(amide acid) solutions can be heated in the presence of an azeotroping agent such as toluene using a moisture trap to remove water. The poly(amide acid) solutions can also be treated with dehydrating agents such as pyridine and acetic anhydride at room temperature to effect imidization. Alternative synthetic routes to prepare the polyimides described herein can be employed such as reacting the diamine and dianhydride in m-cresol containing isoquinoline at elevated temperatures. They can be prepared by reacting the half alkyl ester of an aromatic dianhydride with the diamine containing phenylphosphine oxide groups by melt polymerization or in solvents such as methanol or m-cresol. In addition, the polymerization of monomeric reactants approach can be utilized whereby the half alkyl ester of an aromatic dianhydride is reacted with the diamine containing phenylphosphine oxide groups.

The polymers were characterized for physical and mechanical properties in the form of amide acid solutions, imide powders and thin films. Inherent viscosities ranged from 0.26 to 1.07 dL/g indicating medium to high molecular weight. The $T_g$s ranged from 203 to 251° C. These values are typical for aromatic polyimides.

Thin films were cast from amide acid and/or imide solutions and thermally treated in a forced air oven to imidize and/or remove solvent. Most of the films were tough, creasable and exhibited low color. The color of the thin films (~1.5 mil thick) ranged from light yellow to colorless and were dependent upon chemical structure. The films exhibited room temperature tensile strengths and moduli from 79 to 113 MPa and 2.46 to 3.53 GPa, respectively. The elongations to break ranged from 3.1 to 9.7 with one example breaking at 40% elongation. These values are comparable to other aromatic polyimides.

Imidized thin film samples were measured for optical transparency using ultraviolet/visible spectroscopy. Most of the films exhibited optical transparencies in excess of 85% at 500 nm. All films were clear to pale yellow in color depending on the chemical structure and to some degree on film thickness. The films exhibited low solar absorptivities ($\alpha$) and relatively high thermal emissitivities ($\epsilon$). Solar absorptivities were measured on a Aztek Model LPSR-300 spectroreflectometer with measurements taken between 250 to 2800 nm with a vapor deposited aluminum on Kapton® as a reflective reference. An Aztek Temp 2000A Infrared reflectometer was used to measure the thermal emissivity.

As previously described, the diamines and dianhydrides were used to prepare poly(amide acid)s, copoly(amide acid)s, polyimides and copolyimides. The poly(amide acid)s can be prepared by the reaction of stoichiometric ratios of an aromatic dianhydride with the diamines in polar aprotic solvents. Controlled molecular weight oligomeric (amide acid)s were prepared by offsetting the stoichiometry according to the Carothers equation using excess diamine and endcapping with aromatic anhydrides such as phthalic anhydride or phenylethynylphthtalic ahnydride. In an analogous fashion, copoly(amide acid)s can be prepared by reacting an aromatic diamine with two different dianhydrides and by reacting the diamine containing phenylphosphine oxide groups and another diamine with a dianhydride. The polymerization of monomeric reactants approach can be utilized whereby the half alkyl ester of an aromatic dianhydride is reacted with an aromatic diamine. Either or both of the reactants can contain phenylphosphine oxide groups. Copolyimides were prepared using the same approach.

Novel aromatic diamines and dianhydrides containing a phenylphosphine oxide group were synthesized according to the reaction schemes depicted in Equations I–VII and VIII–IX, respectively. The following equation (I) shows the preparation of the diamine [2,4-bis(3-aminophenoxy)phenyl]diphenylphosphine oxide (3-APPO), containing a phenylphosphine oxide group according to the present invention:

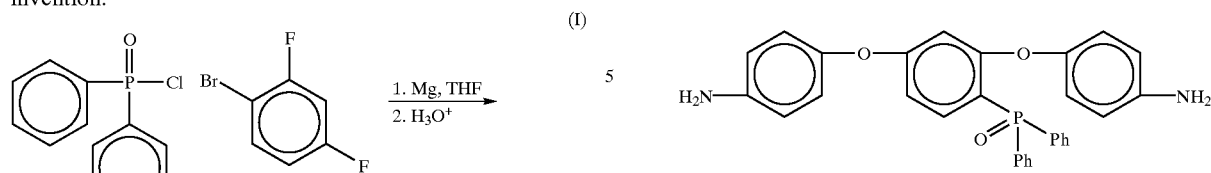

(I)

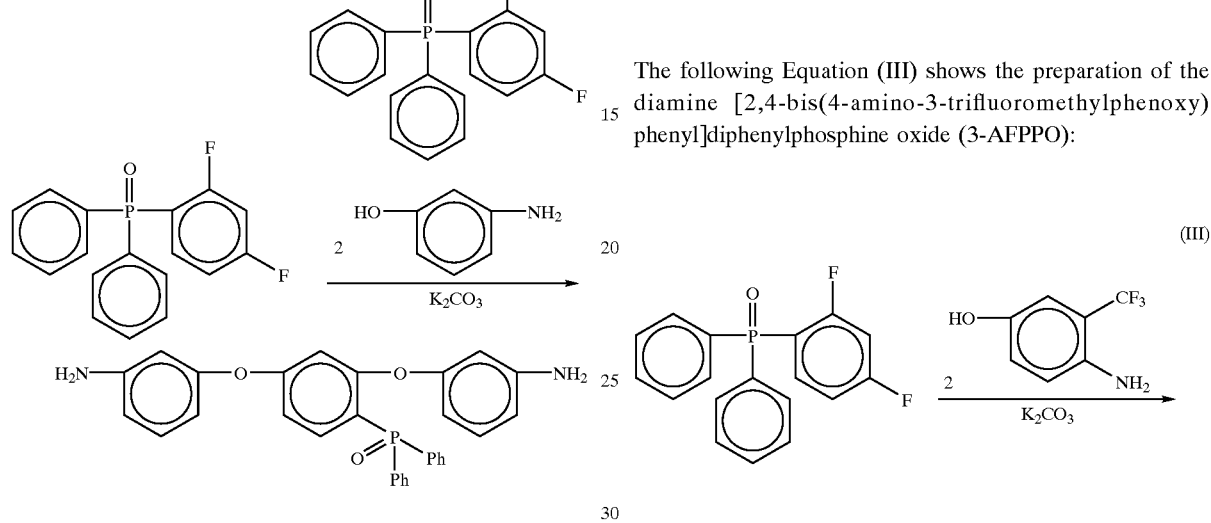

The following Equation (II) shows the preparation of the diamine [2,4-bis(4-aminophenoxy)phenyl]diphenylphosphine oxide (4-APPO):

(II)

The following Equation (III) shows the preparation of the diamine [2,4-bis(4-amino-3-trifluoromethylphenoxy)phenyl]diphenylphosphine oxide (3-AFPPO):

(III)

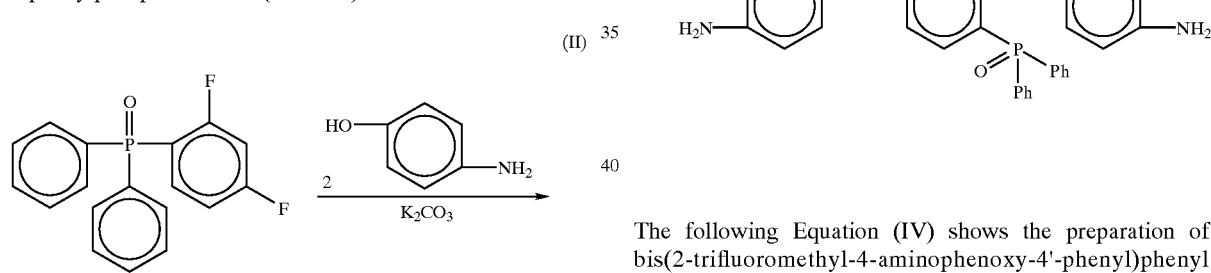

The following Equation (IV) shows the preparation of bis(2-trifluoromethyl-4-aminophenoxy-4'-phenyl)phenyl phosphine oxide (TFAPO):

(IV)

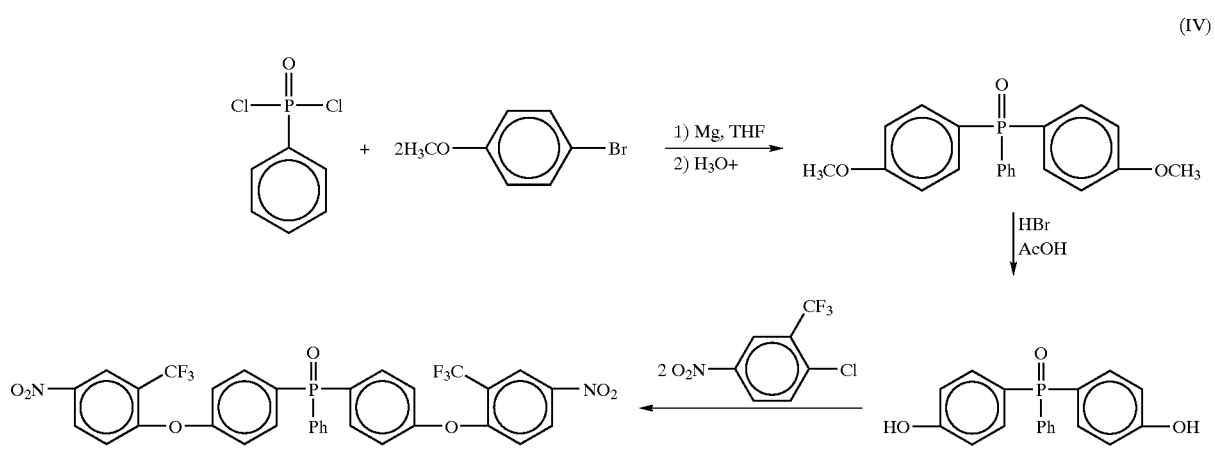

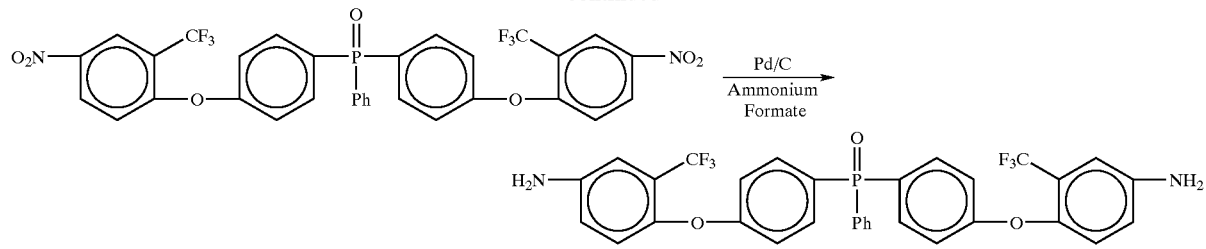
The following Equation (V) shows the preparation of the diamine [2,5-bis(4-aminophenoxy)phenyl]diphenylphosphine oxide (4,4'-APPO):
The following Equation (VI) shows the preparation of the diamine [2,5-bis(2-trifluoromethyl-4-aminophenoxy)phenyl]diphenylphosphine oxide (4,4'-TFAPPO):
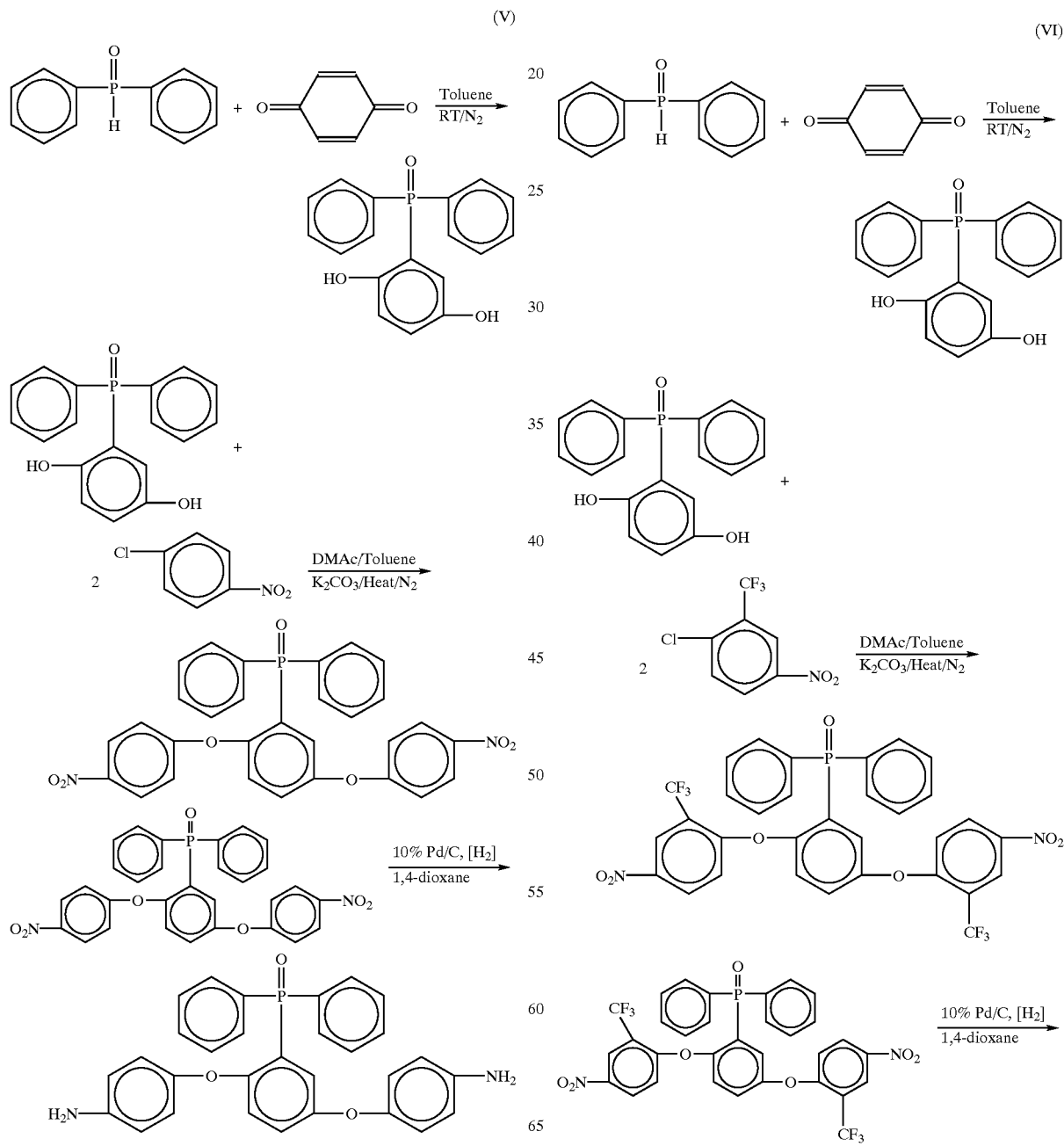

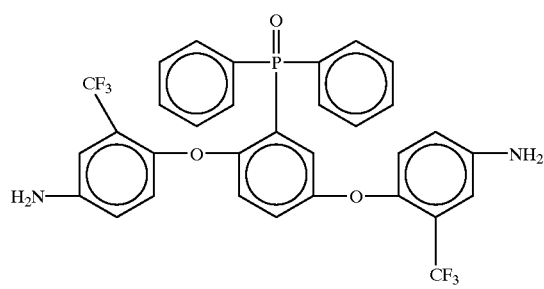
The following Equation (VII) shows the preparation of the diamine (2,6-diamino-4-trifluoromethylphenyl) diphenylphosphine oxide (2,6-APPO):
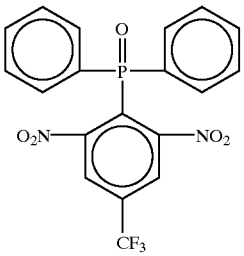
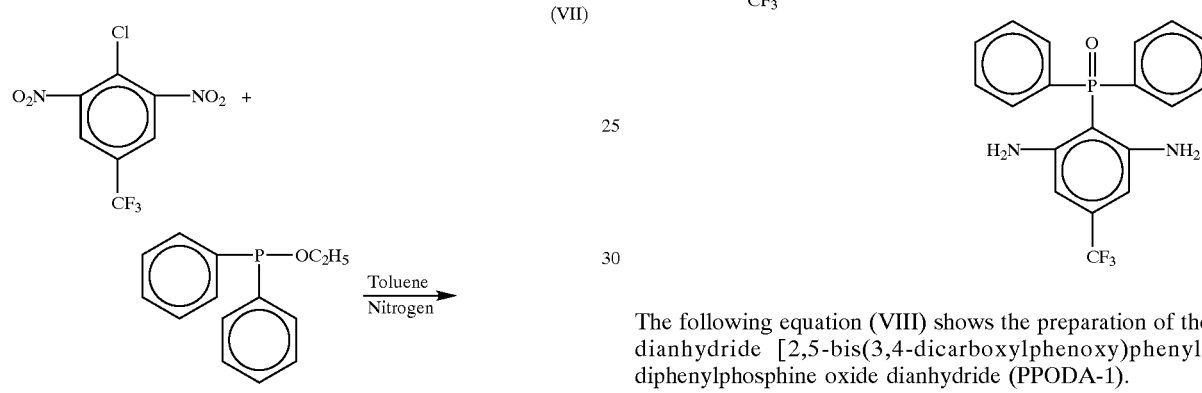
The following equation (VIII) shows the preparation of the dianhydride [2,5-bis(3,4-dicarboxylphenoxy)phenyl] diphenylphosphine oxide dianhydride (PPODA-1).
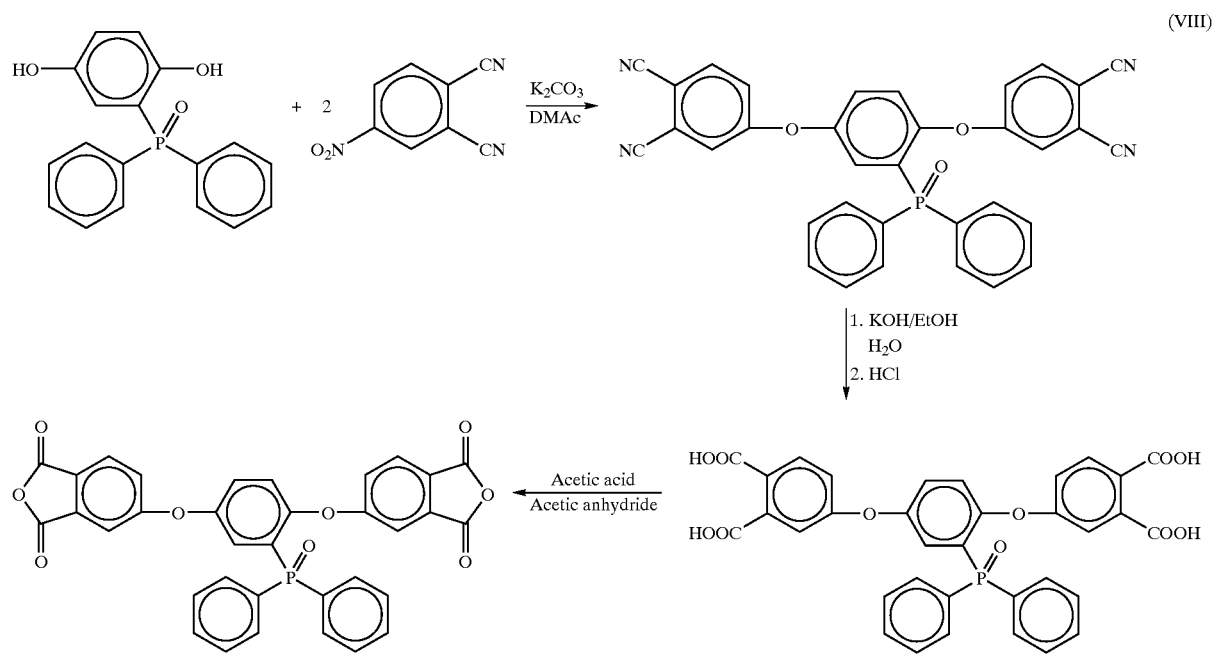

The following Equation (IX) shows the preparation of the dianhydride 4,4'-bis(3,4-dicarboxyphenoxy)phenylphosphine oxide dianhydride (PPODA2):

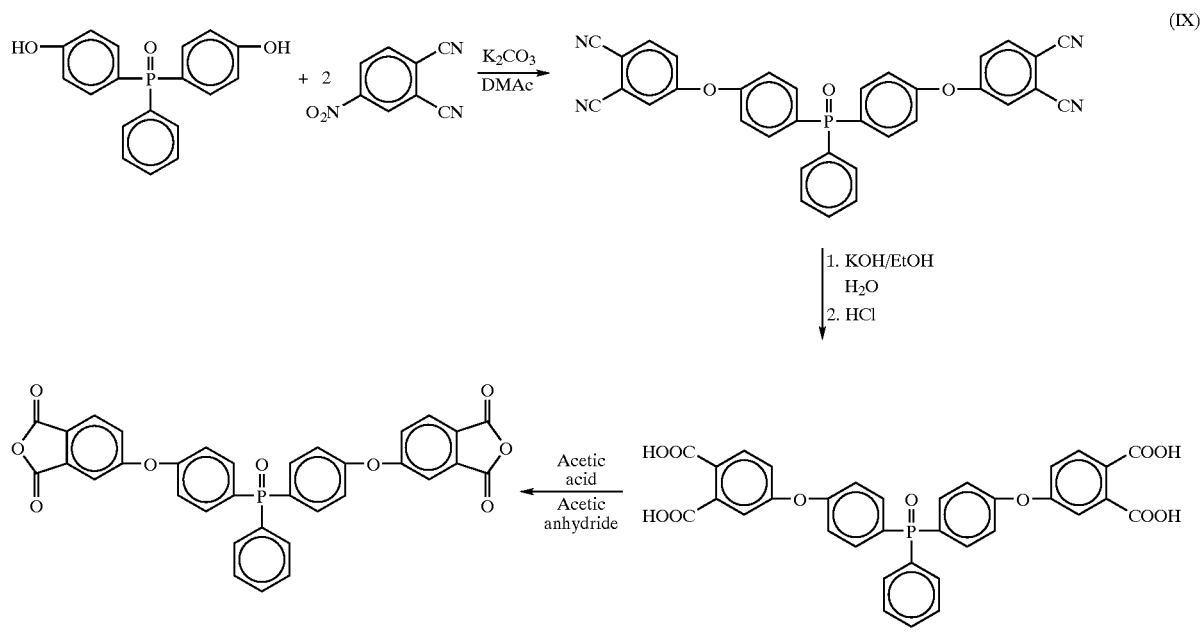

(IX)

These compounds were characterized using conventional techniques and were found to be consistent with the chemical structures given. The compounds (monomers) were subsequently used to prepare a variety of poly(amide acid)s, copoly(amide acid)s, polyimides and copolyimides that exhibited a unique combination of properties including low solar absorptivity, high optical transparency and atomic oxygen resistance. The diamines were reacted with a variety of aromatic dianhydrides to prepare poly(amide acid)s and polyimides as depicted in Equation X. The molecular weight of the polymers can be controlled by adjusting the stoichiometry of the reactants. Likewise, the polymers can be endcapped with a mono-functional amine such as aniline or a mono-functional anhydride such as phthalic anhydride. Optionally, an endcapping agent that contains other functional groups such as 4-phenylethynyl phthalic anhydride may be used. Examples are given to embody each of these approaches. The following Equation (X) depicts the preparation of poly(amide acid)s and polyimides from the diamines disclosed herein:

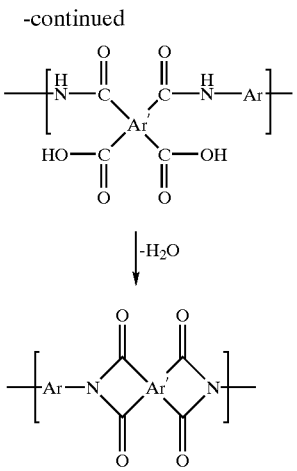

(X)

-continued

Wherein Ar is represented by:

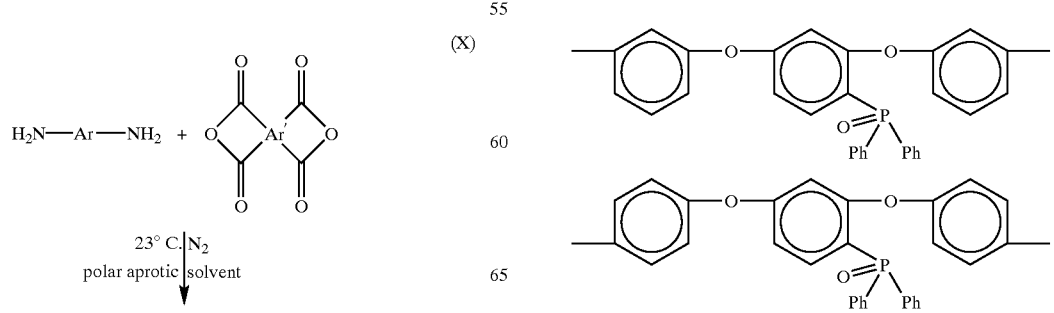

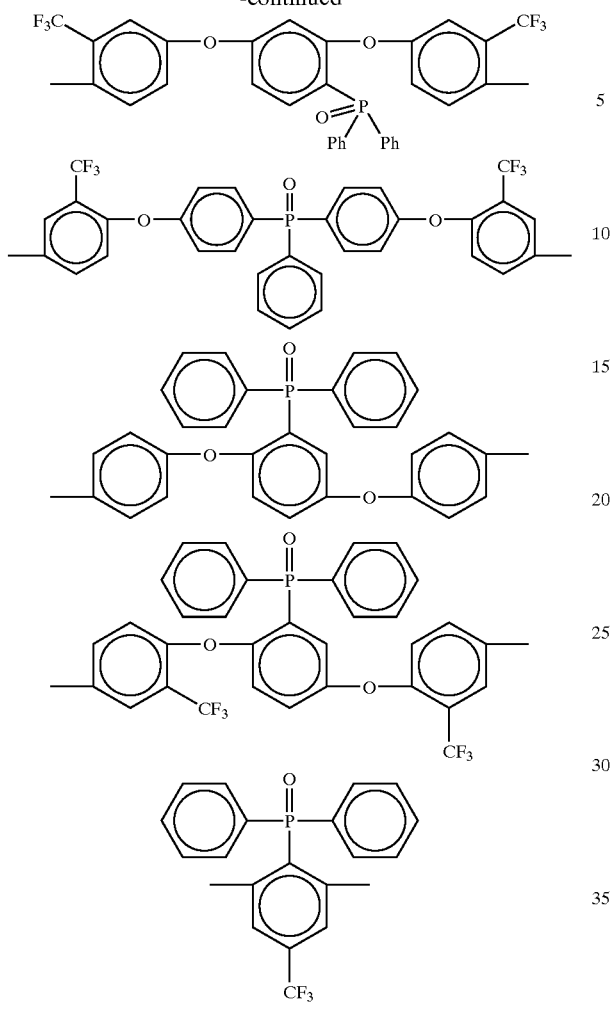

Wherein Ar' can be any tetravalent radical.

Likewise the diamines disclosed herein can be used to synthesize copoly(amide acid)s and copolyimides as represented in Equation XI. The copolymers can be prepared by reacting one of the novel diamines disclosed herein and another diamine with one aromatic dianhydride. The molecular weight of the copolymers can be controlled by adjusting the stoichiometry of the reactants. Likewise, the polymers can be endcapped with a mono-functional amine such as aniline or a mono-functional anhydride such as phthalic anhydride. Optionally, an endcapping agent that contains other functional groups such as 4-phenylethynyl phthalic anhydride may be used. Copoly(amide acid)s and polyimides can also be prepared by reacting one of the diamines with two different dianhydrides as depicted in Equation XII. The molecular weight of the polymers can be controlled by adjusting the stoichiometry of the reactants. Likewise, the polymers can be endcapped with a mono-functional amine such as aniline or a mono-functional anhydride such as phthalic anhydride. Optionally, an endcapping agent that contains other functional groups such as 4-phenylethynyl phthalic anhydride may be used. Examples are given to embody each of these approaches. Equation (XI) shows the preparation of copoly(amide acid)s and copolyimides using one of the diamines disclosed herein and another diamine:

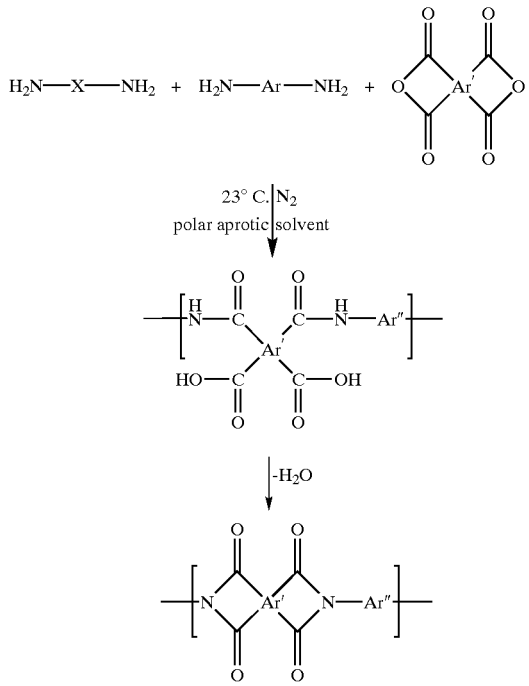

Wherein Ar' can be any tetravalent radical,

Wherein Ar" represents a mixture of Ar and X,

Wherein Ar is represented by:

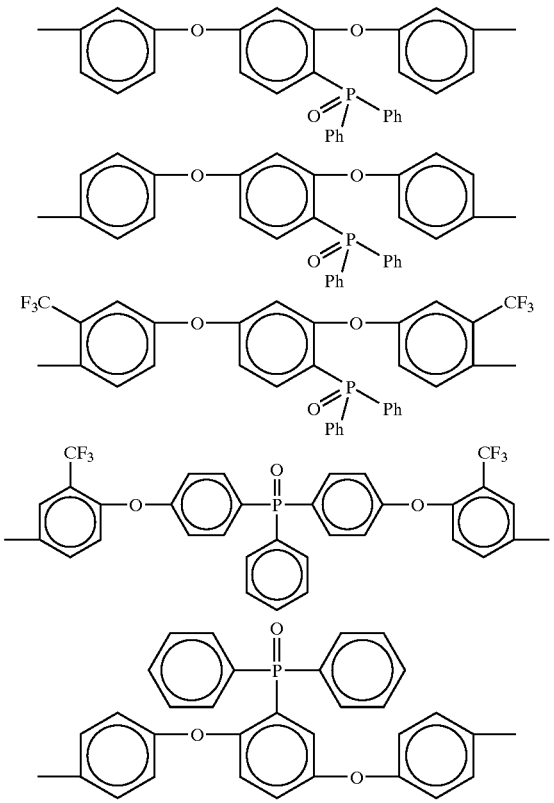

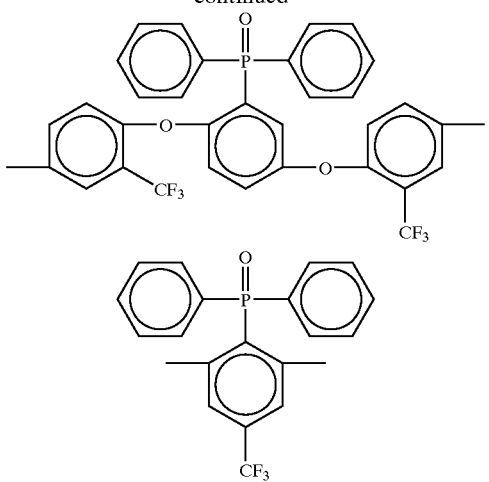

Wherein X can be any divalent radical,

Wherein the molar ratio of Ar to X can range from approximately 1 to 99,

And wherein the number average molecular weight approximately ranges from 700 g/mole to 100,000 g/mole.

The following equation (XII) depicts the preparation of copoly(amide acid)s and copolyimides using one of the diamines disclosed herein and two dianhydrides

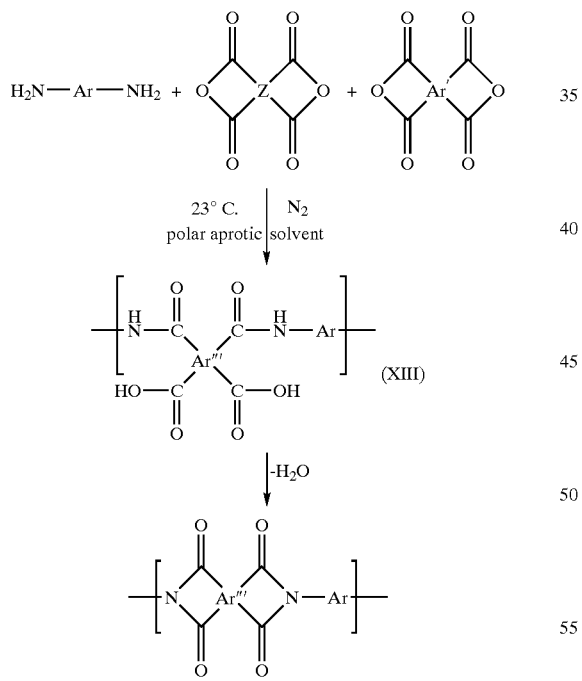

Wherein Ar''' represents a mixture of Ar' and Z,

Wherein Ar' can be any tetravalent radical,

Wherein Z can be any tetravalent radical different from Ar',

Wherein the number average molecular weight approximately ranges from 700 g/mole to 100,000 g/mole, Wherein the molar ratio of Ar' to Z can range approximately from 1 to 99, And wherein Ar is represented by:

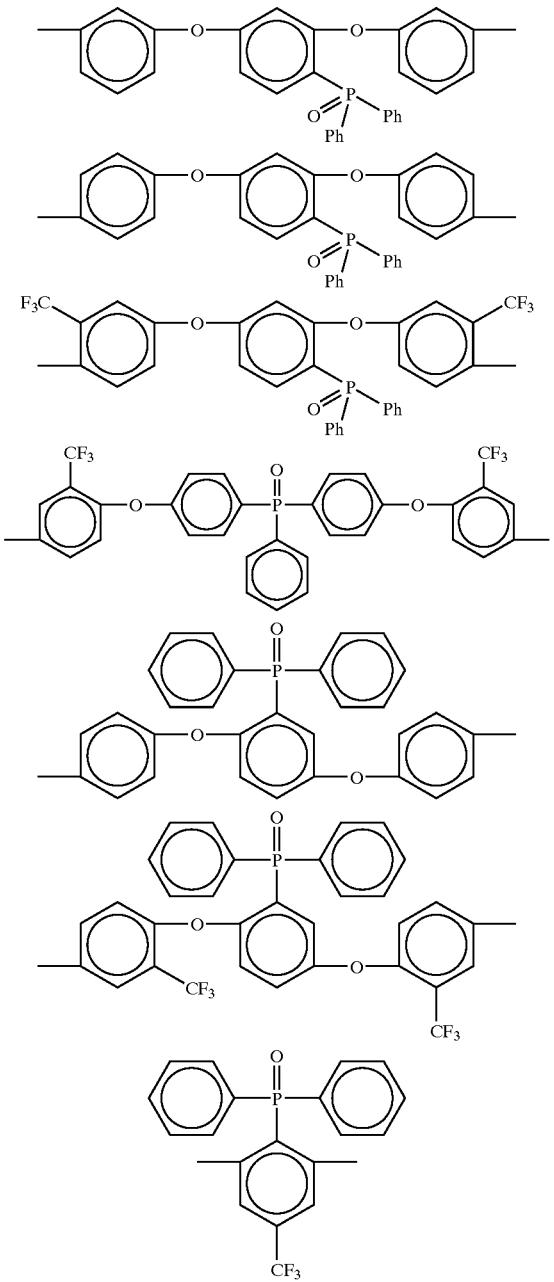

The aromatic dianhydrides disclosed herein were synthesized according to the chemical equations presented in Equations VIII and IX. They were subsequently used to prepare poly(amide acid)s and polyimides as depicted in Equation XIII. It should be noted that these two dianhydrides were also reacted with the aromatic diamines disclosed herein. The molecular weight of the polymers can be controlled by adjusting the stoichiometry of the reactants. Likewise, the polymers can be endcapped with a mono-functional amine such as aniline or a mono-functional anhydride such as phthalic anhydride. Optionally, an end-capping agent that contains other functional groups such as 4-phenylethynyl phthalic anhydride may be used. Examples are given to embody each of these approaches. The following equation (XIII) depicts the preparation of poly(amide acid)s and polyimides using the dianhydrides disclosed herein and a diamine:

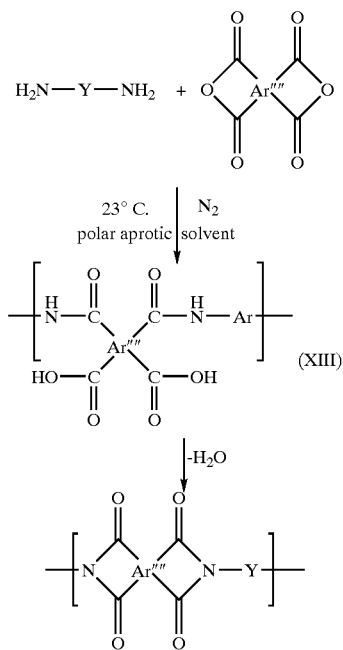

(XIII)

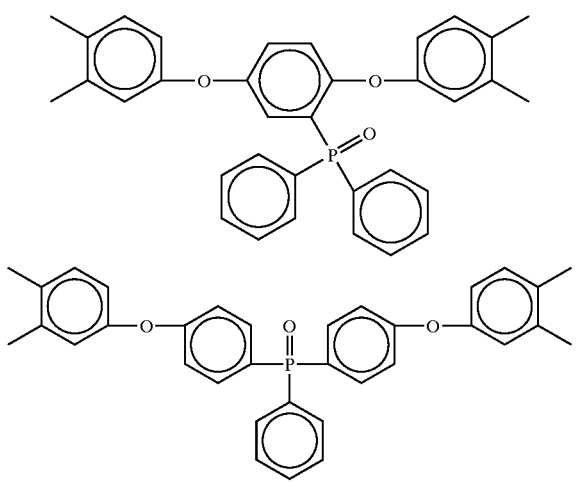

Wherein Ar"" is represented by:

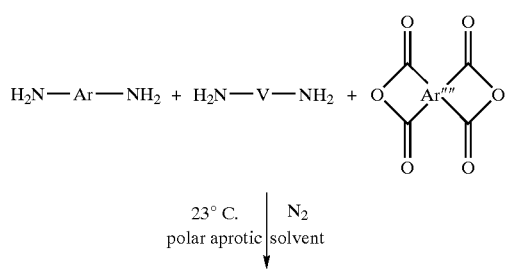

Wherein Y can be any divalent radical

As was the case with the diamines, the novel dianhydrides can be used to make copoly(amide acid)s and copolyimides as depicted in equation (XIV):

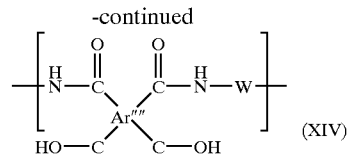

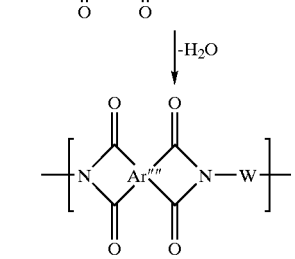

(XIV)

Wherein Ar'" is represented by:

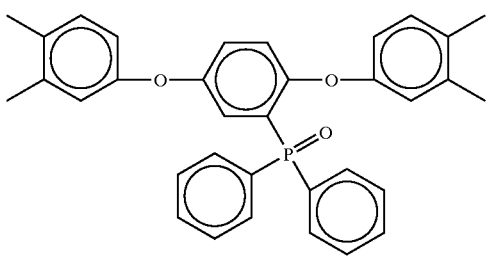

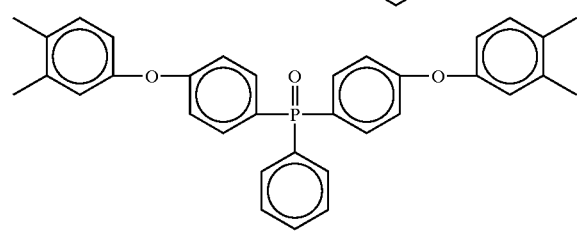

Wherein W is a mixture of X and V,
Wherein X can be any divalent radical,
Wherein V can be any divalent radical different from X,
Wherein the ration of X to V approximately ranges from 1–99;
And wherein the number average molecular weight approximately ranges from 700 g/mole to 100,000 g/mole.

The molecular weight of the polymers can be controlled by adjusting the stoichiometry of the reactants. Likewise, the polymers can be endcapped with a mono-functional amine such as aniline or a mono-functional anhydride such as phthalic anhydride. Optionally, an endcapping agent that contains other functional groups such as 4-phenylethynyl phthalic anhydride may be used. Examples are given to embody each of these approaches. In an analogous fashion, copoly(amide acid)s and copolyimides can be prepared using a combination of one or both of the novel dianhydrides disclosed herein and another dianhydride and any diamine. This is an obvious extension of the embodiments discussed above and no examples are offered.

The diamines and dianhydrides disclosed herein impart unique and unexpected properties into poly(amide acid)s and polyimides prepared from them. The poly(amide acid)s were prepared by the reaction of stoichiometric ratios of an aromatic dianhydride with one of the novel diamines in polar aprotic solvents. Controlled molecular weight oligomeric (amide acid)s can be prepared by offsetting the stoichiometry according to the Carothers equation using excess diamine and endcapping with a mono-functional anhydride such as phthalic anhydride. Alternatively, the mono-functional anhydride may contain other functionalities. One example given uses 4-phenylethynyl phthalic anhydride as an endcapping agent. Polyimides can be prepared from the poly(amide acid) solutions by cyclodehydration using several techniques. For example, poly(amide acid) solutions can be heated in the presence of an azeotroping agent such as toulene using a moisture trap to remove water. The poly(amide acid) solutions are also treated with dehydrating agents such as pyridine and acetic anhydride at room temperature to effect imidization. Additional alternative synthetic routes to prepare the polyimides described herein can be employed such as reacting the diamine and dianhydride in m-cresol containing isoquinoline at elevated temperatures. In some of the examples disclosed herein, this route was used. Polyimides can also be prepared by reacting the half alkyl ester of an aromatic dianhydride with the diamine containing phenylphosphine oxide groups by melt polymerization or in solvents such as methanol or m-cresol. In addition, the polymerization of monomeric reactants approach can be utilized whereby the half alkyl ester of an aromatic dianhydride is reacted with the diamine containing phenylphosphine oxide groups.

Polymer characterization is presented in Table 1 and copolymer characterization is presented in Table 2. The inherent viscosities were determined on 0.5% solutions of the poly(amide acid)s in NMP at 25° C. They ranged from 0.26 to 1.07 dL/g indicating moderate to high molecular weight polymers. The $T_g$s were determined on imidized thin films by differential scanning calorimetry at a heating rate of 20° C./min. The $T_g$s ranged from 203 to 251° C. These values are typical for aromatic polyimides.

TABLE 1

Polymer Characterization

| Example | $\eta_{inh}$, dL/g[a] | $T_g$, ° C.[b] |
|---|---|---|
| 10 | 0.66 | 230 |
| 11 | 1.01 | 212 |
| 12 | 0.81 | 227 |
| 13 | 0.53 | 251 |
| 14 | 0.97 | 234 |
| 32 | 0.49 | 230 |

TABLE 2

Copolymer characterization, 75% 3-APPO, 25% co-diamine.

| Example | $\eta_{inh}$, dL/g[a] | $T_g$, ° C.[b] |
|---|---|---|
| 15 | 1.07 | 203 |
| 16 | 0.66 | 216 |
| 17 | 0.57 | 218 |
| 18 | 0.57 | 220 |
| 19 | 0.73 | 222 |
| 20 | 0.53 | 224 |
| 21 | 0.39 | 226 |
| 22 | 0.46 | 227 |
| 23 | 0.34 | 233 |
| 24 | 0.42 | 234 |
| 25 | 0.58 | 234 |
| 26 | 0.49 | 237 |
| 27 | 0.57 | 238 |
| 28 | 0.39 | 238 |
| 29 | 0.26 | 240 |
| 30 | 0.28 | 246 |
| 31 | 0.48 | 249 |

Thin films were cast from amide acid and/or imide solutions and thermally treated in a forced air oven to imidize and for solvent removal. All films were tough, creasable, and exhibited low color. The color of the thin films (~1.5 mil thick) ranged from light yellow to colorless and were dependent upon the dianhydride. Thin film mechanical properties are presented in Tables 3 and 4. The films exhibited room temperature tensile strengths and moduli from 79 to 113 MPa and 2.46 to 3.53 GPa, respectively. The elongations at break ranged from 3.1 to 40%. These values are comparable to other aromatic polyimides.

TABLE 3

Room Temperature Thin Film Tensile Properties for Homopolymers

| Example | Tensile Strength, MPa | Tensile Modulus, GPa | Elongation @break, % |
|---|---|---|---|
| 10 | 87 | 2.87 | 3.3 |
| 11 | 97 | 2.83 | 4.7 |
| 12 | 82 | 2.46 | 40.0 |

TABLE 4

Room Temperature Thin Film Tensile Properties for Copolymers, 75% 3-APPO, 25% co-diamine.

| Example | Tensile Strength, MPa | Tensile Modulus, GPa | Elongation @ break, % |
|---|---|---|---|
| 15 | 97 | 3.11 | 5.0 |
| 16 | 105 | 2.79 | 7.9 |
| 17 | 101 | 3.23 | 6.3 |
| 18 | 104 | 2.95 | 6.6 |
| 19 | 99 | 3.29 | 9.5 |
| 20 | 101 | 3.40 | 4.1 |
| 21 | 113 | 3.25 | 8.7 |
| 22 | 108 | 2.98 | 6.2 |
| 24 | 108 | 3.18 | 4.9 |
| 25 | 92 | 2.89 | 4.3 |
| 26 | 90 | 3.05 | 9.6 |
| 27 | 94 | 2.77 | 5.0 |
| 28 | 88 | 2.69 | 4.3 |
| 29 | 102 | 3.53 | 9.7 |
| 30 | 90 | 3.50 | 3.9 |
| 31 | 79 | 3.24 | 3.1 |

Imidized thin film samples were measured for optical transparency using ultraviolet/visible spectroscopy. The results are presented in Tables 5 and 6. Most of the films exhibited optical transparencies in excess of 85%. All of these films were colorless to yellow in color depending to some degree on film thickness.

TABLE 5

Optical Transparency of Polyimide Films at 500 nm.

| Example | Thickness, in | Transparency, % |
|---|---|---|
| 10 | 0.0017 | 87 |
| 11 | 0.0016 | 85 |
| 12 | 0.0020 | 85 |
| 14 | 0.0024 | 76 |
| 32 | 0.0025 | 80 |

TABLE 6

Optical Transparency of Copolymers,
75% 3-APPO, 25% co-diamine at 500 nm.

| Example | Thickness, in | Transparency, % |
|---|---|---|
| 15 | 0.0012 | 83 |
| 16 | 0.0014 | 80 |
| 17 | 0.0008 | 88 |
| 18 | 0.0013 | 85 |
| 19 | 0.0011 | 82 |
| 20 | 0.0015 | 86 |
| 21 | 0.0021 | 87 |
| 22 | 0.0014 | 81 |
| 23 | 0.0008 | 89 |
| 24 | 0.0013 | 88 |
| 25 | 0.0021 | 87 |
| 26 | 0.0011 | 85 |
| 27 | 0.0016 | 88 |
| 28 | 0.0010 | 89 |
| 29 | 0.0014 | 80 |
| 30 | 0.0013 | 85 |
| 31 | 0.0015 | 86 |

The thin films were also characterized for thermal and optical properties. Solar absorptivities ($\alpha$) were measured on a Aztek Model LPSR-300 spectroreflectometer with measurements taken between 250 to 2800 nm with a vapor deposited aluminum on Kapton® as a reflective reference. An Aztek Temp 2000A Infrared reflectometer was used to measure the thermal emissivity ($\epsilon$). An $\alpha$ of less than 0.10 at a thickness level of 0.0010–0.0025 in is exceptionally good. The data for the homopolymers and copolymers is presented in Tables 7 and 8, respectively.

TABLE 7

Solar absorptivities and thermal emissitivities of homopolyimide films

| Example | $\alpha$ | $\epsilon$ | Thickness, in |
|---|---|---|---|
| 10 | 0.051 | 0.547 | 0.0017 |
| 11 | 0.055 | 0.56 | 0.0016 |
| 12 | 0.091 | 0.683 | 0.0020 |
| 13 | — | — | — |
| 14 | 0.096 | 0.620 | 0.0024 |
| 32 | 0.063 | 0.575 | 0.0025 |

TABLE 8

Solar absorptivities and thermal emissitivities of copolyimide films

| Example | $\alpha$ | $\epsilon$ | Thickness, in |
|---|---|---|---|
| 16 | 0.068 | 0.596 | 0.0014 |
| 17 | 0.058 | 0.380 | 0.0008 |
| 20 | 0.070 | 0.643 | 0.0015 |
| 24 | 0.059 | 0.587 | 0.0013 |
| 31 | 0.057 | 0.531 | 0.0015 |

Thin film (~0.001 thick) was subjected to several atomic oxygen exposure tests. The first was performed as follows: Thin film obtained from the polyimide described in Example 10 was sputter coated with silver/inconel prior to exposing the film to AO and UV. AO testing was conducted at the NASA Marshall Space Flight Center in the Atomic Oxygen Beam Facility (ABOF). The ABOF system produces AO by exciting an oxygen plasma using microwaves at 2.45 GHz and is confined to the center of the plasma chamber using a strong magnetic field. Ions are accelerated from the plasma and neutralized. The neutralization technique provides a direct measurement of the AO flux that in many other systems is not directly known. Under standard operating conditions, the system is capable of producing an AO flux of $10^{16}$ atoms/cm$^2$/sec for accelerated testing. The ABOF system produces AO atoms with 5 eV energy. UT testing was conducted at the NASA Goddard Space Flight Center Thermal Engineering Branch with the Multisedes Vacuum System. The system consists of two sorption pumps, a sputter-ion pump, and a sample chamber with 16 testing positions. An AZ Technology LPRS-200 was used to perform the pre-vacuum and post-vacuum reflectance measurements and solar absorptance calculations. The solar absorptance was calculated in accordance with ASTM E903-82. The LPSR measures the reflectance from 250 to 2500 nm of the sample surface at a 15° angle of incidence. The Geir-Dunkle DB-100 Infrared Reflectometer was used to measure the normal emittance of the surface from 5 to 40 $\mu$m. The results from this test are presented in Tables 9 and 10, respectively. It is obvious from the data in Tables 9 and 10 that the film exhibited minimal changes in $\alpha$, $\epsilon$ and weight loss as a consequence of AO and UV exposure. For comparative purposes a film of comparable thickness and dimensions of Kapton® HN was exposed simultaneously. The Kapton® HN film exhibited an erosion of $2.0 \times 10^{-3}$ cm after exposure to a fluence of only $7.5 \times 10^{20}$ AO cm$^{-2}$.

TABLE 9

Effect of fast AO exposure of polyimide/silver film (Example 10)

| Exposure | $\alpha$ | $\epsilon$ | Erosion, cm |
|---|---|---|---|
| None | 0.187 | 0.74 | 0 |
| $1.71 \times 10^{20}$ AO/cm$^2$ | 0.221 | 0.74 | $4.1 \times 10^{-4}$ |
| $2.0 \times 10^{20}$ AO/cm$^2$ | 0.218 | 0.73 | $3.2 \times 10^{-4}$ |
| $2.13 \times 10^{20}$ AO/cm$^2$ | 0.227 | 0.74 | $5.0 \times 10^{-4}$ |

TABLE 10

Effect of UV exposure of polyimide/silver film (Example 10)

| Exposure | $\alpha$ | $\epsilon$ | $\Delta\alpha$ |
|---|---|---|---|
| None | 0.184 | 0.820 | 0 |
| 500 ESH | 0.205 | 0.822 | 0.025 |
| 1000 ESH | 0.202 | 0.817 | 0.018 |

In another test, thin films of several polyimides were exposed to atomic oxygen in a plasma generated beam system. The effect of various exposures on weight loss and optical transparency at 600 nm were monitored. The films were all of comparable thickness and dimensions. The results are presented in Table 11. CP-1 is a commercially available polyimide derived from 4,4'-perfluoroisopropylidene dianhydride and 2,2-bis(4-(4-aminophenoxy)phenyl)hexafluoropropane. Thus it is of similar chemical structure to the polyimide of Example 10, but it contains no phosphine oxide groups. Kapton®HN is an aromatic polyimide derived from 4,4-oxydianiline and pyromellitic dianhydride, it does not contain fluorine or phosphorus. The optical transparencies of the three materials prior to exposure were Example 10 (90%), CP-1 (88%) and Kapton®HN (69%).

TABLE 11

Effect of AO exposure on weight loss and optical transparency

| Sample | AO Exposure, AO/cm$^2$ | Weight loss, g | Transparency at 600 nm, % |
|---|---|---|---|
| Example 10 | 5.0 × 10$^{19}$ | 0.0001 | 90 |
| CP-1 | 5.0 × 10$^{19}$ | 0.0010 | 88 |
| Kapton ®HN | 5.0 × 10$^{19}$ | 0.0010 | 70 |
| Example 10 | 1.5 × 10$^{20}$ | 0.00050 | 86 |
| CP-1 | 1.5 × 10$^{20}$ | 0.0035 | 70 |
| Kapton ®HN | 1.5 × 10$^{20}$ | 0.0035 | 58 |
| Example 10 | 2.5 × 10$^{20}$ | 0.00080 | 80 |
| CP-1 | 2.5 × 10$^{20}$ | 0.0065 | 35 |
| Kapton ®HN | 2.5 × 10$^{20}$ | 0.0070 | 35 |

The results presented in Table 11 further illustrate the exceptional AO resistance of the polyimides described herein. The film from Example 10 exhibits an order of magnitude reduction in weight loss and superior retention of optical transparency compared to similar polyimides. The results described herein detail the preparation of aromatic diamines and dianhydrides and polyimides therefrom that exhibit a low solar absorptivity, high optical transparency and exceptional stability to ultraviolet radiation and atomic oxygen. The unique combination of properties exhibited by the polyimides described herein are not found in any other known polyimide or copolyimide.

EXAMPLES

Having generally described the invention, a more complete understanding thereof can be obtained by reference to the following examples that are provided for purposes of illustration only and do not limit the invention.

Example 1

Preparation of [2,4-bis(3-aminophenoxy)phenyl] diphenylphosphine oxide (3-APPO)

Step 1

Preparation of 2,4-difluorophenyldiphenylphosphine oxide

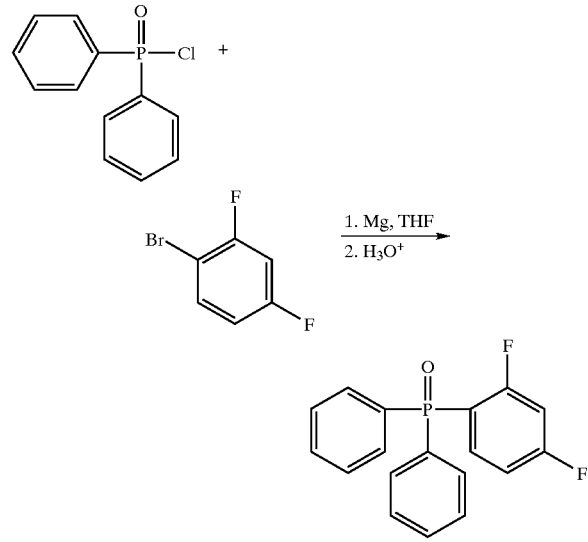

Into a 1L three neck round bottomed flask equipped with a mechanical stirrer, thermometer, nitrogen gas inlet, pressure equalizing addition funnel, and reflux condenser with drying tube was placed predried magnesium turnings (13.5 g, 0.55 mol) and dry tetrahydrofuran (THF, 50 mL). The mixture was cooled to ~5° C. using an ice/water bath. A solution of 1-bromo-2,4-difluorobenzene (107.2 g, 0.55 mol, 20% molar excess) in THF (200 mL) was placed in the pressure equalizing addition funnel and added dropwise over a 1.5 hour period. The mixture was allowed to warm to room temperature. The mixture was stirred at room temperature for 3 hours and the flask was subsequently placed in the ice/water bath to cool the solution to ~5° C. A solution of diphenylphosphinic chloride (107.9, 0.46 mol) in THF (100 mL) was added dropwise over a 1 hour period. The reaction mixture was allowed to warm to room temperature and was stirred under nitrogen for 15 hours. The resultant brown solution was poured into a mixture of concentrated ammonium chloride solution (700 mL) to give two layers. The organic layer was extracted successively with water, 5% aqueous sodium bicarbonate, and water and subsequently dried over magnesium sulfate. The THF was removed via rotoevaporation to give a dark red viscous liquid, 142.8 g, 98% crude yield. The viscous liquid was vacuum distilled (product distilled between 178–181° C.) and a yellow semi-solid was collected (118.6 g, 81% yield). The material was dissolved in 120 mL of hot toluene, treated which charcoal, and filtered while hot through Celite. To the toluene solution was added 120 mL of hexanes. The solution was allowed to cool, with stirring, overnight. A white crystalline material was collected via filtration (100.9 g, 69% yield). The solid exhibited a melting point of 111.1–112.3° C. as determined by differential scanning calorimetry (DSC) at 10° C./min. Anal. Calcd. for $C_{18}H_{13}F_2OP$: C, 68.79%; H, 4.17%; F, 12.09%; P, 9.86%. Found: C, 68.38%; H, 4.26%; F, 11.17%; P, 10.28%. Mass spectroscopic analysis: M+413.2 $[C_{20}H_{13}F_6OP+]$.

Step 2

Preparation of [2,4-bis(3-aminophenoxy)phenyl] diphenylphosphine oxide (3-APPO)

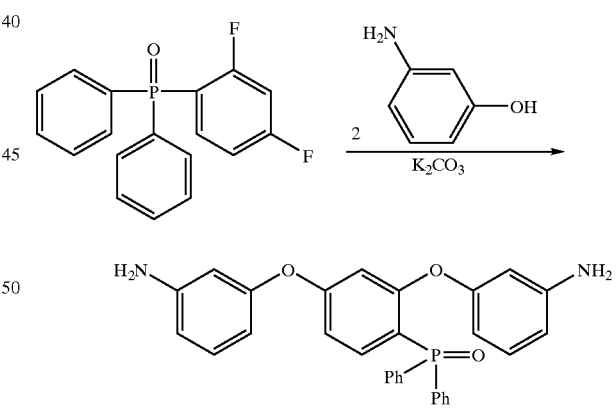

2,4-difluorophenyldiphenylphosphine oxide was prepared as described in Step 1 of Example 1. Into a 500 mL three neck round bottom flask equipped with a mechanical stirrer, thermometer and a Dean-Stark trap equipped with a drying tube was placed 2,4-difluorophenyldiphenylphosphine oxide (39.50 g, 0.1257 mole), 3-aminophenol (28.80 g, 0.2639 mol), potassium carbonate (45.58 g, 0.3298 mol), N-methyl-2-pyrolidinone NMP, 200 mL) and toluene (115 mL). The mixture was heated to 170° C. while removing water via azeotropic distillation. After 16 hours, the toluene was removed from the reaction and the resulting solution was heated at 170° C. for 4 hours. The reaction mixture was cooled to room temperature and then poured into 1 L of 5% acetic acid (aq) with vigorous stirring. A tan solid formed after stirring for 45 minutes. The crude tan solid was collected via filtration, washed with excess water, and dried in an oven at 110° C. to give 59.11 g (95% crude yield). The solid exhibited a melting point of 179.7–187.6° C. The solid was recrystallized twice from ethanol with charcoal treatment to yield 37 g (60% yield) of a light tan solid. The solid exhibited a melting point of 195.2–196.5° C. as determined by DSC at a heating rate of 10° C./min. Anal. Calcd. for: $C_{30}H_{25}N_2O_3P$: C, 73.16%; H, 5.12%; N, 5.69%; P, 6.29%. Found: C, 72.85%; H, 5.00%; N, 5.69%; P, 6.22%. Mass spectroscopic analysis: M+492 $[C_{30}H_{25}N_2O_3P^+]$ Example 2

Preparation of [2,4-bis(4-aminophenoxy)phenyl] diphenylphosphine oxide (4-APPO)

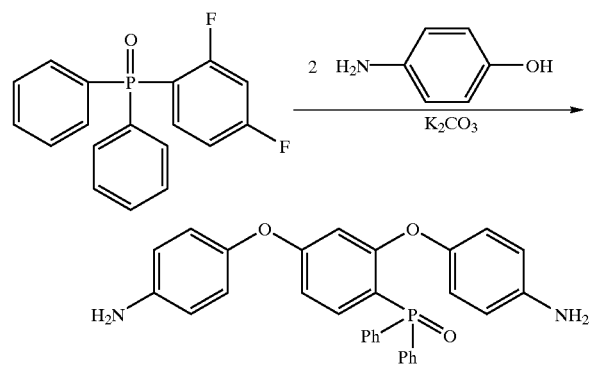

Into a 500 mL three neck round bottom flask equipped with a mechanical stirrer, thermometer and a Dean-Stark trap equipped with a drying tube was placed 2,4-difluorophenyldiphenylphosphine oxide (12.00 g, 0.0382 mole), 4-aminophenol (8.6673 g, 0.0794 mol), potassium carbonate (13.1682 g, 0.0953 mol), NMP (85 mL) and toluene (25 mL). The mixture was heated to 135° C. while removing water via azeotropic distillation. After 16 hours, the toluene was removed from the reaction and the resulting solution was heated at 165° C. for 4 hours. The reaction mixture was cooled to room temperature and then poured into 1 L of 5% acetic acid (aq) with vigorous stirring. A tan solid formed after stirring for 45 minutes. The crude tan solid was collected via filtration, washed with excess water, and dried in an oven at 110° C. to give 16.76 g (89% crude yield). The solid was recrystallized from a dimethylacetamide/water solution (3:1) and light tan needles were obtained. The solid exhibited a melting point of 271.5–274.7° C. as determined by DSC at a heating rate of 10° C./min. Mass spectroscopic analysis: M+492 $[C_{30}H_{25}N_2O_3P^+]$ Example 3

Preparation of [2,4-bis(3-trifluoromethyl-4-aminophenoxy)phenyl]diphenylphosphine oxide (3-AFPPO)

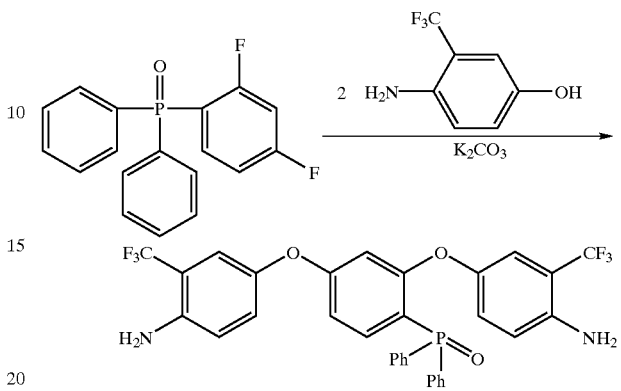

2,4-difluorophenyldiphenylphosphine oxide was prepared as described in Step 1 of Example 1. Into a 100 mL three neck round bottom flask equipped with a mechanical stirrer, thermometer and a Dean-Stark trap equipped with a drying tube was placed 2,4-difluorophenyldiphenylphosphine oxide (7.1654 g, 0.0228 mole), 4-amino-3-trifluromethylphenol (8.52 g, 0.0481 mol), potassium carbonate (8.27 g, 0.0598 mol), NMP (35 mL) and toluene (15 mL). The mixture was heated to 135° C. while removing water via azeotropic distillation. After 16 hours, the toluene was removed from the reaction and the resulting solution was heated at 170° C. for 4 hours. The reaction mixture was cooled to room temperature and then poured into 300 mL of 5% acetic acid (aq) with vigorous stirring. A brown gummy material formed. This material was stirred in warm water, the water decanted, and fresh water added. This process was repeated two more times. A dark brown/grey solid was eventually obtained. No melting point was observed using DSC.

Example 4

Preparation of Bis(2-trifluoromethyl-4-aminophenoxy-4'-phenyl)phenyl phosphine oxide (4-TFAPO)

Step 1

Bis(4-methoxyphenyl)phenyl phosphine oxide

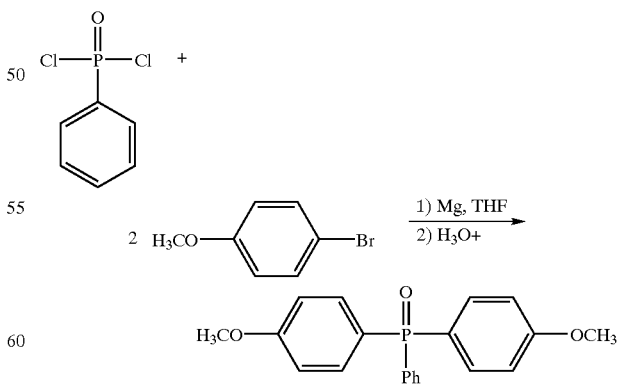

To a 2000 mL three necked round bottom flask equipped with a nitrogen inlet, mechanical stirrer and drying tube was charged magnesium turnings (23.00 g, 0.9463 mol). The magnesium turnings were heated and dried under nitrogen. Once cooled to room temperature, 800 mL THF was added and the mixture cooled to 0–5° C. Bromoanisole (177 g, 0.9463 mol) was added dropwise to the stirred mixture over a three hour period. The mixture was then allowed to warm to room temperature over ~16 hrs to afford a gray cloudy solution. The solution was then cooled to 0–5° C. and phenylphosphinic dichloride (92.26 g, 0.4732 mol) was added dropwise. The solution turned a dark green color and was allowed to warm to room temperature over 16 hours. Aqueous sulfuric acid (~30 mL in 250 mL water) was added to the stirred solution. The mixture turned a yellow color and separated. Water (~600 mL) was then added and the mixture transferred to a separatory funnel. The organic layer was removed and the aqueous layer washed with THF/diethyl ether. This was repeated three times and the organic layer and washings combined. The organic layer was washed three times with a sodium bicarbonate solution (~25 g in 250 mL water) and then three times with water. The organic layer was then dried over magnesium sulfate. The magnesium sulfate was removed by filtration. The THF/diethyl ether was removed via a rotoevaporator to afford a yellow oil (87.23 g, 55% yield). Attempts to crystallize the material were unsuccessful thus it was used as is in the preparation of bis(4-hydroxyphenyl)phenyl phosphine oxide.

Step 2

Bis(4-hydroxyphenyl)phenyl phosphine oxide

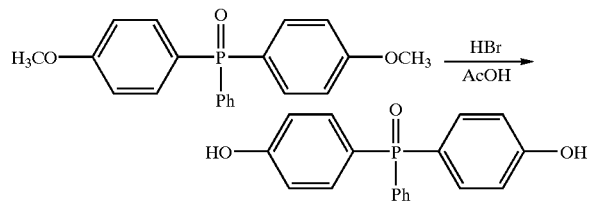

A mixture of bis(4-methoxyphenyl)phenyl phosphine oxide (59.83 g, 0.1768 mol), 48% hydrobromic acid (400 ml, 3.536 mol), and glacial acetic acid (215 ml) was refluxed for 24 hrs. As the solution cooled to room temperature, the crude product remained in solution. The hydrobromic acid/ glacial acetic acid mixture was added to stirred distilled water at room temperature to afford a light pink solid. The crude solid was washed several times in water and dried at ~105° C. to afford 46.4 g (~85% yield). The solid was dissolved in ethanol, treated with activated charcoal, and filtered through Celite 545. Distilled water was added to the stirred warm solution until a 50% aqueous ethanol solution was obtained. The mixture was then allowed to cool to ambient temperature. The product was recovered by filtration and dried under vacuum at 50° C. This recrystallization procedure was repeated an additional time to afford 22.66 g (41% yield) of a white solid, DSC (heating rate of 10° C./min) exotherm at 157° C. with sharp peaks at 227 and 233° C. [literature 233–234° C. (A. E. Senear, W. Valent, and J. Wirth *J. Org. Chem.* 25, 2001, 1960.)]

Step 3

Bis(2-trifluoromethyl-4-nitrophenoxy-4'-phenyl) phenyl phosphine oxide

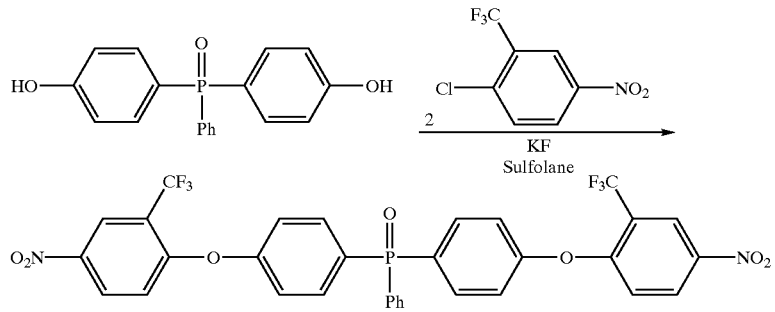

To a 250 mL three necked round bottom flask equipped with a nitrogen inlet, mechanical stirrer, and drying tube was charged bis(4-hydroxyphenyl)phenyl phosphine oxide (8.3530 g, 0.0269 mol), 3-trifluoromethyl-4-chloronitrobenzene (12.1454 g, 0.0538 mol), potassium fluoride (4.2 g, 0.0723 mol) and sulfolane (51.44 g). The mixture was heated under a nitrogen atmosphere at ~130–50° C. for ~16 hr and at ~195° C. for about two hours. The mixture was cooled and added to stirred water to afford a tacky solid. The water was decanted and the tacky solid washed three times in hot water to afford 17.5 g (94%) of an amorphous yellow powder. The solid was taken up in ethanol, charcoaled, and filtered through Celite 545. The solution was added to stirred water to afford a light green solid. The solid was dried at 35° C. under vacuum to afford 14.70 g (79%) of an amorphous solid.

Step 4

Bis(2-trifluoromethyl-4-aminophenoxy-4'-phenyl) phenyl phosphine oxide (TFAPO)

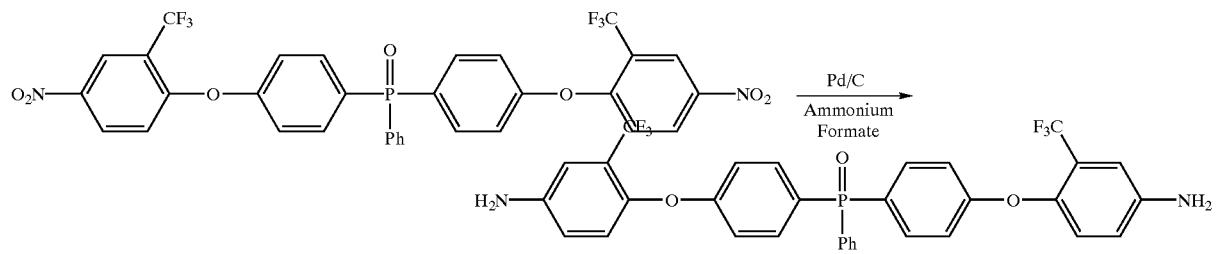

To a 500 mL three necked round bottom flask equipped with a nitrogen inlet, mechanical stirrer, and condenser was charged bis(2-trifluoromethyl-4-nitrophenoxy-4'-phenyl) phenyl phosphine oxide (7.5130 g, 0.0109 mol), 10% palladium on carbon (1.7760 g) and 200 mL of ethanol. To the stirred solution was added ammonium formate (9.5348 g, 0.1512 mol) in several portions. The mixture was stirred at ambient temperature for ~20 hrs and heated at reflux for an additional four hours. The mixture was cooled and the catalyst removed by filtration to afford a colorless filtrate. The filtrate was added dropwise to stirred water to afford a white powder. The powder was recovered and air-dried at ambient temperature to afford 5.54 g of an amorphous powder. The powder was taken up in ethanol, charcoaled and the product reprecipitated in water.

Example 5

Preparation of [2,5-bis(4-aminophenoxy)phenyl] diphenylphosphine oxide (4,4'-APPO)

Step 1

Preparation of 2,5-dihydroxydiphenylphosphine oxide

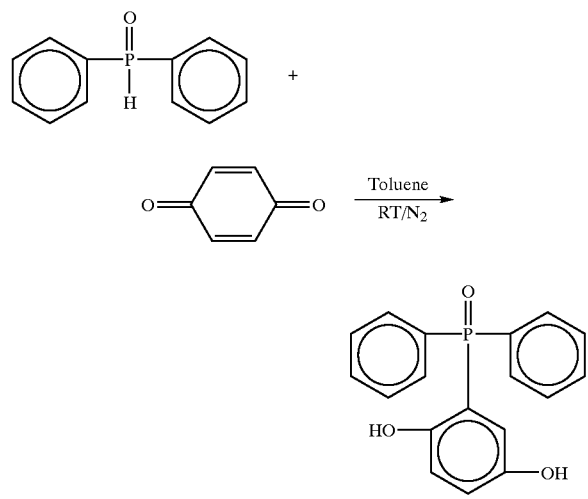

Into a flame dried 2 L three neck round bottomed flask equipped with a mechanical stirrer, nitrogen gas inlet, pressure equalizing addition funnel, and drying tube was charged p-benzoquinone (30.16 g, 0.2790 mol) and toluene (750 mL). Once dissolved, diphenylphosphine oxide (56.42 g, 0.2790 mol) in toluene (250 mL) was added dropwise over a half hour to the stirred solution at room temperature under nitrogen. The solution color changed from a dark brown to yellow with the formation of a gum. Upon further stirring, a grey colored solid formed. The solid was isolated, washed with toluene and diethyl ether, and dried at 110° C. in flowing air to afford 74.0 g (85% crude yield) of an off white solid. The solid exhibited a broad endothermic peak at 208° C. as determined by differential scanning calorimetry (DSC) at a heating rate of 10° C./min. Recrystallization from ethanol afforded a white solid (62.86 g, 73% yield) exhibiting a sharp endothermic peak at 212.48° C. by DSC. [mp 214–215° C., J. M. Brown and S. Woodward, J. Org. Chem., 1991, 56, 6803].

Step 2

Preparation of [2,5-bis(4-nitrophenoxy)phenyl] diphenylphosphine oxide

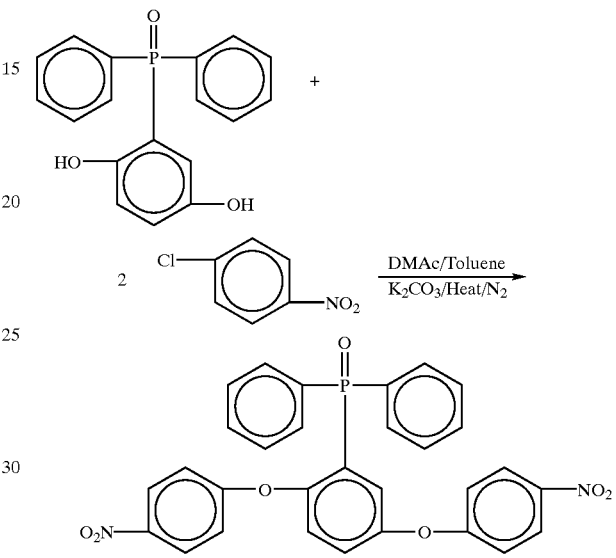

Into a 1 L three neck round bottom flask equipped with a mechanical stirrer, nitrogen inlet, and a Dean-Stark trap was placed 2,5-dihydroxydiphenylphosphine oxide (27.62 g, 0.0890 mol), 1-chloro-4-nitrobenzene (28.05 g, 0.1780 mol), potassium carbonate (28.00 g, 0.2026 mol), N,N-dimethylacetamide (DMAc, 150 mL) and toluene (130 mL). The mixture was heated to a gentle reflux while removing water via azeotropic distillation. After ~4 hours, the toluene was removed from the reaction and the resultant solution heated at ~165° C. for ~16 hours. The reaction mixture was cooled to room temperature and then poured into water with vigorous stirring to afford a light brown solid. The crude solid was collected via filtration, washed twice with hot water, and air dried in an oven at 110° C. to afford 47.6 g (97% crude yield). The solid exhibited a broad endothermic peak at 232.9° C. as determined by differential scanning calorimetry (DSC) at a heating rate of 10° C./min. Recrystallization from ethoxyethanol afforded a yellow solid (39.21 g, 80% yield) exhibiting a sharp endothermic peak at 234.31° C. by DSC. $^1$H NMR (DMSO-d6)δ: 6.8 (1H, d), 7.3 (1.5H, m), 7.5 (4H, m), 7.7 (2H, m), 8.05 (1H, d), 8.3 (1H, d). $^{13}$C (DMSO-$d_6$) ppm: 117.705, 118.186, 125.652, 126.325, 126.516, 126.820, 128.646, 128.808, 130.993, 131.296, 131.432, 132.107, 132.144, 132.410, 142.638, 142.903, 151.402, 151.577, 152.194, 152.226, 161.091, 162.177.

Step 3

Preparation of [2,5-bis(4-aminophenoxy)phenyl]diphenylphosphine oxide (4,4'-APPO)

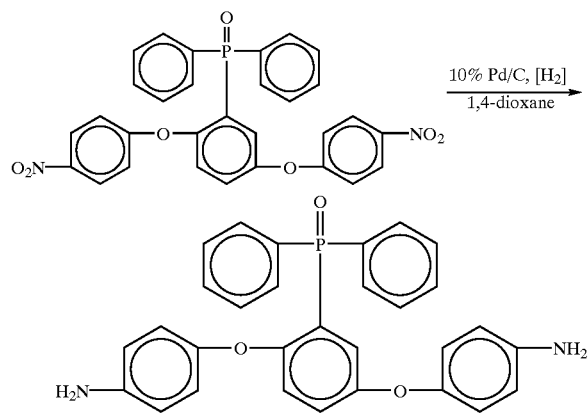

Into a 250 mL Paar Hydrogenation flask was charged [2,5-bis(4-nitrophenoxy)phenyl]diphenylphosphine oxide (5.4 g, 0.0098 mol) and 1,4-dioxane (100 mL). The solution was warmed to effect dissolution with subsequent cooling to room temperature upon which 10% Pd/C (0.59 g) was added. The mixture was degassed prior to the introduction of hydrogen gas. The mixture was agitated under a hydrogen atmosphere for ~24 hours at room temperature. After degassing the solution, the Pd/C was removed by filtration and the solution added to stirred water to afford an off white solid. The crude solid was collected via filtration, washed with water, and dried at room temperature to afford 4.1 g (76% crude yield). The solid exhibited a broad endothermic peak at 200.7° C. as determined by DSC at a heating rate of 10° C./min. Recrystallization from aqueous ethanol afforded a tan solid (3.2 g, 80% yield) exhibiting a broad endothermic peak at 204.12° C. by DSC.

Example 6

Preparation of [2,5-bis(2-trifluoromethyl-4-aminophenoxy)phenyl]diphenylphosphine oxide (4,4'-TFAPPO)

Step 1

Preparation of [2,5-bis(2-trifluoromethyl-4-nitrophenoxy)phenyl]diphenylphosphine oxide

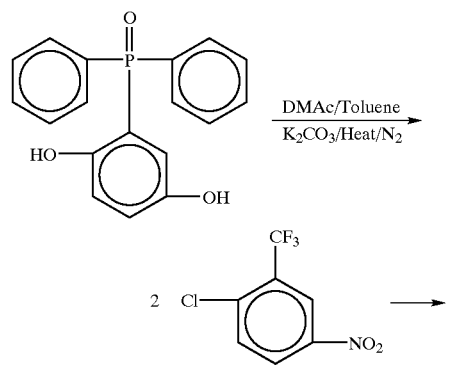

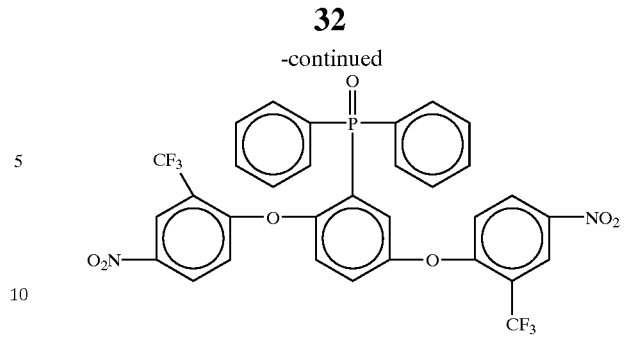

Into a 250 mL three neck round bottom flask equipped with a mechanical stirrer, nitrogen inlet, and a Dean-Stark trap was placed 2,5-dihydroxydiphenylphosphine oxide (4.8162 g, 0.0155 mol), potassium carbonate (7.0186 g, 0.0508 mol), N,N-dimethylacetamide (DMAc, 30 mL) and toluene (80 mL). The mixture was heated to a gentle reflux while removing water via azeotropic distillation. After ~4 hours, the toluene was removed and the mixture cooled to room temperature. 2-Chloro-5-nitrobenzotrifluoride (5.6965 g, 0.0412 mol) was added as a powder to the stirred mixture. Heating was continued at ~90° C. under nitrogen for ~16 hours and at ~160° C. for ~7 hours. The reaction mixture was cooled to room temperature and poured into water with vigorous stirring to afford a brown solid. The crude solid was collected via filtration, washed with water, and air dried at room temperature to afford 7.92 g (74% crude yield). The solid exhibited no melting point as determined by differential scanning calorimetry (DSC) at a heating rate of 10° C./min. The solid was recrystallized from aqueous ethanol. No melting point was observed by DSC.

Step 2

Preparation of [2,5-bis(2-trifluoromethyl-4-aminophenoxy)phenyl]diphenylphosphine oxide (4,4'-TFAPPO)

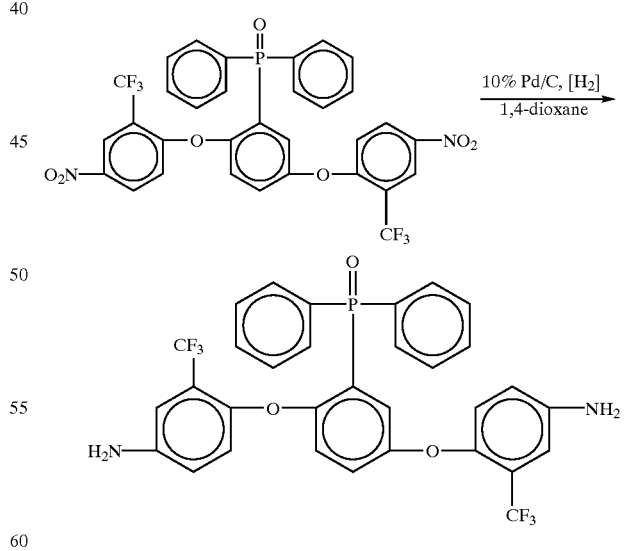

Into a 250 mL Parr hydrogenation flask was charged [2,5-bis(2-trifluoromethyl-4-nitrophenoxy)phenyl] diphenylphosphine oxide (2.55 g, 0.0037 mol), ethanol (25 mL), and 10% Pd/C (0.27 g). The mixture was degassed prior to the introduction of hydrogen gas. The mixture was agitated under a hydrogen atmosphere for ~24 hours at room temperature. After degassing the solution, the Pd/C was removed by filtration and the solution added to stirred water to afford an off white solid. The crude solid was collected via filtration, washed with water, and dried at room temperature to afford 1.23 g (53% crude yield). The solid exhibited no melting peaks as determined by DSC at a heating rate of 10° C./min.

Example 7

Preparation of (2,6-diamino-4-trifluoromethylphenyl)diphenylphosphine oxide (2,6-APPO)

Step 1

Preparation of (2,6-dinitro-4-trifluoromethylphenyl)diphenylphosphine oxide

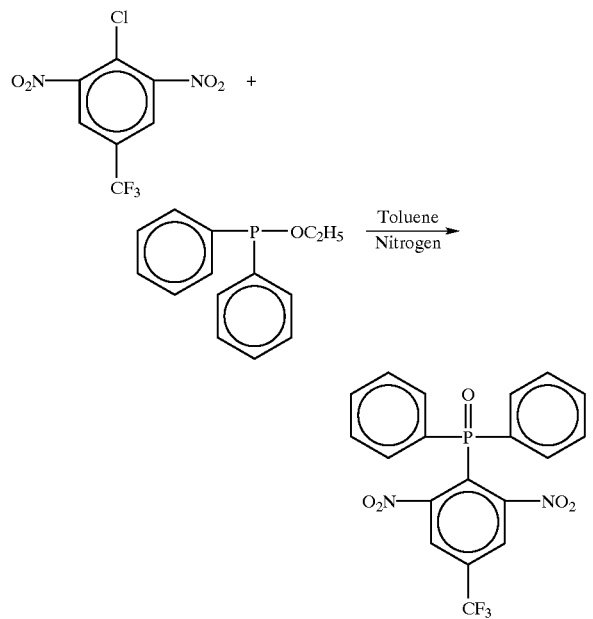

Into a flame dried 250 mL three neck round bottomed flask equipped with a mechanical stirrer, nitrogen gas inlet, pressure equalizing addition funnel, and condensor fitted with a drying tube was charged 4-chloro-3,5-dinitrobenotrifluoride (11.6078 g, 0.0429 mol) and toluene (45 mL). Once dissolved, the solution was cooled in an ice bath. Ethyl diphenylphosphinite (9.8786 g, 0.0429 mol) in toluene (30 mL) was added dropwise over a half hour to the stirred solution under nitrogen. The solution color changed from a light green to light brown. The reaction was allowed to warm to room temperature with stirring for ~16 hours. The solution was then heated to reflux and maintained for ~1.5 hours. The solution was cooled and a solid precipitated. The crude solid was isolated and air dried at room temperature to afford 14.86 g (79% crude yield) of a light yellow powder. The solid exhibited a sharp endothermic peak at 193.35° C. as determined by differential scanning calorimetry (DSC) at a heating rate of 10° C./min. Recrystallization from ~50% aqueous ethanol afforded a light green powder (13.45 g, 72% yield) exhibiting a sharp endothermic peak at 194.61° C. by DSC. [mp 214–215° C., J. M. Brown and S. Woodward, J. Org. Chem., 1991, 56, 6803].

Step 2

Preparation of (2,6-diamino-4-trifluoromethylphenyl)diphenylphosphine oxide (2,6APPO)

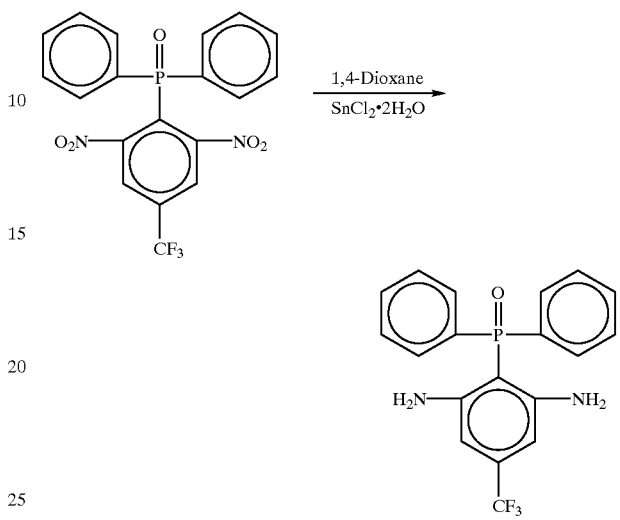

Into a 500 mL Erlenmeyer flask equipped with a stir bar was placed (2,6-dinitro-4-trifluoromethylphenyl)diphenylphosphine oxide (6.48 g, 0.0149 mol) and 1,4-dioxane (100 mL). The mixture was cooled in an ice bath to ~10° C. A solution of stannous chloride dihydrate (31.22 g, 0.1384 mol) in concentrated hydrochloric acid (130 mL) was added dropwise over ~1 hour. Once the addition was complete, the mixture was allowed to warm to room temperature with stirring. After ~16 hours, the crude amine salt was collected via filtration, added to ice water and basified to a pH of ~10 with ammonium hydroxide. The crude solid was isolated by filtration, washed with water, and air dried at room temperature to afford 5.11 g (91% crude yield) of a white powder. The solid exhibited a sharp endothermic peak at 172° C. as determined by differential scanning calorimetry (DSC) at a heating rate of 10° C./min. Recrystallization from ~50% aqueous ethanol afforded tan plates (3.86 g, 69% yield) exhibiting a sharp endothermic peak at 174.17° C. by DSC.

Example 8

Preparation of [2,5-bis(3,4-dicarboxylphenoxy)phenyl]diphenylphosphine oxide dianhydride (PPODA-1)

Step 1

Preparation of [2,5-bis(3,4-dicyanophenoxy)phenyl]diphenylphosphine oxide

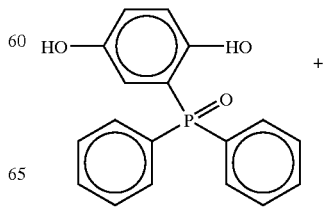 +

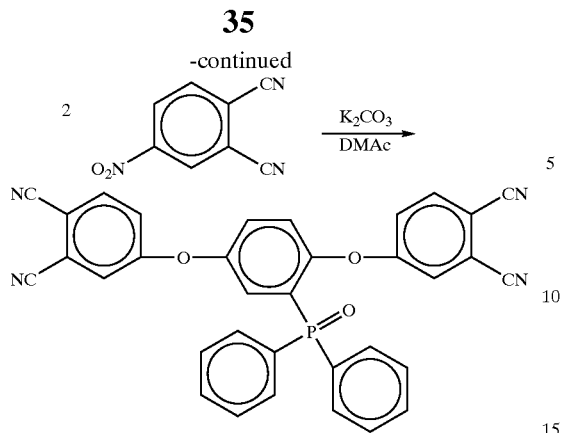

Into a 250 mL three neck round bottomed flask equipped with a mechanical stirrer, nitrogen gas inlet, and drying tube was place 4-nitrophthalonitrile (9.9 g, 0.0572 mol), 2,5-dihydroxyphenyldiphenylphosphine oxide (8.87 g, 0.0286 mol), and N,N-dimethylformamide (DMAc, 100 mL). The mixture was stirred for 15 minutes at room temperature and then pulverized anhydrous potassium carbonate (9.89 g, 0.0715 mol, 2.5 eq.) was added. The reaction mixture was stirred at room temperature for 24 hours. The reddish-brown reaction mixture was poured into ~700 mL of stirred water and the resulting off-white precipitate was collected and washed with water. The solid was stirred in 100 mL of methanol for 10 minutes and was collected and dried for 2 hours in a vacuum oven at 100° C.

Step 2

Preparation of [2,5-bis(3,4-dicarboxyphenoxy)phenyl]diphenylphosphine oxide

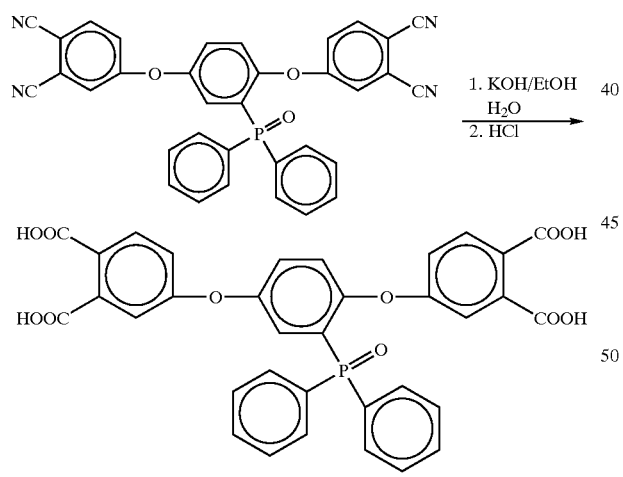

Into a 250 mL round bottom flask equipped with a magnetic stirrer was placed [2,5-bis(3,4-dicyanophenoxy)phenyl]diphenylphosphine oxide (11.24 g, 0.0213 mol), EtOH (30 mL), potassium hydroxide (11.32 g, 0.1715 mol), and water (30 mL). A condenser was placed on the flask and the mixture was heated to reflux for 24 hours. The reaction was cooled and the ethanol was removed under reduced pressure. The aqueous solution was poured into stirred aqueous HCl and the resulting precipitate was collected and stirred in 1 L of refluxing water. The off-white solid was collected and dried for 2 hours in a vacuum oven at 150° C.

(12.19 g, 90% yield). The solid exhibited a broad melting point of 212–218° C. as determined by DSC at 10° C./min.

Step 3

Preparation of 4,4'-(2,5-diphenylphosphineoxidephenylenedioxy)diphthalic anhydride (PPODA-1)

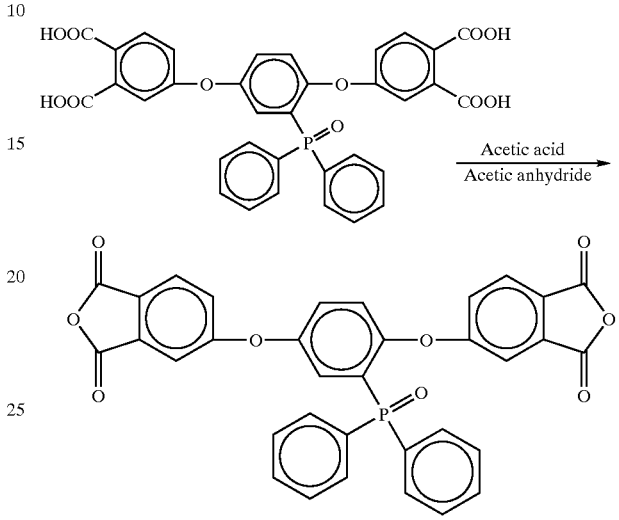

Into a 100 mL round bottom flask equipped with a magnetic stirrer and reflux condenser fitted with a nitrogen gas inlet was placed [2,5-bis(3,4-dicarboxyphenoxy)phenyl] diphenylphosphine oxide (12.19 g, 0.0191 mol), glacial acetic acid (25 mL), and acetic anhydride (25 mL). The mixture was heated to reflux for 14 hours. The reaction was cooled and a fine off-white crystalline solid formed after several hours. The solid was collected, taken up in hot glacial acetic acid, treated with charcoal, and filtered. A white crystalline solid formed after several hours of standing undisturbed. The solid was collected and dried for 4 hours in a vacuum oven at 130° C. (7.19 g, 62%). The solid exhibited a broad melting point of 141–146° C. as determined by DSC at a heating rate of 10° C./min.

Example 9

Preparation of 4,4'-bis(3,4-dicarboxyphenoxy) phenylphosphine oxide dianhydride (PPODA-2)

Step 1

Preparation of 4,4'-Bis(3,4-dicyanophenoxy) phenylphosphine oxide

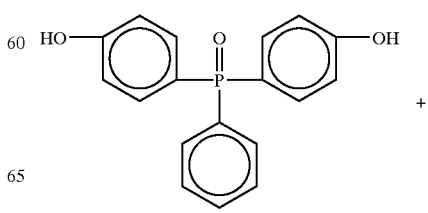

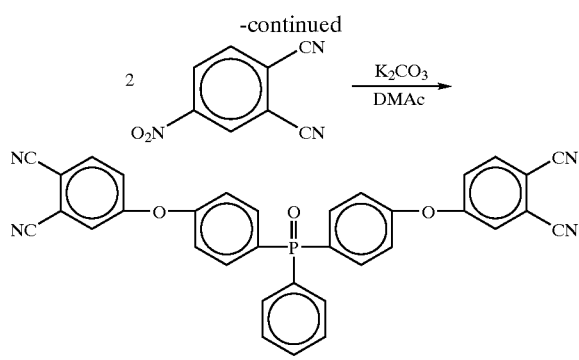

Into a 500 mL three neck round bottomed flask equipped with a mechanical stirrer, nitrogen gas inlet, and drying tube filled with calcium sulfate was place 4-nitrophthalonitrile (22.32 g, 0.1289 mol), bis(4-hydroxyphenyl)phenyl phosphine oxide (20.0 g, 0.0645 mol), and N,N-dimethylacetamide (DMAc, 200 mL). The mixture was stirred for 15 minutes at room temperature and then pulverized anhydrous potassium carbonate (22.29 g, 0.1613 mol, 2.5 eq.) was added. The reaction mixture was heated to 150° C. for 12 hours. The dark reaction mixture was poured into ~1200 mL of stirred water and the resulting green precipitate was collected and washed with water. The solid was stirred in refluxing isopropanol and filtered. A solid formed in the yellow filtrate upon cooling. The yellow solid was collected and dried for 2 hours in a vacuum oven at 125° C.

Step 2

Preparation of 4,4'-bis(3,4-dicarboxyphenoxy) phenylphosphine oxide

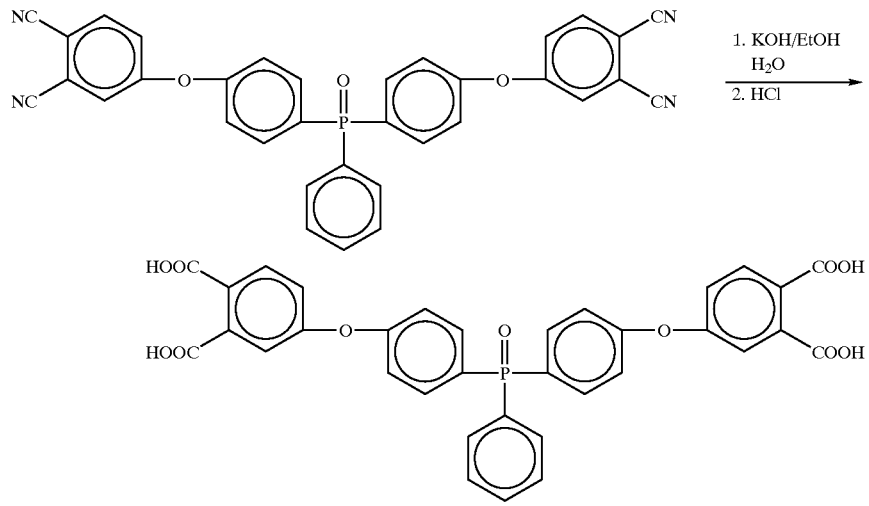

Into a 250 mL round bottom flask equipped with a magnetic stirrer was placed 4,4'-Bis(3,4-dicyanophenoxy) phenylphosphine oxide (12.0 g, 0.0213 mol), EtOH (30 mL), potassium hydroxide (11.32 g, 0.1715 mol), and water (30 mL). A condenser was placed on the flask and the mixture was heated to reflux for 24 hours. The reaction was cooled and the ethanol was removed under reduced pressure. The aqueous solution was poured into stirred aqueous HCl and the resulting precipitate was collected and stirred in 1 L of refluxing water. The solid was collected and dried for 2 hours in a vacuum oven at 150° C.

Step 3

Preparation of 4,4'-bis(3,4-dicarboxyphenoxy) phenylphosphine oxide dianhydride

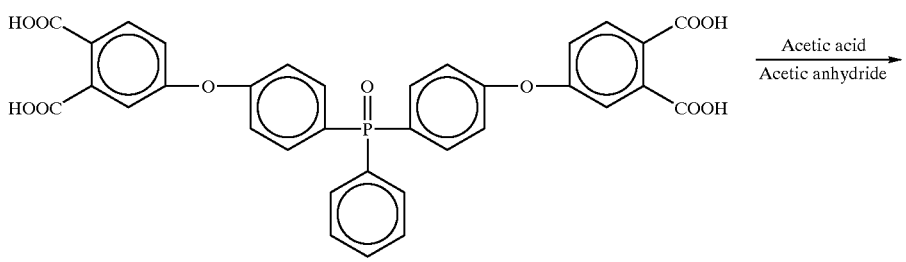

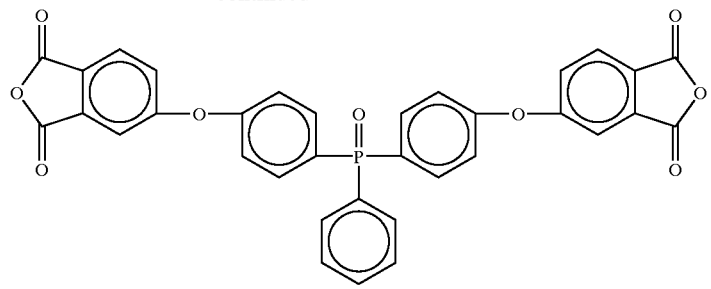

Into a 100 mL round bottom flask equipped with a magnetic stirrer and reflux condenser fitted with a nitrogen gas inlet was placed 4,4'-bis(3,4-dicarboxyphenoxy) phenylphosphine oxide (10.0 g, 0.0157 mol), glacial acetic acid (25 mL), and acetic anhydride (25 mL). The mixture was heated to reflux for 14 hours. The reaction was cooled and a crystalline solid formed after several hours. The solid was collected, taken up in hot glacial acetic acid, treated with charcoal, and filtered. A crystalline solid formed after several hours of standing undisturbed. The solid was collected and dried for 4 hours in a vacuum oven at 130° C.

Example 10

Preparation of Polyimide from 4,4'-perfluoroisopropylidiene dianhydride and [2,4-bis(3-aminophenoxy)phenyl]diphenylphosphine oxide Using 1:1 Stoichiometry

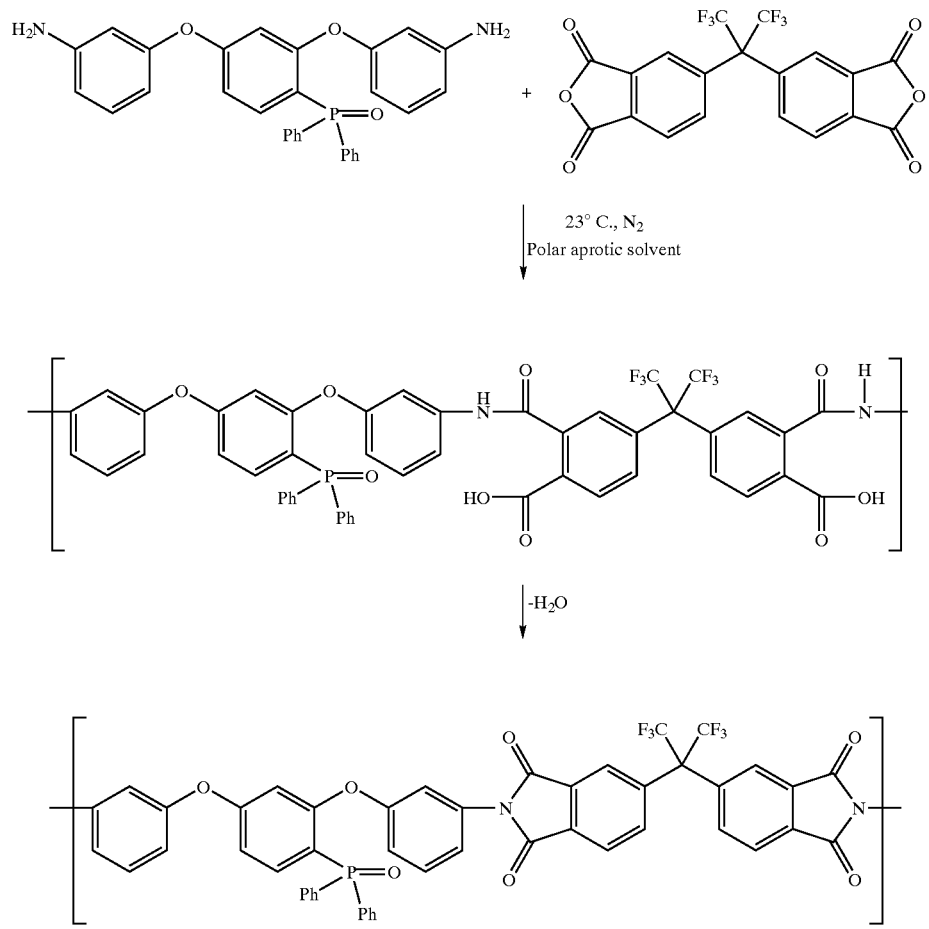

Into a 100 mL three neck round bottom flask equipped with a mechanical stirrer, nitrogen gas inlet and drying tube filled with calcium sulfate was placed [2,4-bis(3-aminophenoxy)phenyl]diphenylphosphine oxide (3-APPO, 2.0367 g, 4.1353×10$^{-3}$ mol) and NMP (8.0 mL). Once dissolved, perfluoroisopropylidiene dianhydride (1.8371 g, 4.1353×10$^{-3}$ mol) was added along with additional NMP (7.0 mL) to give a solution with a concentration of 20% solids. The light yellow solution was stirred overnight at room temperature under a nitrogen atmosphere. A 0.5% (w/v) solution in NMP exhibited an inherent viscosity of 0.66 dL/g at 25° C. The remaining polymer solution was chemically imidized by the addition of 1.27 g of acetic anhydride and 0.98 g of pyridine. The solution was stirred at room temperature overnight. The polymer was precipitated in a blender containing a 50/50 mixture of water/methanol, filtered, washed with excess water and dried in a vacuum oven at 110° C. overnight to afford a white, fibrous material. A film cast from N,N-dimethylacetamide (DMAc) on a glass plate was placed in a forced air oven for 30 minutes each at 75, 100, 125, 150 and 200° C. and one hour each at 225 and 250° C. The transparent colorless film was subsequently removed from the glass. The film exhibited good flexibility and a $T_g$ of 230° C. as determined by DSC at a heating rate of 20° C./min.

Example 11

Preparation of Polyimide from Oxydiphthalic Dianhydride and [2,4-bis(3-aminophenoxy)phenyl]diphenylphosphine oxide Using 1:1 Stoichiometry Into a 100 mL three neck round bottom flask equipped with a mechanical stirrer, nitrogen gas inlet and drying tube filled with calcium sulfate was placed the diamine (2.3768 g, 4.8258×10$^{-3}$ mole) and NMP (7.0 mL). Once dissolved oxydiphthalic dianhydride (1.4970 g, 4.8258×10$^{-3}$ mole) was added along with additional NMP (8.0 mL) to give a solution with a concentration of 20% (w/v) solids. The light orange solution was stirred overnight at room temperature under a nitrogen atmosphere. A 0.5% solution in NMP exhibited an inherent viscosity of 1.01 dL/g at 25° C. The remaining polymer solution was chemically imidized by the addition of 1.49 g of acetic anhydride and 1.15 g of pyridine. The solution was stirred at room temperature overnight. The polymer was precipitated in a blender containing a 50/50 mixture of water/methanol, filtered, washed with excess water and dried in a vacuum oven at 110° C. overnight to afford a white, fibrous material. A film cast from DMAc (12% solids w/w) onto plate glass using a doctor blade was allowed to dry to a tack-free state in a dust free chamber. The film on the glass plate was placed in a forced air oven for 30 minutes each at 75, 100, 125, 150 and 200° C. and one hour each at 225 and 250° C. The transparent colorless film was subsequently removed from the glass. The film exhibited good flexibility and a $T_g$ of 212° C. as DSC at a heating rate of 20° C./min.

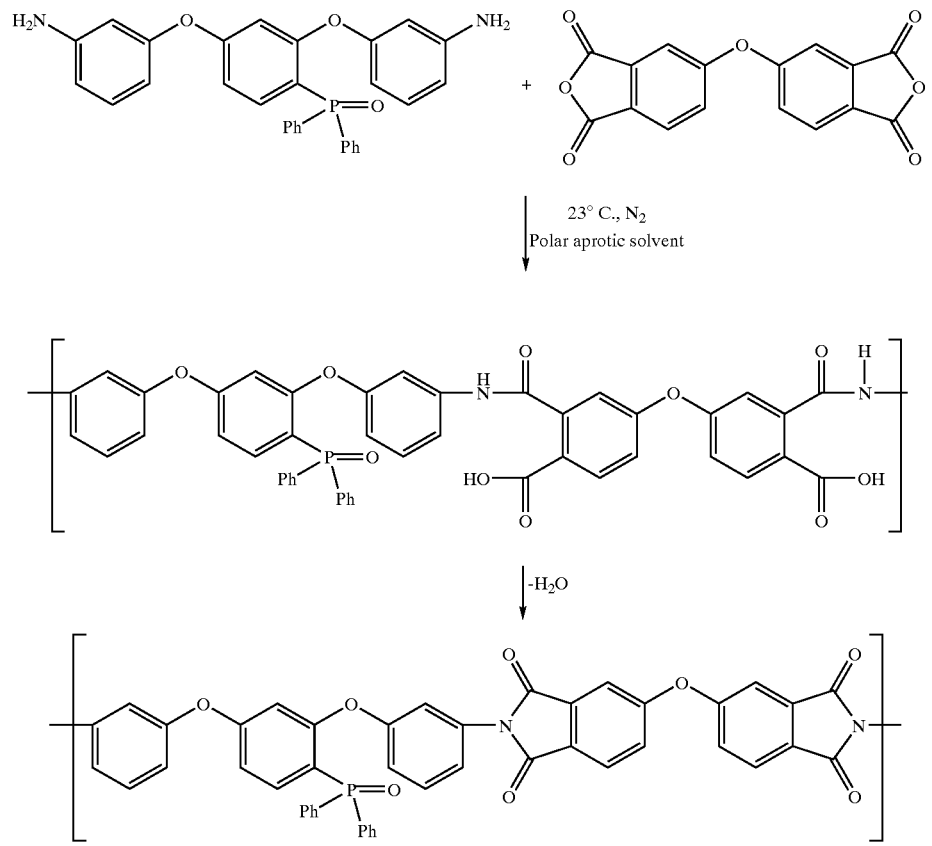

Example 12

Preparation of Polyimide from 4,4'-biphenoxy dianhydride and [2,4-bis(3-aminophenoxy)phenyl] diphenylphosphine oxide Using 1:1 Stoichiometry

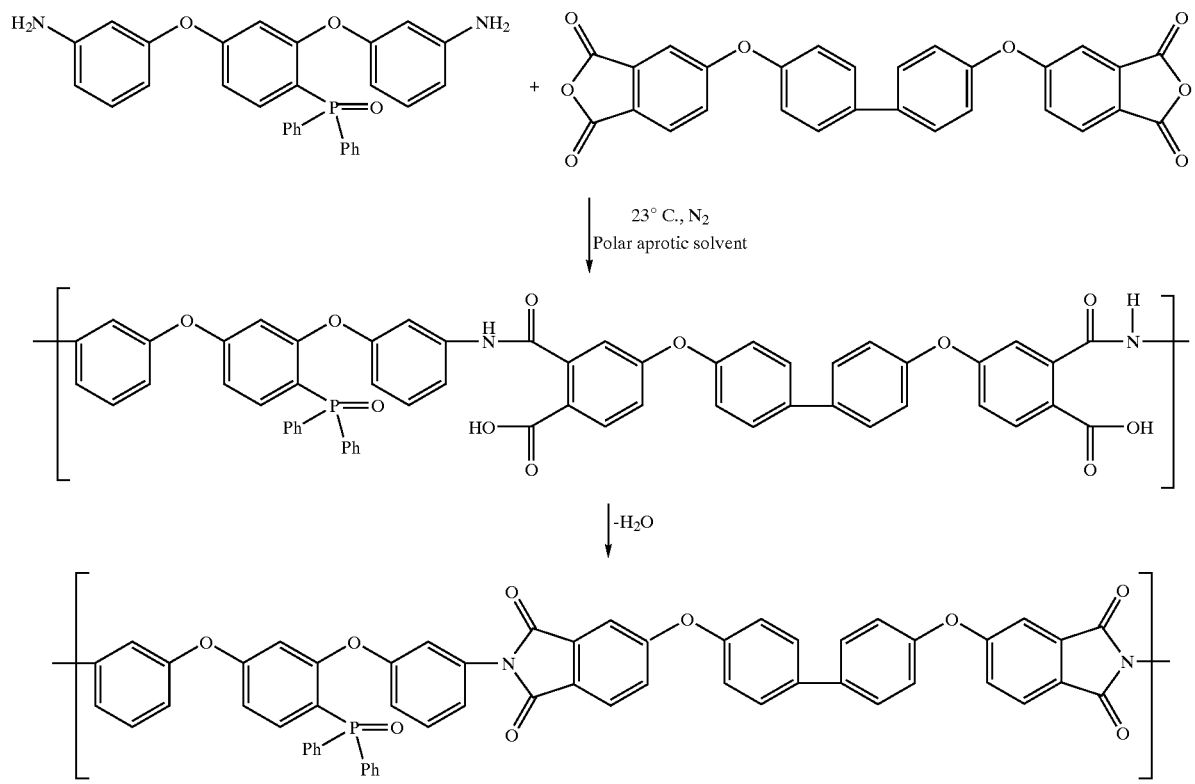

Into a 100 mL three neck round bottom flask equipped with a mechanical stirrer, nitrogen gas inlet, and drying tube filled with calcium sulfate was placed the diamine (2.8200 g, 5.3197×10$^{-3}$ mole) and NMP (10.0 mL). Once dissolved 4,4'-biphenoxy dianhydride (2.5450 g, 5.3197×10$^{-3}$ mole) was added along with additional NMP (10.0 mL) to give a solution with a concentration of 20% solids. The light orange solution was stirred overnight at room temperature under a nitrogen atmosphere. A 0.5% (w/v) solution in NMP exhibited an inherent viscosity of 0.81 dL/g at 25° C. The remaining polymer solution was chemically imidized by the addition of 1.68 g of acetic anhydride and 1.29 g of pyridine. The solution was stirred at room temperature overnight. The polymer was precipitated in a blender containing a 50/50 mixture of water/methanol, filtered, washed with excess water and dried in a vacuum oven at 110° C. overnight to afford a white, fibrous material. A film cast from DMAc (12% solids w/w) onto plate glass using a doctor blade was allowed to dry to a tack-free state in a dust free chamber. The film on the glass plate was placed in a forced air oven for 30 minutes each at 75, 100, 125, 150 and 200° C. and one hour each at 225 and 250° C. The transparent colorless film was subsequently removed from the glass. The film exhibited good flexibility and a $T_g$ of 227° C. as determined by DSC at a heating rate of 20° C./min.

Example 13

Preparation of Polyimide from Pyromellitic Dianhydride and [2,4-bis(3-aminophenoxy)phenyl] diphenylphosphine oxide Using 1:1 Stoichiometry

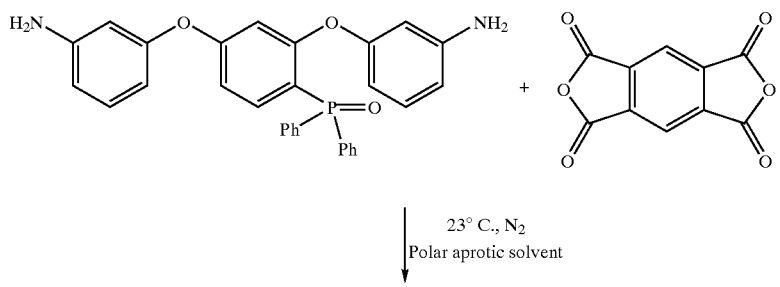

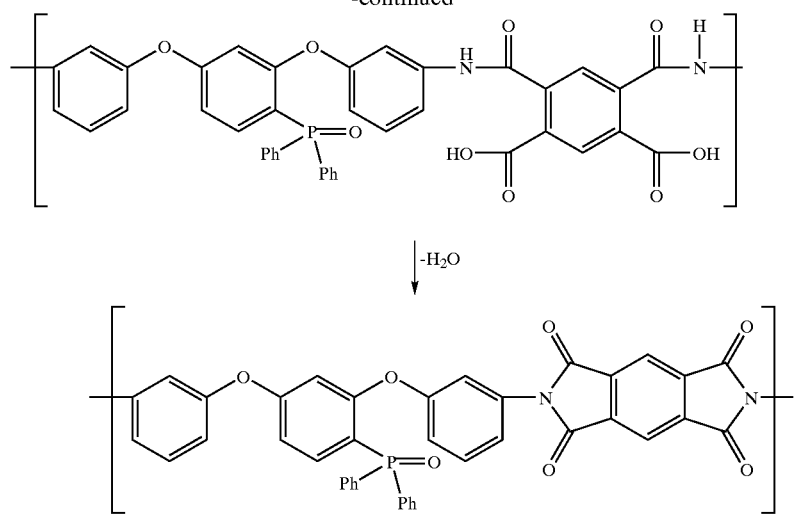

Into a 100 mL three neck round bottom flask equipped with a mechanical stirrer, nitrogen gas inlet and drying tube filled with calcium sulfate was placed the diamine (2.6848 g, $5.4512 \times 10^{-3}$ mole) and NMP (7.0 mL). Once dissolved pyromellitic dianhydride (1.1890 g, $5.4512 \times 10^{-3}$ mole) was added along with additional NMP (8.0 mL) to give a solution with a concentration of 20% solids. The mixture was stirred overnight at room temperature under a nitrogen atmosphere. The orange solution was stirred overnight at room temperature under a nitrogen atmosphere. A 0.5% (w/v) solution in NMP exhibited an inherent viscosity of 0.53 dL/g at 25° C. The remaining polymer solution was chemically imidized by the addition of 1.68 g of acetic anhydride and 1.29 g of pyridine. The solution was stirred at room temperature overnight. The polymer was precipitated in a blender containing a 50/50 mixture of water/methanol, filtered, washed with excess water and dried in a vacuum oven at 110° C. overnight to afford a yellow powder with a $T_g$ of 251° C. as determined by DSC at a heating rate of 20° C./min.

Example 14

Preparation of Polyimide from 3,3',4,4'-biphenyl tetracarboxylic dianhydride and [2,4-bis(3-aminophenoxy)phenyl]diphenylphosphine oxide Using 1:1 Stoichiometry

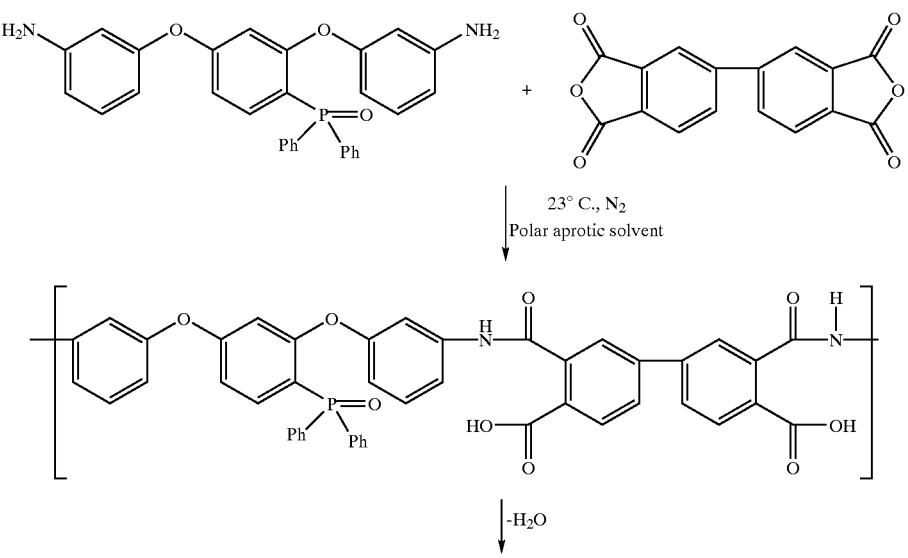

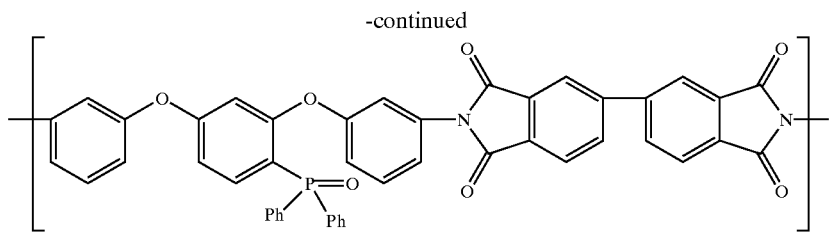

Into a 100 mL three neck round bottom flask equipped with a mechanical stirrer, nitrogen gas inlet and drying tube filled with calcium sulfate was placed the diamine (2.4251 g, 4.9239×10⁻³ mole) and NMP (7.0 mL). Once dissolved, 3,3',4,4'-biphenyl tetracarboxylic dianhydride (1.4487 g, 4.9239×10⁻³ mole) was added along with additional NMP (8.0 mL) to give a solution with a concentration of 20% solids. The light orange solution was stirred overnight at room temperature under a nitrogen atmosphere. A 0.5% (w/v) solution in NMP exhibited an inherent viscosity of 0.97 dL/g at 25° C. The remaining polymer solution was chemically imidized by the addition of 1.49 g of acetic anhydride and 1.15 g of pyridine. The solution was stirred at room temperature overnight. The polymer was precipitated in a blender containing a 50/50 mixture of water/methanol, filtered, washed with excess water and dried in a vacuum oven at 110° C. overnight to afford an off-white, fibrous material. A film cast from DMAc onto plate glass using a doctor blade was allowed to dry to a tack-free state in a dust free chamber. The film on the glass plate was placed in a forced air oven for 30 minutes each at 75, 100, 125, 150 and 200° C. and one hour each at 225 and 250° C. The transparent light-yellow film was subsequently removed from the glass. The film exhibited good flexibility and a $T_g$ of 234° C. as determined by DSC at a heating rate of 20° C./min.

Example 15

Preparation of Random Copolyimide from Oxydiphthalic Dianhydride and 75 Mole % of [2,4-bis(3-aminophenoxy)phenyl]diphenylphosphine oxide and 25 Mole % 1,3-bis(3-aminophenoxy) benzene Using 1:1 Stoichiometry

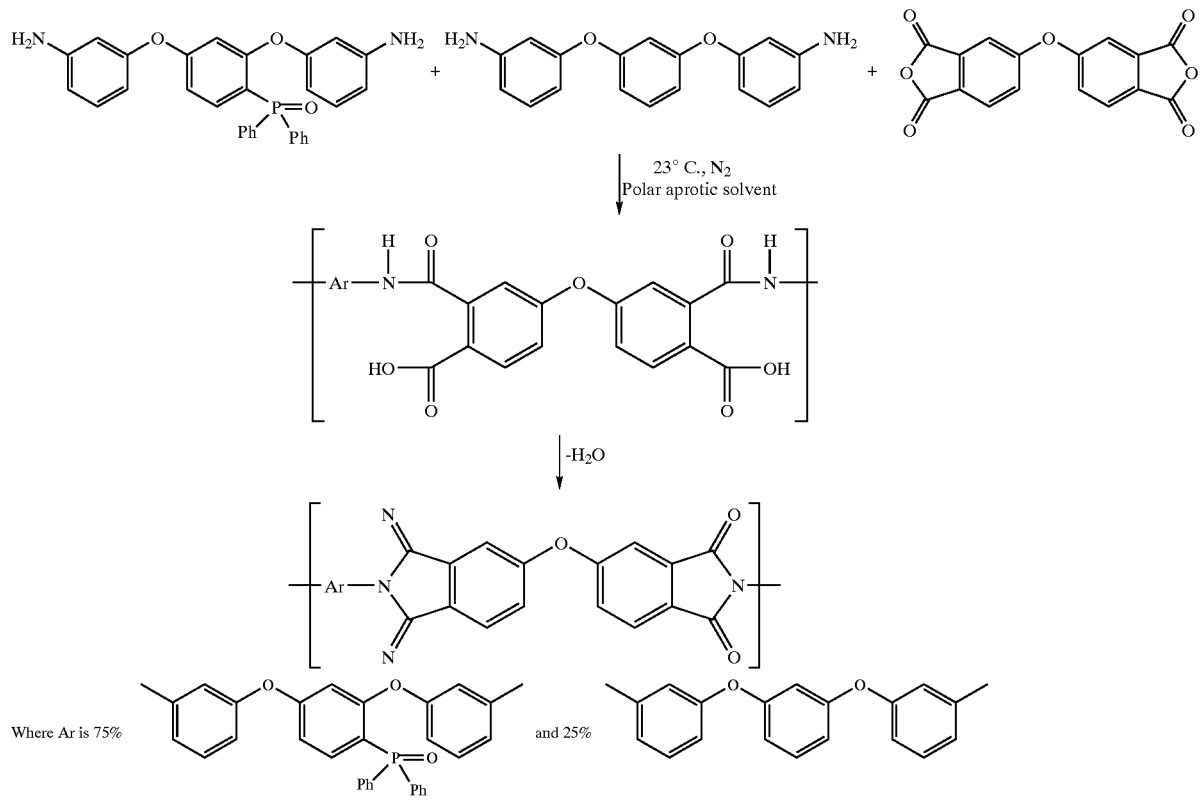

Into a 100 mL three neck round bottom flask equipped with a mechanical stirrer, nitrogen gas inlet and drying tube filled with calcium sulfate was placed [2,4-bis(3-aminophenoxy)phenyl]diphenylphosphine oxide (2.5347 g, 5.1464×10⁻³ mole), 1,3-bis(3-aminophenoxy)benzene (0.5015 g, 1.7155×10⁻³ mole) and NMP (10.0 mL). Once dissolved, oxydiphthalic dianhydride (2.1287 g, 6.8619× 10⁻³ mole) was added along with additional NMP (10.0 mL) to give a solution with a concentration of 20% solids. The light yellow solution was stirred overnight at room temperature under a nitrogen atmosphere. A 0.5% (w/v) solution in NMP exhibited an inherent viscosity of 1.07 dL/g at 25° C. The remaining polymer solution was chemically imidized by the addition of 2.12 g of acetic anhydride and 1.63 g of pyridine. The solution was stirred at room temperature overnight. The polymer was precipitated in a blender containing a 50/50 mixture of water/methanol, filtered, washed with excess water and dried in a vacuum oven at 110° C. overnight to afford a white, fibrous material. A film cast from DMAc onto plate glass using a doctor blade was allowed to dry to a tack-free state in a dust free chamber. The film on the glass plate was placed in a forced air oven for 30 minutes each at 75, 100, 125, 150 and 200° C. and one hour each at 225 and 250° C. The film exhibited good flexibility and a $T_g$ of 203° C. as determined by DSC at a heating rate of 20° C./min.

Example 16

Preparation of Random Copolyimide from Oxydiphthalic Dianhydride, 75 Mole % of [2,4-bis(3-aminophenoxy)phenyl]diphenylphosphine oxide and 25 Mole % of 2,2-bis(4-(4-aminophenoxy)phenyl)hexafluropropane Using 1:1 Stoichiometry Into a 100 mL three neck round bottom flask equipped with a mechanical stirrer, nitrogen gas inlet, and drying tube filled with calcium sulfate was placed [2,4-bis(3-aminophenoxy)phenyl]diphenylphosphine oxide (2.1377 g, 4.340×10$^{-3}$ mole), 2,2-bis(4-(4-aminophenoxy)phenyl)hexafluropropane (0.7501 g, 1.447×10$^{-3}$ mole) NMP (10.0 mL). Once dissolved, oxydiphthalic dianhydride (1.7953 g, 5.787×10$^{-3}$ mole) was added along with additional NMP (10.0 mL) to give a solution with a concentration of 20% solids. The light yellow solution was stirred overnight at room temperature under a nitrogen atmosphere. The polymer solution was chemically imidized by the addition of 1.78 g of acetic anhydride and 1.37 g of pyridine. The solution was stirred at room temperature overnight. The polymer was precipitated in a blender containing water, filtered, washed with excess water and dried in a vacuum oven at 110° C. overnight to afford a white, fibrous material. A 0.5% (w/v) solution NMP exhibited an inherent viscosity of 0.66 dL/g at 25° C. A film cast from DMAc (15% solids w/w) onto plate glass using a doctor blade was allowed to dry to a tack-free state in a dust free chamber. The film on the glass plate was placed in a forced air oven for 30 minutes each at 75, 100, 125, 150 and 200° C. and one hour each at 225 and 250° C. The film exhibited good flexibility and a $T_g$ of 216° C. as determined by DSC at a heating rate of 20° C./min.

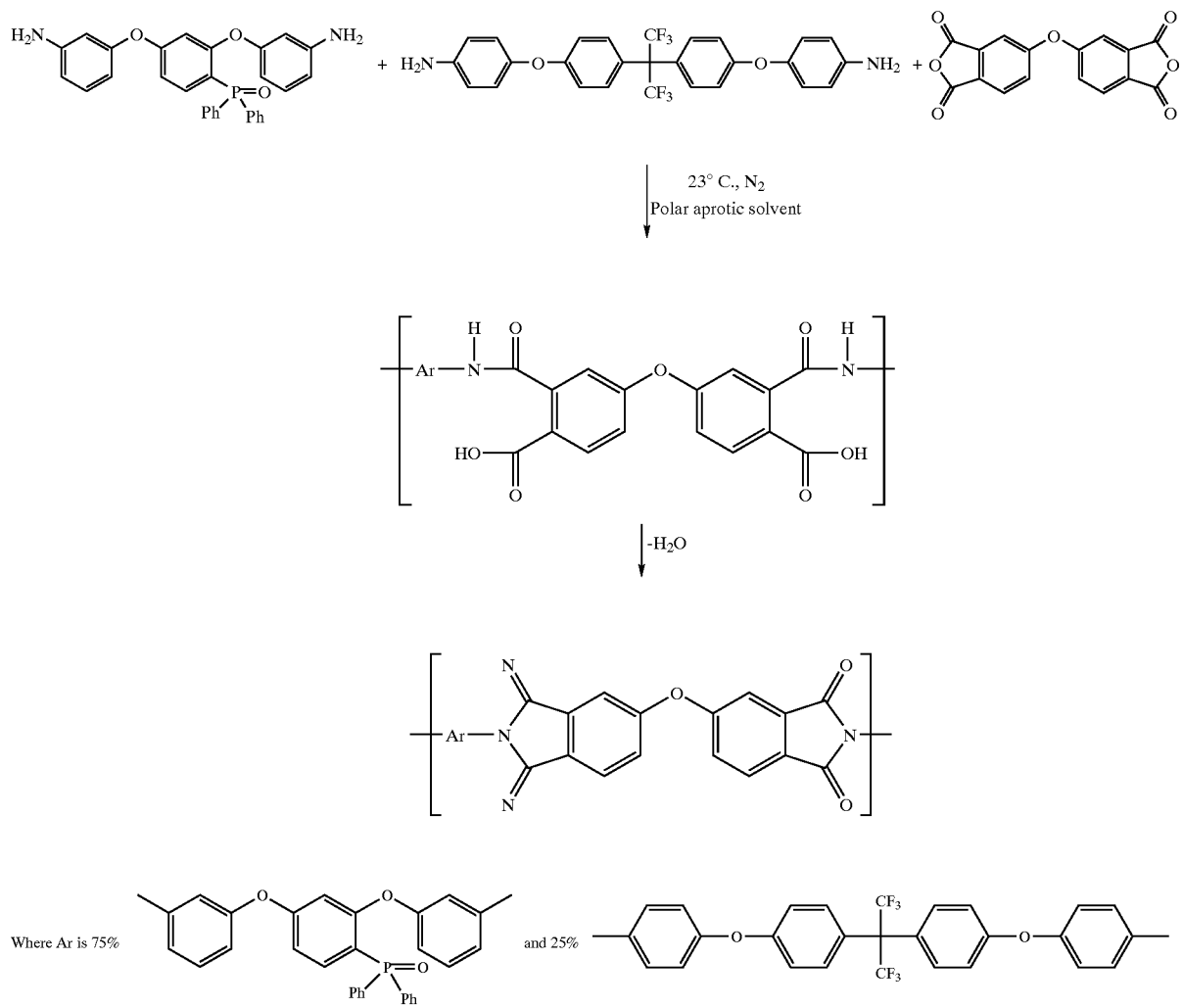

Example 17

Preparation of Random Copolyimide from Oxydiphthalic Dianhydride, 75 Mole % of [2,4-bis(3-aminophenoxy)phenyl]diphenylphosphine oxide and 25 Mole % of 3,4'-oxydianiline Using 1:1 Stoichiometry

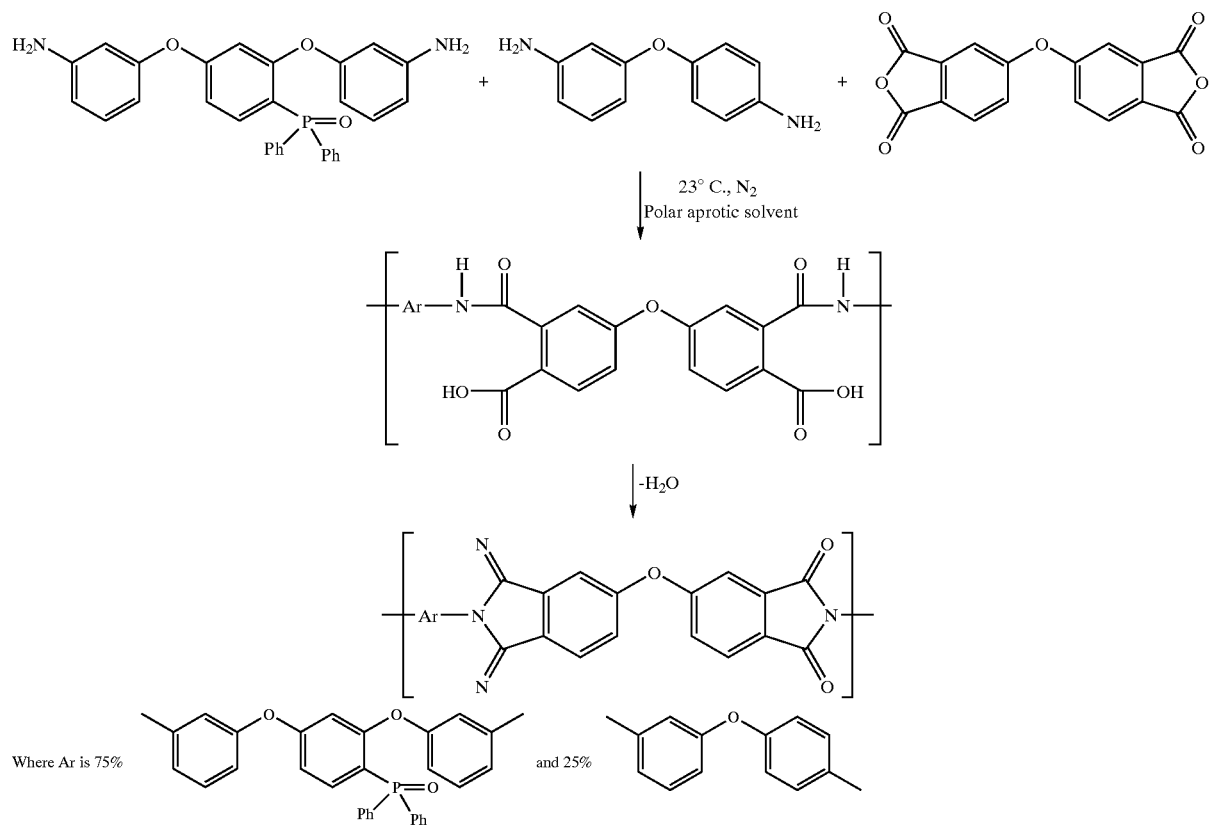

Into a 100 mL three neck round bottom flask equipped with a mechanical stirrer, nitrogen gas inlet and drying tube filled with calcium sulfate was placed [2,4-bis(3-aminophenoxy)phenyl]diphenylphosphine oxide (2.3707 g, $4.814 \times 10^{-3}$ mole 3,4'-oxydianiline (0.3213 g, $1.605 \times 10^{-3}$ mole) and DMAc (10.0 mL). Once dissolved oxydiphthalic dianhydride (1.9910 g, $6.412 \times 10^{-3}$ mole) was added along with additional DMAc (10.0 mL) to give a solution with a concentration of 20% solids weight/volume. The light yellow solution was stirred overnight at room temperature under a nitrogen atmosphere. The polymer solution was chemically imidized by the addition of 1.93 g of acetic anhydride and 1.45 g of pyridine. The solution was stirred at room temperature overnight. The polymer was precipitated in a blender containing water, filtered, washed with excess water and dried in a vacuum oven at 110° C. overnight to afford a white, fibrous material. A 0.5% solution in NMP exhibited an inherent viscosity of 0.57 dL/g at 25° C. A film was cast from DMAc (15% solids w/w) onto a plate glass using a doctor blade was allowed to dry to a tack-free state in a dust free chamber. The film on the glass plate was placed in a forced air oven for 30 minutes each at 75, 100, 125, 150 and 200° C. and one hour each at 225 and 250° C. The film exhibited good flexibility and a $T_g$ of 218° C. as determined by DSC at a heating rate of 20° C./min.

Example 18

Preparation of Random Copolyimide from Oxydiphthalic Dianhydride, 75 Mole % of [2,4-bis(3-aminophenoxy)phenyl]diphenylphosphine oxide and 25 Mole % of 2,2-bis(4-aminophenyl)hexafluoropropane Using 1:1 Stoichiometry

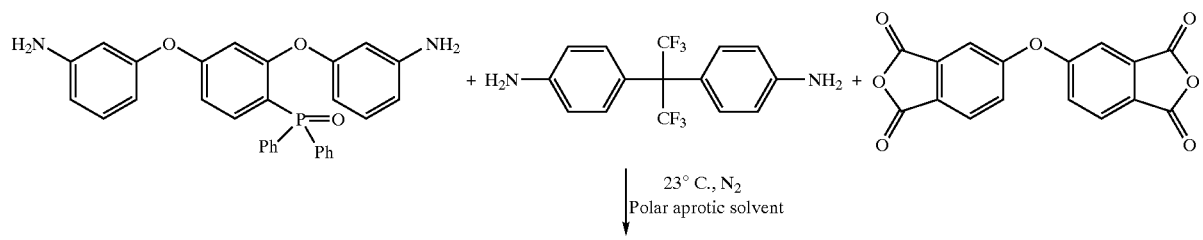

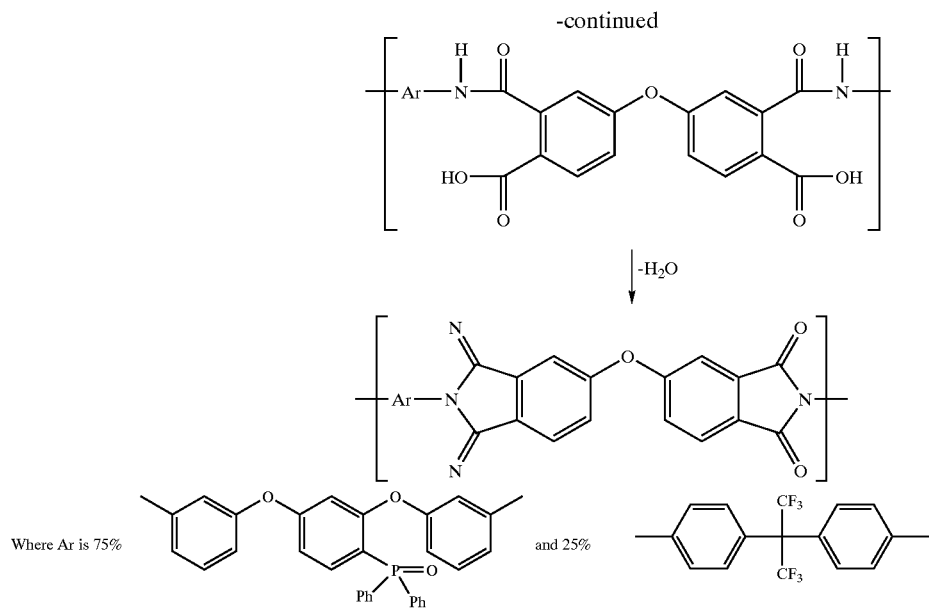

Into a 100 mL three neck round bottom flask equipped with a mechanical stirrer, nitrogen gas inlet and drying tube filled with calcium sulfate was placed [2,4-bis(3-aminophenoxy)phenyl]diphenylphosphine oxide (2.4999 g, $5.076 \times 10^{-3}$ mol), 2,2-bis(4-aminophenyl)hexafluoropropane (0.5656 g, $1.692 \times 10^{-3}$ mole) and NMP (10.0 mL). Once dissolved, oxydiphthalic dianhydride (2.0995 g, $6.768 \times 10^{-3}$ mole) was added along with additional NMP (10.0 mL) to give a solution with a concentration of 20% solids. The light yellow solution was stirred overnight at room temperature under a nitrogen atmosphere. The polymer solution was chemically imidized by the addition of 1.93 g of acetic anhydride and 1.45 g of pyridine. The solution was stirred at room temperature overnight. The polymer was precipitated in a blender containing water, filtered, washed with excess water and dried in a vacuum oven at 110° C. overnight to afford a white, fibrous material. A 0.5% (w/v) solution in NMP exhibited an inherent viscosity of 0.57 dL/g at 25° C. A film cast from DMAc onto plate if glass using a doctor blade was allowed to dry to a tack-free state in a dust free chamber. The film on the glass plate was placed in a forced air oven for 30 minutes each at 75, 100, 125, 150 and 200° C. and one hour each at 225 and 250° C. The film exhibited good flexibility and a $T_g$ of 220° C. as determined by DSC at a heating rate of 20° C./min.

Example 19

Preparation of Random Copolyimide from Oxydiphthalic Dianhydride, 75 Mole % of [2,4-bis(3-aminophenoxy)phenyl]diphenylphosphine oxide and 25 Mole % of bis(4-aminophenoxy)biphenyl Using 1:1 Stoichiometry

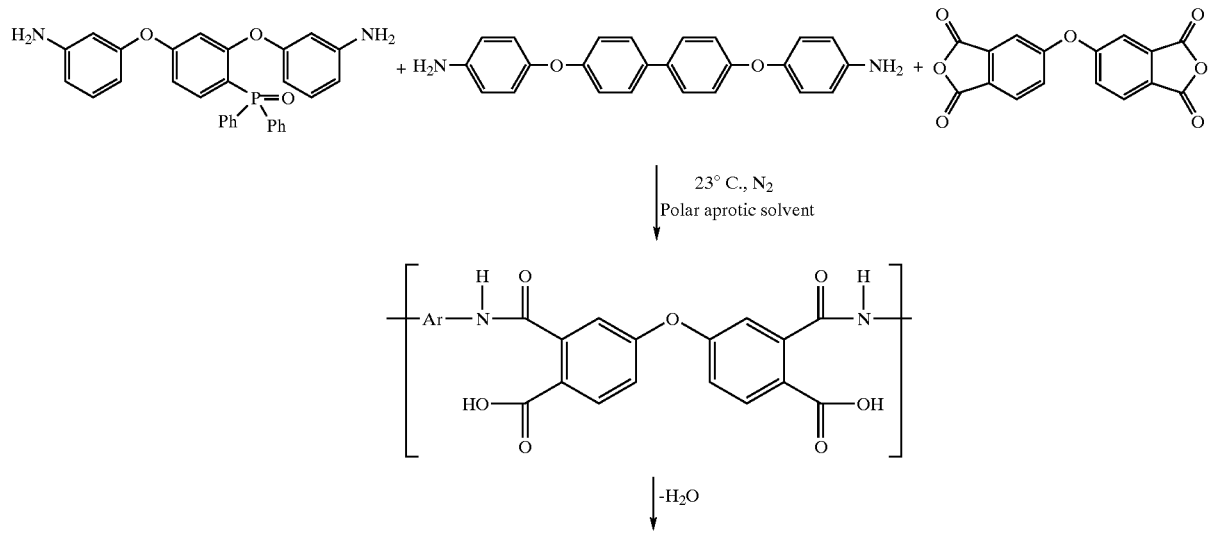

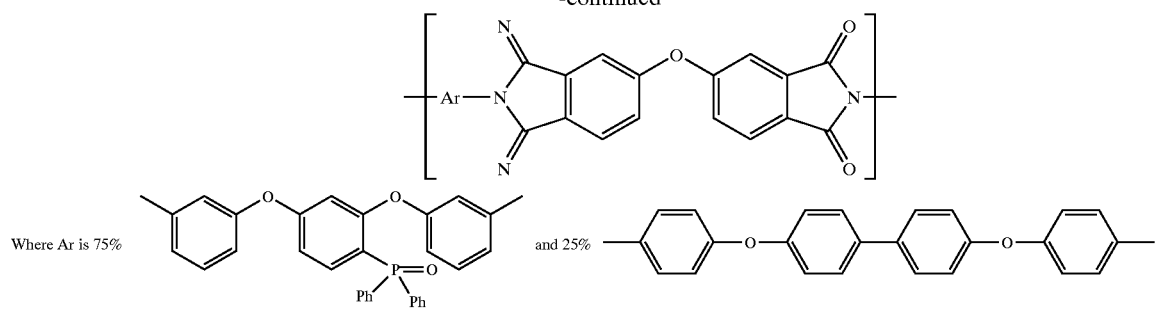

Where Ar is 75% and 25%

Into a 100 mL three neck round bottom flask equipped with a mechanical stirrer, nitrogen gas inlet, and drying tube filled with calcium sulfate was placed [2,4-bis(3-aminophenoxy)phenyl]diphenylphosphine oxide (2.4723 g, 5.020×10$^{-3}$ mole), bis(4-aminophenoxy)biphenyl (0.6165 g, 1.617×10$^{-3}$ mole) and DMAc (10.0 mL). The diamines dissolved within a few minutes and oxydiphthalic dianhydride (2.0763 g, 6.693×10$^{-3}$ mole) was added along with additional DMAc (10.0 mL) to give a solution with a concentration of 20% solids. The light yellow solution was stirred overnight at room temperature under a nitrogen atmosphere. The polymer solution was chemically imidized by the addition of 1.93 g of acetic anhydride and 1.45 g of pyridine. The solution was stirred at room temperature overnight. The polymer was precipitated in a blender containing water, filtered, washed with excess water and dried in a vacuum oven at 110° C. overnight to afford a white, fibrous material. A 0.5% (w/v) solution NMP exhibited an inherent viscosity of 0.73 dL/g at 25° C. A film cast from DMAc (15% solids w/w) onto plate glass using a doctor blade was allowed to dry to a tack-free state in a dust free chamber. The film on the glass plate was placed in a forced air oven for 30 minutes each at 75, 100, 125, 150 and 200° C. and one hour each at 225 and 250° C. The film exhibited good flexibility and a $T_g$ of 222° C. as determined by DSC at a heating rate of 20° C./min.

Example 20

Preparation of Random Copolyimide from 4,4'-perfluoroisopropylidene dianhydride, 75 Mole % of [2,4-bis(3-aminophenoxy)phenyl]diphenylphosphine oxide and 25 Mole % of 1,3-bis(3-aminophenoxy)benzene Using 1:1 Stoichiometry

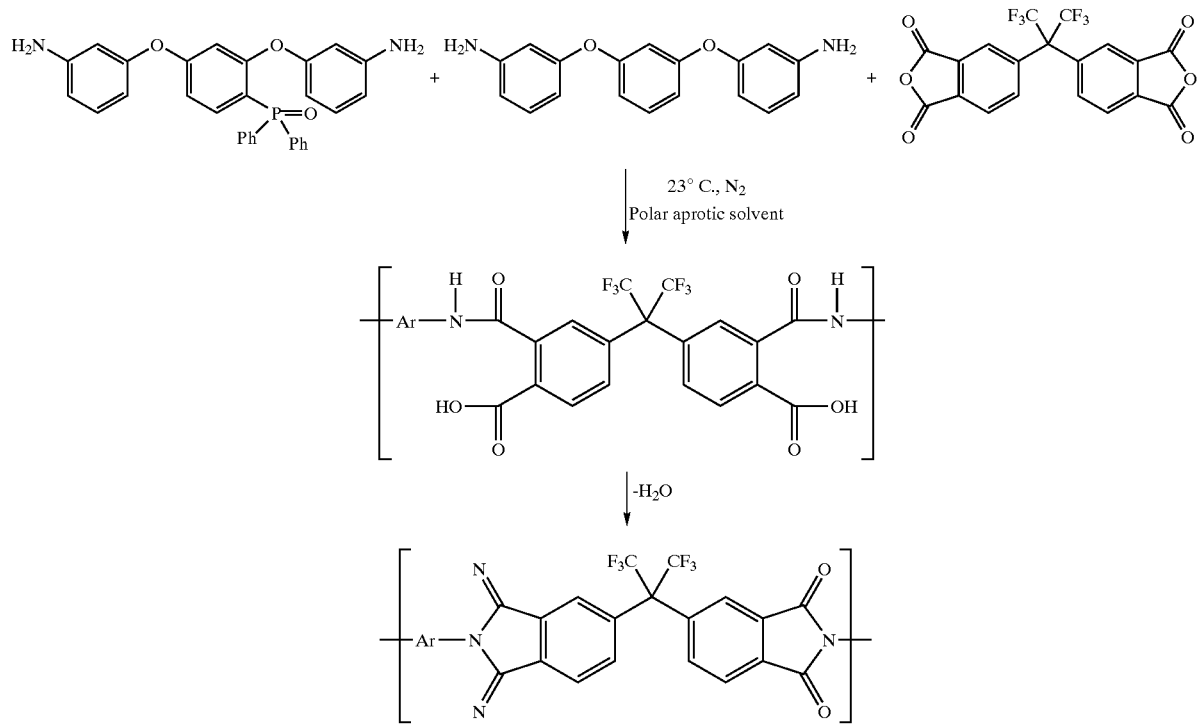

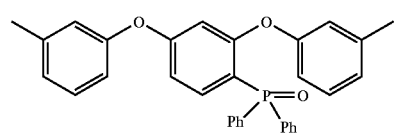
Where Ar is 75%

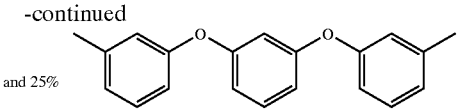
and 25%

Into a 100 mL three neck round bottom flask equipped with a mechanical stirrer, nitrogen gas inlet, and drying tube filled with calcium sulfate was placed [2,4-bis(3-aminophenoxy)phenyl]diphenylphosphine oxide (2.1516 g, $4.369 \times 10^{-3}$ mole), 1,3-bis(3-aminophenoxy)benzene (0.4257 g, $1.456 \times 10^{-3}$ mole) and DMAc (10.0 mL). The diamines dissolved within a few minutes and 4,4'-perfluoroisopropylidiene dianhydride (2.5877 g, $5.824 \times 10^{-3}$ mole) was added along with additional DMAc (10.0 mL) to give a solution with a concentration of 20% solids. The light yellow solution was stirred overnight at room temperature under a nitrogen atmosphere. The polymer solution was chemically imidized by the addition of 1.93 g of acetic anhydride and 1.45 g of pyridine. The solution was stirred at room temperature overnight. The polymer was precipitated in a blender containing water, filtered, washed with excess water and dried in a vacuum oven at 110° C. overnight to afford a white, fibrous material. A 0.5% (w/v) solution in NMP exhibited an inherent viscosity of 0.53 dL/g at 25° C.

A film cast from DMAc (15% solids w/w) onto plate glass using a doctor blade was allowed to dry to a tack-free state in a dust free chamber. The film on the glass plate was placed in a forced air oven for 30 minutes each at 75, 100, 125, 150 and 200° C. and one hour each at 225 and 250° C. The film exhibited good flexibility and a $T_g$ of 224° C. as determined by DSC at a heating rate of 20° C./min.

Example 21

Preparation of Random Copolyimide from Oxydiphthalic Dianhydride, 75 Mole % of [2,4-bis(3-aminophenoxy)phenyl]diphenylphosphine oxide and 25 Mole % 9,9-bis(4-aminophenyl)fluorene Using 1:1 Stoichiometry

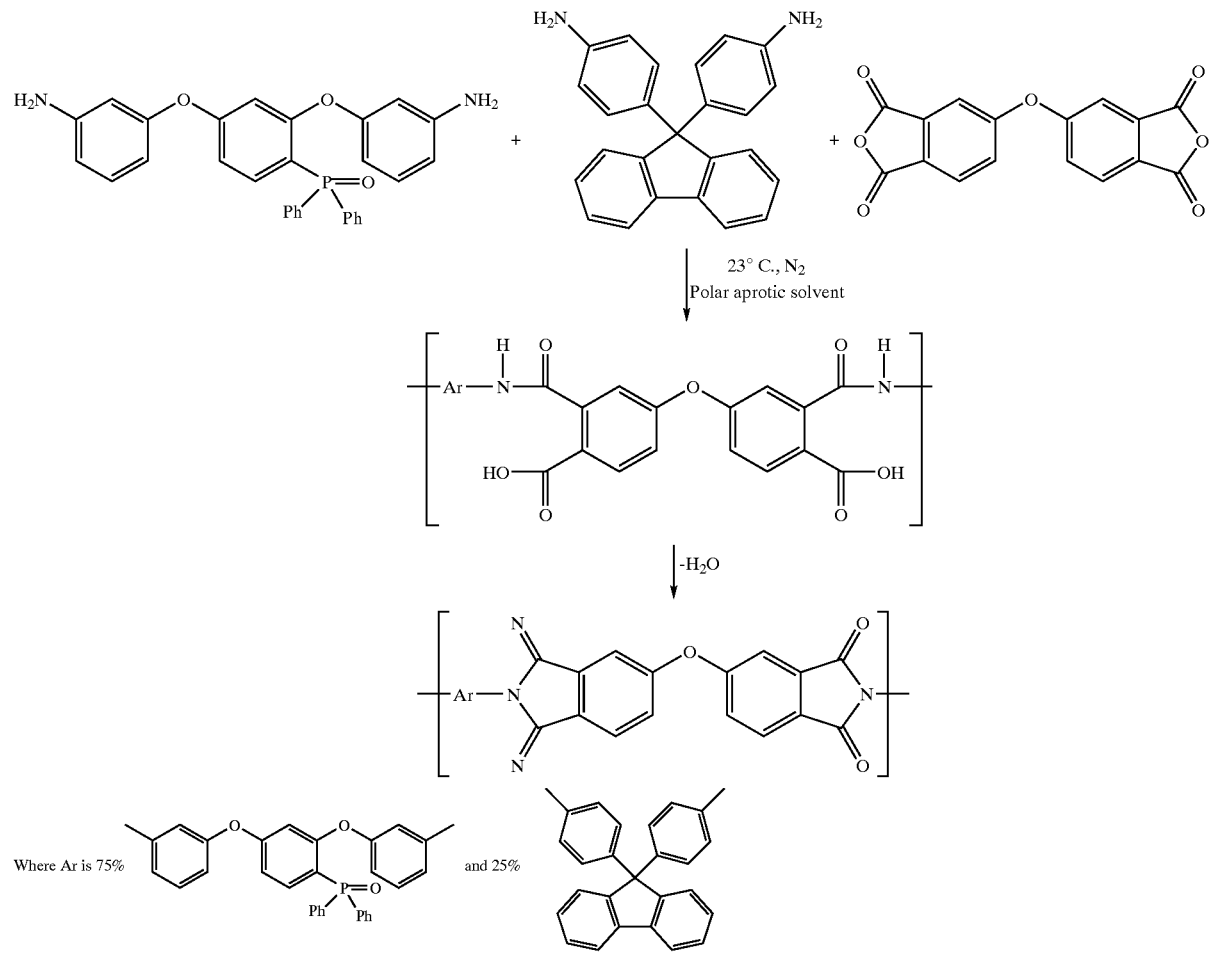

Into a 100 mL three neck round bottom flask equipped with a mechanical stirrer, nitrogen gas inlet, and drying tube filled with calcium sulfate was placed [2,4-bis(3- aminophenoxy)phenyl]diphenylphosphine oxide (2.2562 g, 4.581×10$^{-3}$ mole), 9,9-bis(4-aminophenyl)fluorene (0.5321 g, 1.527×10$^{-3}$ mole) and DMAc (10.0 mL). Once dissolved, oxydiphthalic dianhydride (1.8945 g, 6.107×10$^{-3}$ mole) was added along with additional DMAc (10.0 mL) to give a solution with a concentration of 20% solids. The light yellow solution was stirred overnight at room temperature under a nitrogen atmosphere. The polymer solution was chemically imidized by the addition of 1.93 g of acetic anhydride and 1.45 g of pyridine. The solution was stirred at room temperature overnight. The polymer was precipitated in a blender containing water, filtered, washed with excess water and dried in a vacuum oven at 110° C. overnight to afford a white, fibrous material. A 0.5% (w/v) solution in NMP exhibited an inherent viscosity of 0.39 dL/g at 25° C. A film cast from DMAc (15% solids w/w) onto plate glass using a doctor blade was allowed to dry to a tack-free state in a dust free chamber. The film on the glass plate was placed in a forced air oven for 30 minutes each at 75, 100, 125, 150 and 200° C. and one hour each at 225 and 250° C. The film exhibited a $T_g$ of 226° C. as determined by DSC at a heating rate of 20° C./min.

Example 22

Preparation of Random Copolyimide from Oxydiphthalic Dianhydride, 75 Mole % of [2,4-bis (3-aminophenoxy)phenyl]diphenylphosphine oxide and 25 Mole % 2,2'-bis(trifluoromethyl)benzidine Using 1:1 Stoichiometry Into a 100 mL three neck round bottom flask equipped with a mechanical stirrer, nitrogen gas inlet, and drying tube filled with calcium sulfate was placed [2,4-bis(3-aminophenoxy)phenyl]diphenylphosphine oxide (2.5035 g, 5.083×10$^{-3}$ mole), bis(trifluoromethyl)benzidine (0.5438 g, 1.694×10$^{-3}$ mole) and DMAc (10.0 mL). Once dissolved, oxydiphthalic dianhydride (2.1025 g, 6.777×10$^{-3}$ mole) was added along with additional DMAc (10.0 mL) to give a solution with a concentration of 20% solids. The light yellow solution was stirred overnight at room temperature under a nitrogen atmosphere. The polymer solution was chemically imidized by the addition of 1.93 g of acetic anhydride and 1.45 g of pyridine. The solution was stirred at room temperature overnight. The polymer was precipitated in a blender containing water, filtered, washed with excess water and dried in a vacuum oven at 110° C. overnight to afford a white, fibrous material. A 0.5% (w/v) solution NMP exhibited an inherent viscosity of 0.46 dL/g at 25° C. A film cast from DMAc (15% solids w/w) onto plate glass using a doctor blade was allowed to dry to a tack-free state in a dust free chamber. The film on the glass plate was placed in a forced air oven for 30 minutes each at 75, 100, 125, 150 and 200° C. and one hour each at 225 and 250° C. The film exhibited a $T_g$ of 227° C. as determined by DSC at a heating rate of 20° C./min.

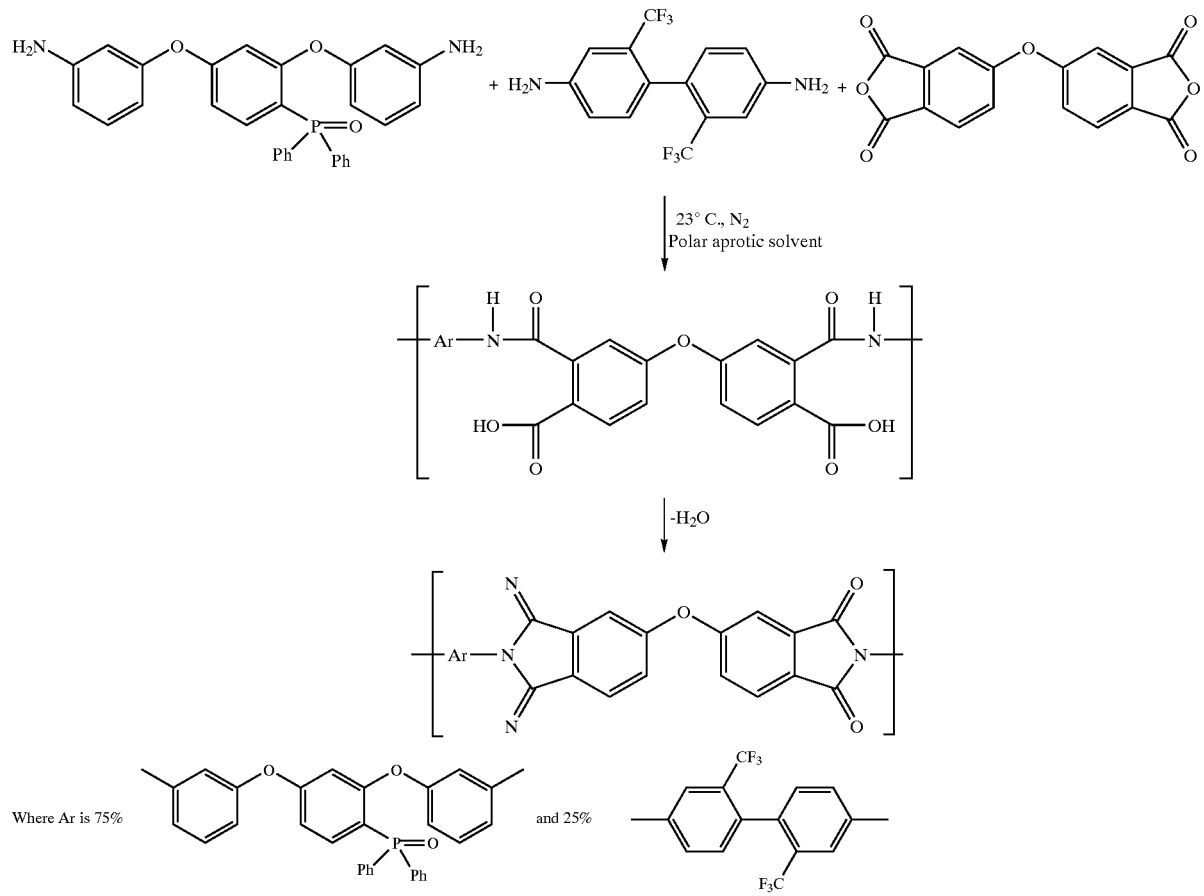

Example 23

Preparation of Random Copolyimide from 4,4'-perfluoroisopropylidene dianhydride, 75 Mole % of [2,4-bis(3-aminophenoxy)phenyl]diphenylphosphine oxide and 25 Mole % of 2,2'-bis(trifluoromethyl)benzidine Using 1:1 Stoichiometry

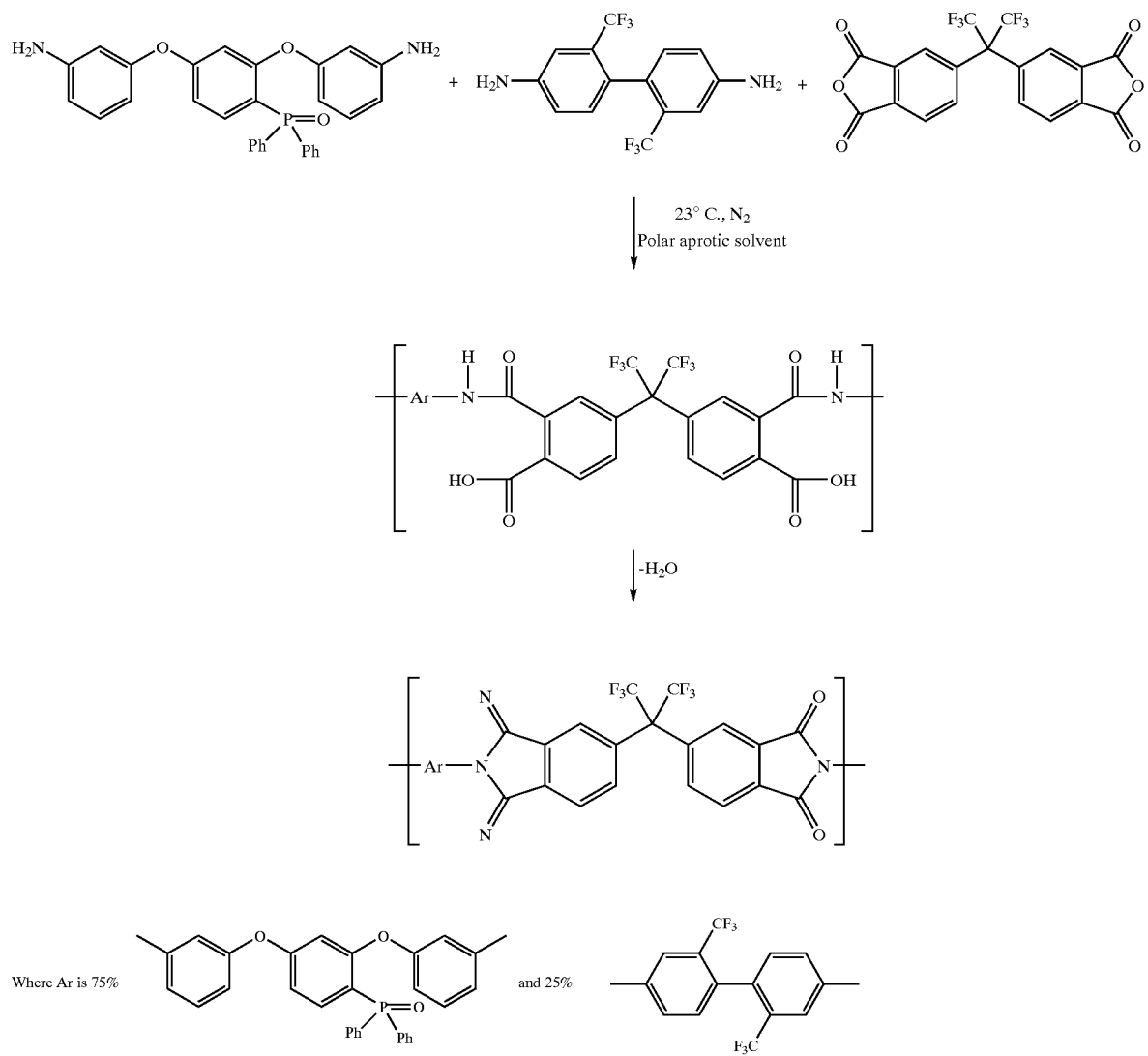

Into a 100 mL three neck round bottom flask equipped with a mechanical stirrer, nitrogen gas inlet, and drying tube filled with calcium sulfate was placed [2,4-bis(3-aminophenoxy)phenyl]diphenylphosphine oxide (2.1344 g, $4.337 \times 10^{-3}$ mole), 2,2'-bis(trifluoromethyl)benzidine (0.4636 g, $1.445 \times 10^{-3}$ mole) and DMAc (10.0 mL). Once dissolved 4,4'-perfluoroisopropylidene dianhydride (2.5670 g, $5.778 \times 10^{-3}$ mole) was added along with DMAc (10.0 mL) to give a solution with a concentration of 20% solids. The light yellow solution was stirred overnight at room temperature under a nitrogen atmosphere. The polymer solution was chemically imidized by the addition of 1.67 g of acetic anhydride and 1.28 g of pyridine. The solution was stirred at room temperature overnight. The polymer was precipitated in a blender containing water, filtered, washed with excess water and dried in a vacuum oven at 110° C. overnight to afford a white, fibrous material. A 0.5% (w/v) solution NMP exhibited an inherent viscosity of 0.34 dL/g at 25° C. A film cast from DMAc (15% solids w/w) onto plate glass using a doctor blade was allowed to dry to a tack-free state in a dust free chamber. The film on the glass plate was placed in a forced air oven for 30 minutes each at 75, 100, 125, 150 and 200° C. and one hour each at 225 and 250° C. The film exhibited good flexibility and a $T_g$ of 233° C. as determined by DSC at a heating rate of 20° C./min.

Example 24

Preparation of Random Copolyimide from 4,4'-perfluoroisopropylidene dianhydride, 75 Mole % of [2,4-bis(3-aminophenoxy)phenyl]diphenylphosphine oxide and 25 Mole % of 3,4'-oxydianiline Using 1:1 Stoichiometry

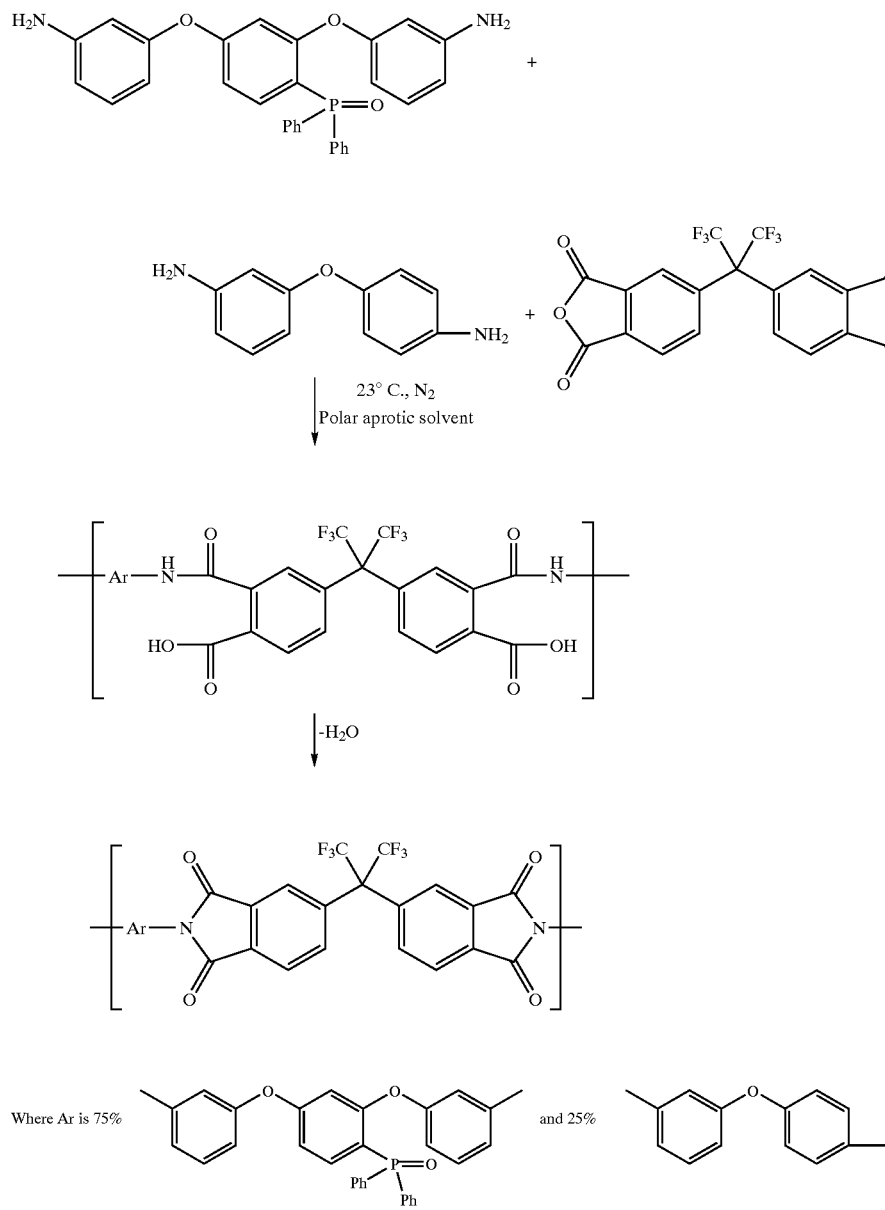

Into a 100 mL three neck round bottom flask equipped with a mechanical stirrer, nitrogen gas inlet and drying tube filled with calcium sulfate was placed [2,4-bis(3-aminophenoxy)phenyl]diphenylphosphine oxide (2.0028 g, $4.067 \times 10^{-3}$ mole), 3,4'-oxydianiline (0.2714 g, $1.356 \times 10^{-3}$ mole) and DMAc (10.0 mL). Once dissolved, 4,4'-perfluoroisopropylidene dianhydride (2.4087 g, $5.5422 \times 10^{-3}$ mole) was added along with additional DMAc (10.0 mL) to give a solution with a concentration of 20% solids. The light yellow solution was stirred overnight at room temperature under a nitrogen atmosphere. The polymer solution was chemically imidized by the addition of 1.67 g of acetic anhydride and 1.28 g of pyridine. The solution was stirred at room temperature overnight. The polymer was precipitated in a blender containing water, filtered, washed with excess water and dried in a vacuum oven at 110° C. overnight to afford a white, fibrous material. A 0.5% (w/v) solution NMP exhibited an inherent viscosity of 0.42 dL/g at 25° C. A film cast from DMAc (15% solids w/w) onto plate glass using a doctor blade was allowed to dry to a tack-free state in a dust free chamber. The film on the glass plate was placed in a forced air oven for 30 minutes each at 75, 100, 125, 150 and 200° C. and one hour each at 225 and 250° C. The film exhibited good flexibility and a $T_g$ of 234° C. as determined by DSC at a heating rate of 20° C./min.

Example 25

Preparation of Random Copolyimide from 4,4'-perfluoroisopropylidene dianhydride, 75 Mole % of [2,4-bis(3-aminophenoxy)phenyl]diphenylphosphine oxide and 25 Mole % of 2,2-bis(4-(4-aminophenoxy)phenyl)hexafluoropropane Using 1:1 Stoichiometry

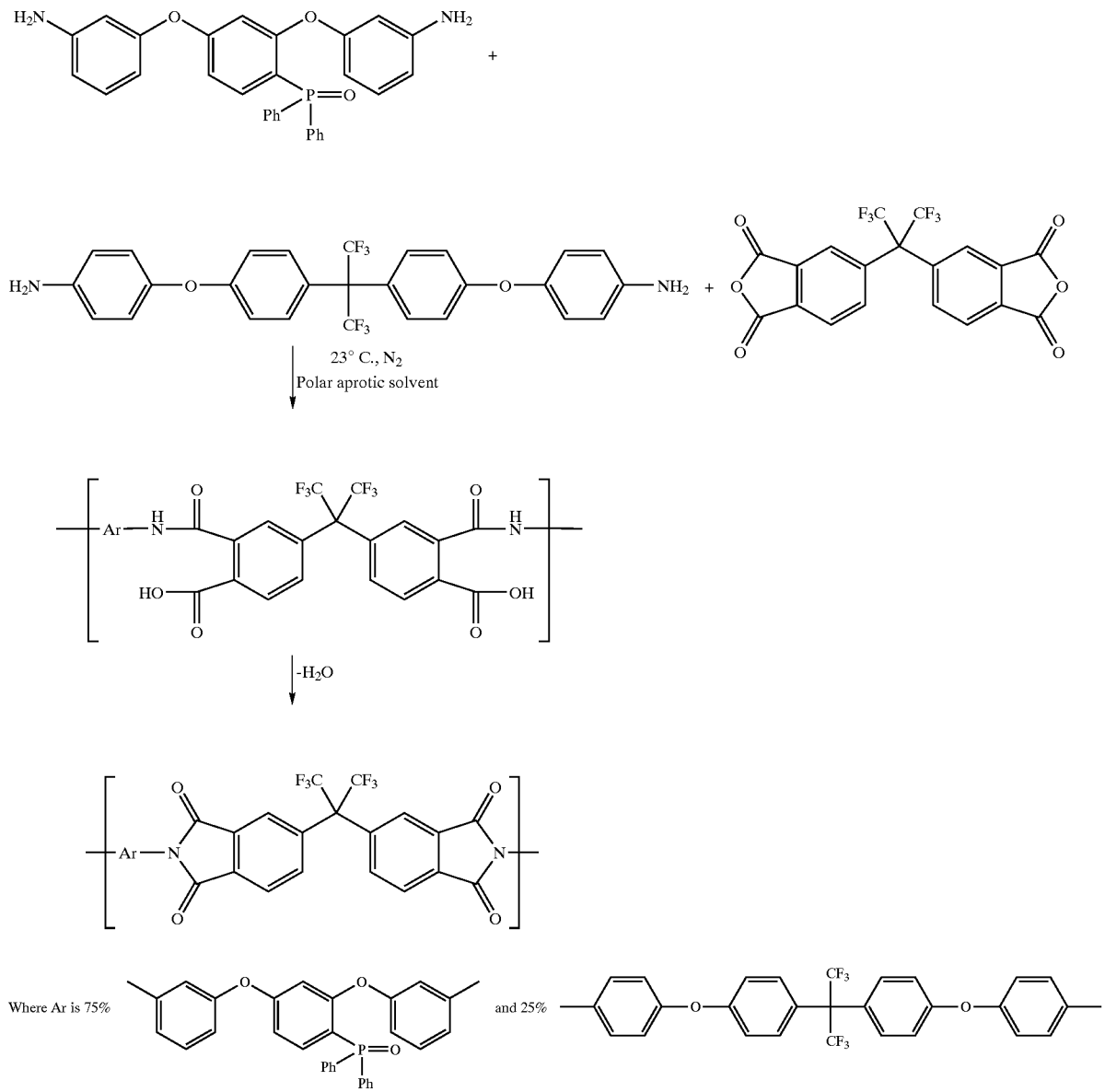

Into a 100 mL three neck round bottom flask equipped with a mechanical stirrer, nitrogen gas inlet, and drying tube filled with calcium sulfate was placed [2,4-bis(3-aminophenoxy)phenyl]diphenylphosphine oxide (2.0227 g, $4.107 \times 10^{-3}$ mole), 2,2-Bis(4-(4-aminophenoxy)phenyl)hexafluoropropane (0.7097 g, $1.369 \times 10^{-3}$ mole) DMAc (10.0 mL). Once dissolved, 4,4'-perfluoroisopropylidene dianhydride (2.4326 g, $5.476 \times 10^{-3}$ mole) was added along with additional DMAc (10.0 mL) to give a solution with a concentration of 20% solids. The light yellow solution was stirred overnight at room temperature under a nitrogen atmosphere. The polymer solution was chemically imidized by the addition of 1.67 g of acetic anhydride and 1.28 g of pyridine. The solution was stirred at room temperature overnight. The polymer was precipitated in a blender containing water, filtered, washed with excess water and dried in a vacuum oven at 110° C. overnight to afford a white, fibrous material. A 0.5% (w/v) solution in NMP exhibited an inherent viscosity of 0.58 dL/g at 25° C. A film cast from DMAc (15% solids w/w) onto plate glass using a doctor blade was allowed to dry to a tack-free state in a dust free chamber. The film on the glass plate was placed in a forced air oven for 30 minutes each at 75, 100, 125, 150 and 200° C. and one hour each at 225 and 250° C. The film exhibited good flexibility and a $T_g$ of 234° C. as determined DSC at a heating rate of 20° C./min.

Example 26

Preparation of Random Copolyimide from 3,3',4,4'-biphenyl tetracarboxylic dianhydride 75 Mole % of [2,4-bis(3-aminophenoxy)phenyl]diphenylphosphine oxide and 25 Mole % of 2,2-bis(4-(4-aminophenoxy)phenyl)hexafluoropropane Using 1:1 Stoichiometry

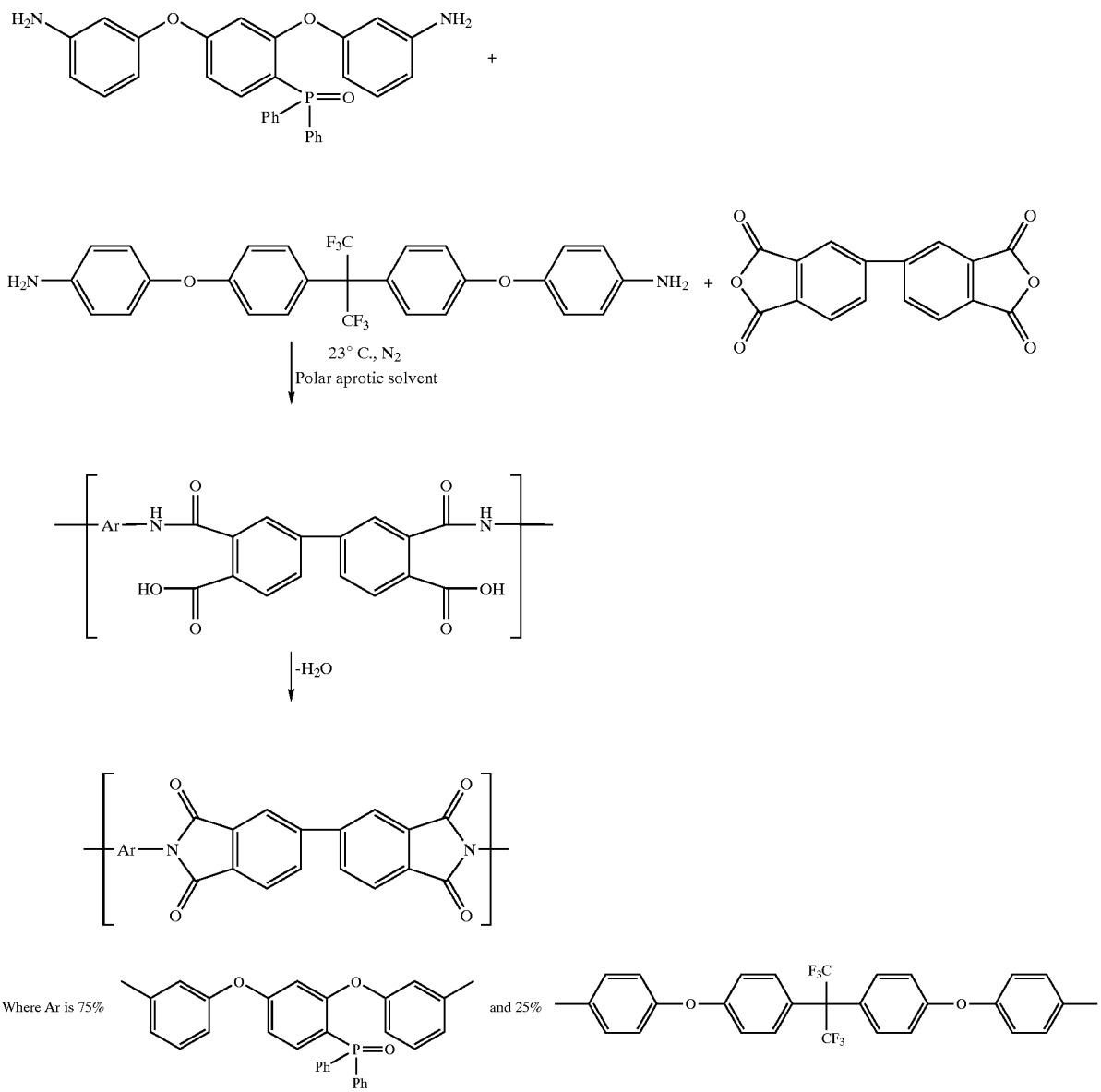

Into a 100 mL three neck round bottom flask equipped with a mechanical stirrer, nitrogen gas inlet, and drying tube filled with calcium sulfate was placed [2,4-bis(3-aminophenoxy)phenyl]diphenylphosphine oxide (2.4052 g, $4.884 \times 10^{-3}$ mole), 2,2-bis(4-(4-aminophenoxy)phenyl)hexafluoropropane (0.8440 g, $1.628 \times 10^{-3}$ mole) and DMAc (10.0 mL). Once dissolved, 3,3',4,4'-biphenyl tetracarboxylic dianhydride (1.9158 g, $6.511 \times 10^{-3}$ mole) was added along with additional DMAc (10.0 mL) to give a solution with a concentration of 20% solids. The light yellow solution was stirred overnight at room temperature under a nitrogen atmosphere. The polymer solution was chemically imidized by the addition of 1.67 g of acetic anhydride and 1.28 g of pyridine. The solution was stirred at room temperature overnight. The polymer was precipitated in a blender containing water, filtered, washed with excess water and dried in a vacuum oven at 110° C. overnight to afford a white, fibrous material. A 0.5% (w/v) solution in NMP exhibited an inherent viscosity of 0.49 dL/g at 25° C. A film cast from DMAc (15% solids w/w) onto plate glass using a doctor blade was allowed to dry to a tack-free state in a dust free chamber. The film on the glass plate was placed in a forced air oven for 30 minutes each at 75, 100, 125, 150 and 200° C. and one hour each at 225 and 250° C. The film exhibited good flexibility and a $T_g$ of 237° C. as determined DSC at a heating rate of 20° C./min.

Example 27

Preparation of Random Copolyimide from 4,4'-perfluoroisopropylidene dianhydride, 75 Mole % of [2,4-bis(3-aminophenoxy)phenyl]diphenylphosphine oxide and 25 Mole % of bis(4-aminophenoxy)biphenyl Using 1:1 Stoichiometry

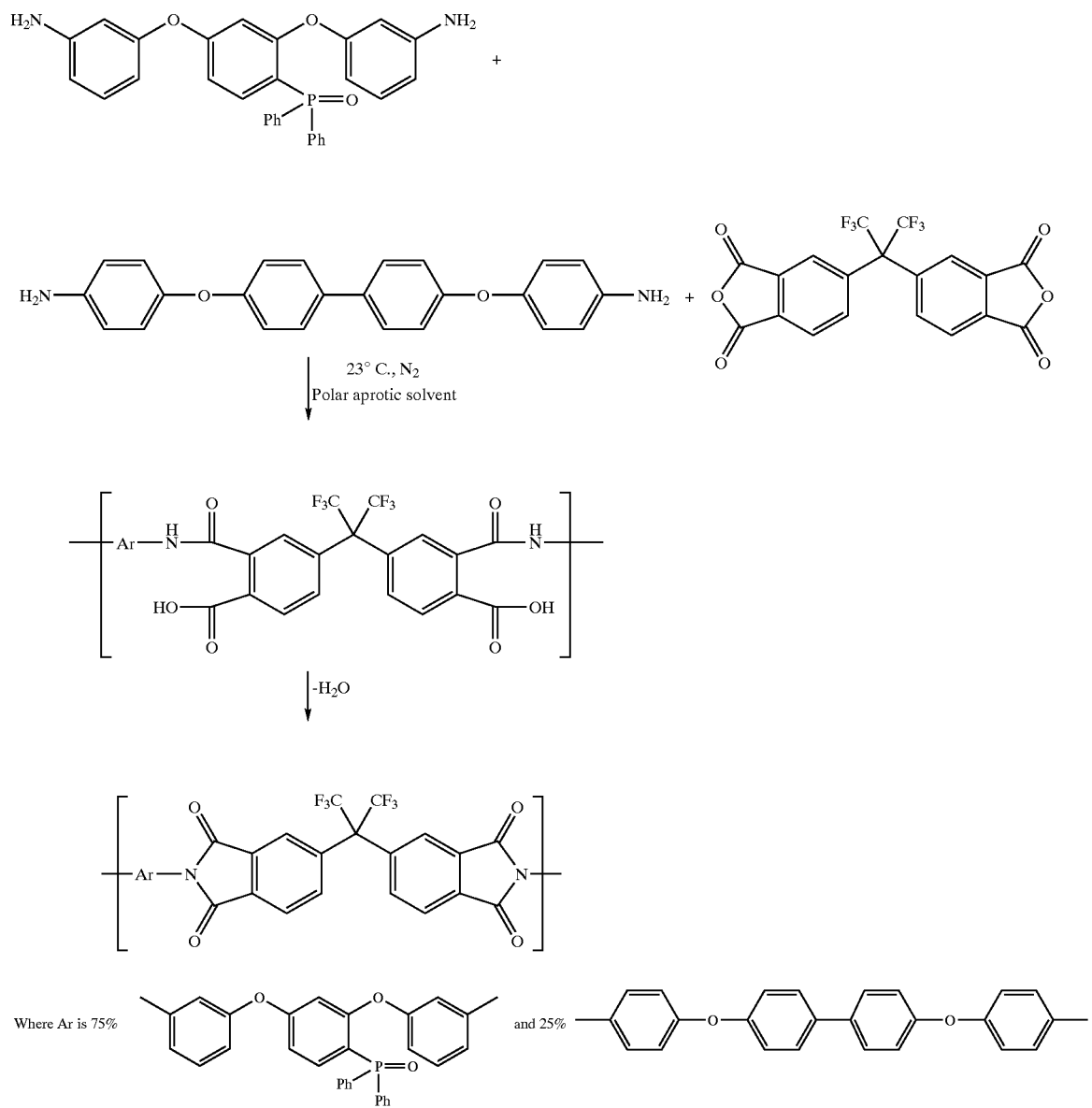

Into a 100 mL three neck round bottom flask equipped with a mechanical stirrer, nitrogen gas inlet, and drying tube filled with calcium sulfate was placed [2,4-bis(3-aminophenoxy)phenyl]diphenylphosphine oxide (2.1064 g, $4.277 \times 10^{-3}$ mole), bis(4-aminophenoxy)biphenyl (0.5253 g, $1.426 \times 10^{-3}$ mole) and DMAc (10.0 mL). Once dissolved, 4,4'-perfluoroisopropylidene dianhydride (2.5333 g, $5.703 \times 10^{-3}$ mole) was added along with additional DMAc (10.0 mL) to give a solution with a concentration of 20% solids. The light yellow solution was stirred overnight at room temperature under a nitrogen atmosphere. The polymer solution was chemically imidized by the addition of 1.67 g of acetic anhydride and 1.28 g of pyridine. The solution was stirred at room temperature overnight. The polymer was precipitated in a blender containing water, filtered, washed with excess water and dried in a vacuum oven at 110° C. overnight to afford a white, fibrous material. A 0.5% (w/v) solution NMP exhibited an inherent viscosity of 0.57 dL/g at 25° C. A film cast from DMAc (15% solids w/w) onto plate glass using a doctor blade was allowed to dry to a tack-free state in a dust free chamber. The film on the glass plate was placed in a forced air oven for 30 minutes each at 75, 100, 125, 150 and 200° C. and one hour each at 225 and 250° C. The film exhibited good flexibility and a $T_g$ of 238° C. as determined by DSC at a heating rate of 20° C./min.

Example 28

Preparation of Random Copolyimide from 4,4'-perfluoroisopropylidene dianhydride, 75 Mole % of [2,4-bis(3-aminophenoxy)phenyl]diphenylphosphine oxide and 25 Mole % of 2,2-bis(4-aminophenyl) hexafluoropropane Using 1:1 Stoichiometry

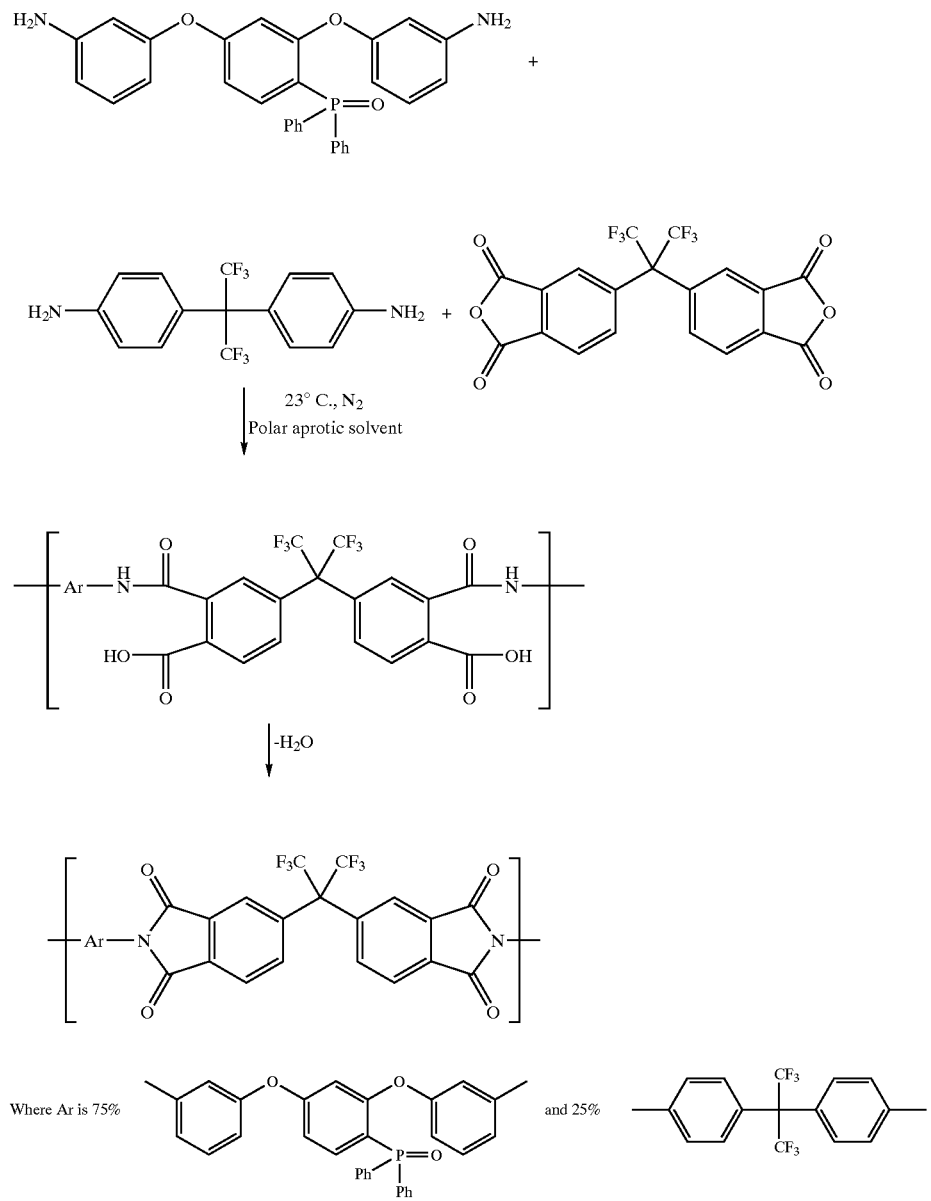

Into a 100 mL three neck round bottom flask equipped with a mechanical stirrer, nitrogen gas inlet, and drying tube filled with calcium sulfate was placed [2,4-bis(3-aminophenoxy)phenyl]diphenylphosphine oxide (2.1265 g, $4.318 \times 10^{-3}$ mol), 2,2-bis(4-aminophenyl)hexafluoropropane (0.4811 g, $1.439 \times 10^{-3}$ mole) and DMAc (10.0 mL). Once dissolved, 4,4'-perfluoroisopropylidene dianhydride (2.5579 g, $5.757 \times 10^{-3}$ mole) was added along with additional DMAc (10.0 mL) to give a solution with a concentration of 20% solids. The light yellow solution was stirred overnight at room temperature under a nitrogen atmosphere. The polymer solution was chemically imidized by the addition of 1.67 g of acetic anhydride and 1.28 g of pyridine. The solution was stirred at room temperature overnight. The polymer was precipitated in a blender containing water, filtered, washed with excess water and dried in a vacuum oven at 110° C. overnight to afford a white, fibrous material. A 0.5% (w/v) solution NMP exhibited an inherent viscosity of 0.39 dL/g at 25° C. A film cast from DMAc (15% solids w/w) onto plate glass using a doctor blade was allowed to dry to a tack-free state in a dust free chamber. The film on the glass plate was placed in a forced air oven for 30 minutes each at 75, 100, 125, 150 and 200° C. and one hour each at 225 and 250° C. The film exhibited good flexibility and a $T_g$ of 238° C. as determined by DSC at a heating rate of 20° C./min.

Example 29

Preparation of Random Copolyimide from 3,3',4,4'-biphenyl tetracarboxylic dianhydride, 75 Mole % of [2,4-bis(3-aminophenoxy)phenyl]diphenylphosphine oxide and 25 Mole % of 3,4'-oxydianiline Using 1:1 Stoichiometry

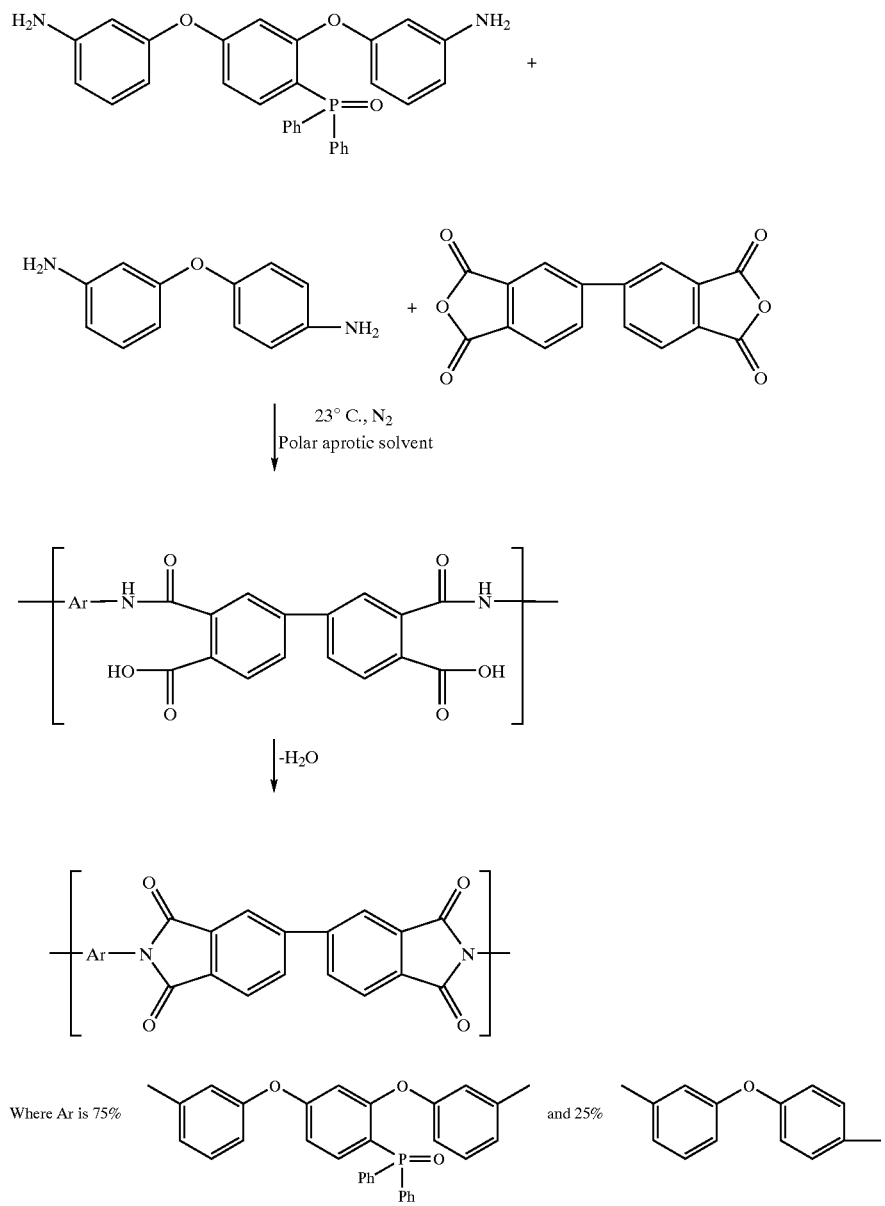

Into a 100 mL three neck round bottom flask equipped with a mechanical stirrer, nitrogen gas inlet, and drying tube filled with calcium sulfate was placed [2,4-bis(3-aminophenoxy)phenyl]diphenylphosphine oxide (2.6733 g, $5.428 \times 10^{-3}$ mole), 3,4'-oxydianiline (0.3623 g, $1.809 \times 10^{-3}$ mole) and DMAc (10.0 mL). Once dissolved, 3,3',4,4'-biphenyl tetracarboxylic dianhydride (2.1294 g, $7.237 \times 10^{-3}$ mole) was added along with DMAc (10.0 mL) to give a solution with a concentration of 20% solids. The light yellow solution was stirred overnight at room temperature under a nitrogen atmosphere. The polymer solution was chemically imidized by the addition of 1.67 g of acetic anhydride and 1.28 g of pyridine. The solution was stirred at room temperature overnight. The polymer was precipitated in a blender containing water, filtered, washed with excess water and dried in a vacuum oven at 110° C. overnight to afford a white, fibrous material. A 0.5% (w/v) solution in NMP exhibited an inherent viscosity of 0.26 dL/g at 25° C. A film cast from DMAc (15% solids w/w) onto plate glass using a doctor blade was allowed to dry to a tack-free state in a dust free chamber. The film on the glass plate was placed in a forced air oven for 30 minutes each at 75, 100, 125, 150 and 200° C. and one hour each at 225 and 250° C. The film exhibited good flexibility and a $T_g$ of 240° C. as determined by DSC at a heating rate of 20° C./min.

Example 30

Preparation of Random Copolyimide from 3,3',4,4'-biphenyl tetracarboxylic dianhydride 75 Mole % of [2,4-bis(3-aminophenoxy)phenyl]diphenylphosphine oxide and 25 Mole % of 9,9-bis(4-aminophenyl) fluorene Using 1:1 Stoichiometry

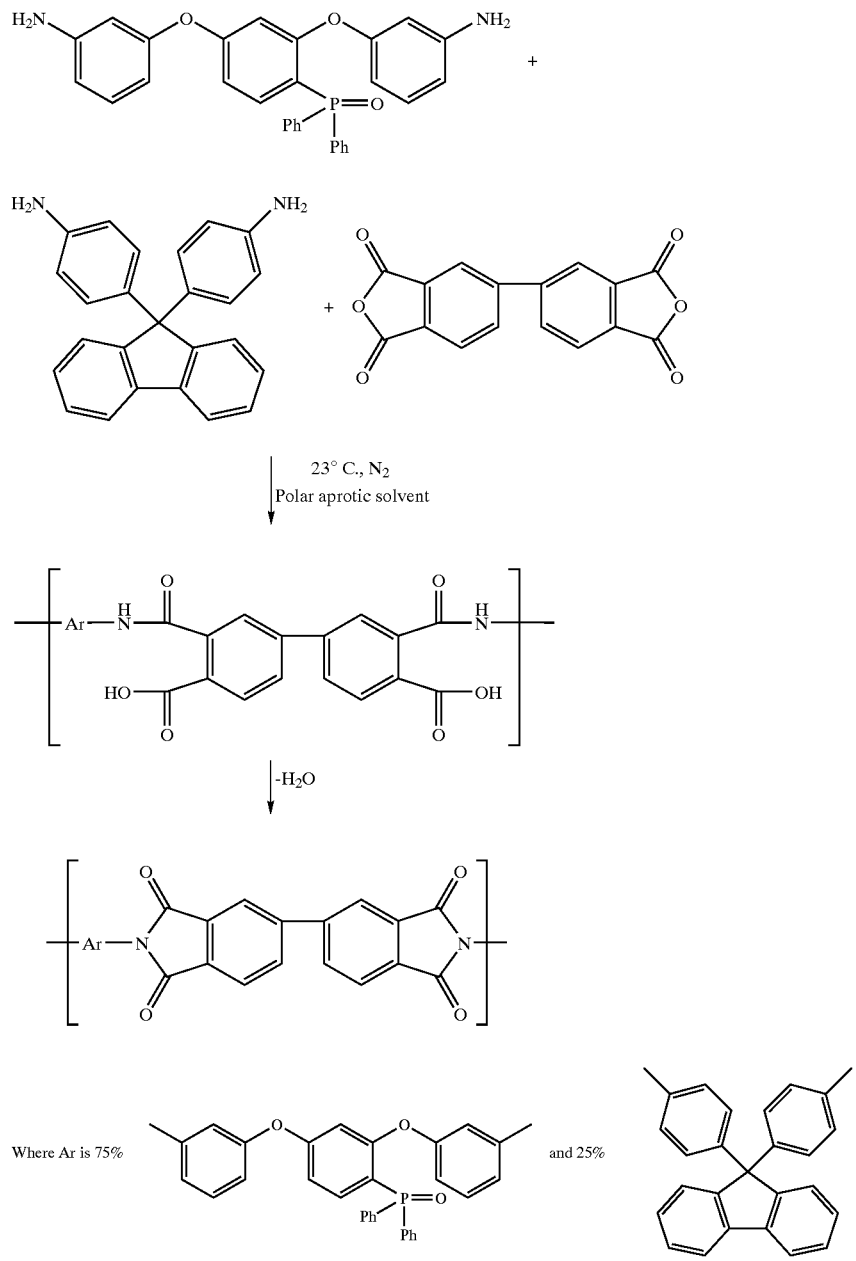

Into a 100 mL three neck round bottom flask equipped with a mechanical stirrer, nitrogen gas inlet, and drying tube filled with calcium sulfate was placed [2,4-bis(3-aminophenoxy)phenyl]diphenylphosphine oxide (2.5414 g, 5.160×10⁻³ mole), 9,9-bis(4-aminophenyl)fluorene (0.5993 g, 1.720×10⁻³ mole) and DMAc (10.0 mL). Once dissolved, 3,3',4,4'-biphenyl tetracarboxylic dianhydride (2.0243 g, 6.880×10⁻³ mole) was added along with additional DMAc (10.0 mL) to give a solution with a concentration of 20% solids. The light yellow solution was stirred overnight at room temperature under a nitrogen atmosphere. The polymer solution was chemically imidized by the addition of 1.67 g of acetic anhydride and 1.28 g of pyridine. The solution was stirred at room temperature overnight. The polymer was precipitated in a blender containing water, filtered, washed with excess water and dried in a vacuum oven at 110° C. overnight to afford a white, fibrous material.

A 0.5% (w/v) solution NMP exhibited an inherent viscosity of 0.28 dL/g at 25° C. A film cast from DMAc (15% solids w/w) onto plate glass using a doctor blade was allowed to dry to a tack-free state in a dust free chamber. The film on the glass plate was placed in a forced air oven for 30 minutes each at 75, 100, 125, 150 and 200° C. and one hour each at 225 and 250° C. The film exhibited good flexibility and a $T_g$ of 246° C. as determined by DSC at a heating rate of 20° C./min.

Example 31

Preparation of Random Copolyimide from 4,4'-perfluoroisopropylidene dianhydride, 75 Mole % of [2,4-bis(3-aminophenoxy)phenyl]diphenylphosphine oxide and 25 Mole % of 9,9-bis(4-aminophenyl)fluorene Using 1:1 Stoichiometry

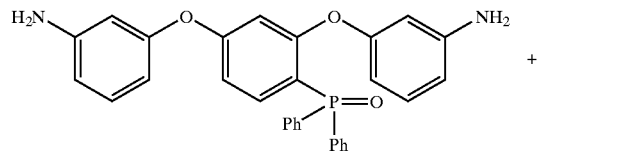

+

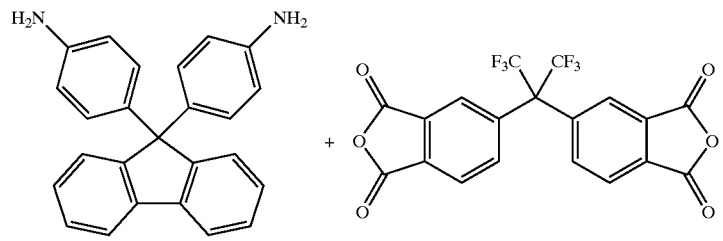

↓ 23° C., N₂
Polar aprotic solvent

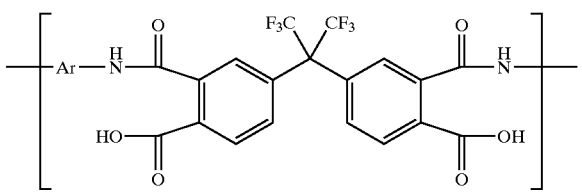

↓ -H₂O

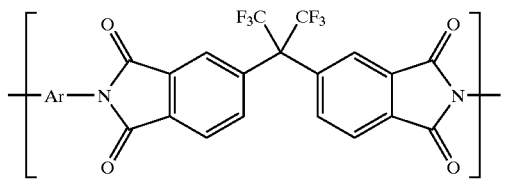

Where Ar is 75% 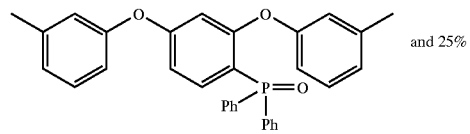 and 25% 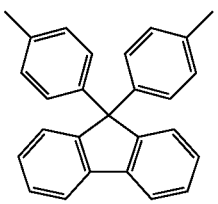

Into a 100 mL three neck round bottom flask equipped with a mechanical stirrer, nitrogen gas inlet, and drying tube filled with calcium sulfate was placed [2,4-bis(3-aminophenoxy)phenyl]diphenylphosphine oxide (2.1181 g, $4.301 \times 10^{-3}$ mol), 9,9-bis(4-aminophenyl)fluorene (0.4995 g, $1.434 \times 10^{-3}$ mole) and DMAc (10.0 mL). Once dissolved, 4,4'-perfluoroisopropylidene dianhydride (2.5474 g, $5.734 \times 10^{-3}$ mole) was added along with additional DMAc (10.0 mL) to give a solution with a concentration of 20% solids. The light yellow solution was stirred overnight at room temperature under a nitrogen atmosphere. The polymer solution was chemically imidized by the addition of 1.67 g of acetic anhydride and 1.28 g of pyridine. The solution was stirred at room temperature overnight. The polymer was precipitated in a blender containing water, filtered, washed with excess water and dried in a vacuum oven at 110° C. overnight to afford a white, fibrous material. A 0.5% (w/v) solution NMP exhibited an inherent viscosity of 0.48 dL/g at 25° C. A film cast from DMAc (15% solids w/w) onto plate glass using a doctor blade was allowed to dry to a tack-free state in a dust free chamber. The film on the glass plate was placed in a forced air oven for 30 minutes each at 75, 100, 125, 150 and 200° C. and one hour each at 225 and 250° C. The film exhibited good flexibility and a $T_g$ of 249° C. as determined by DSC at a heating rate of 20° C./min.

Example 32

Preparation of Polyimide from 2,3,3',4'-biphenyl tetracarboxylic dianhydride and [2,4-bis(3-aminophenoxy)phenyl]diphenylphosphine oxide Using 1:1 Stoichiometry

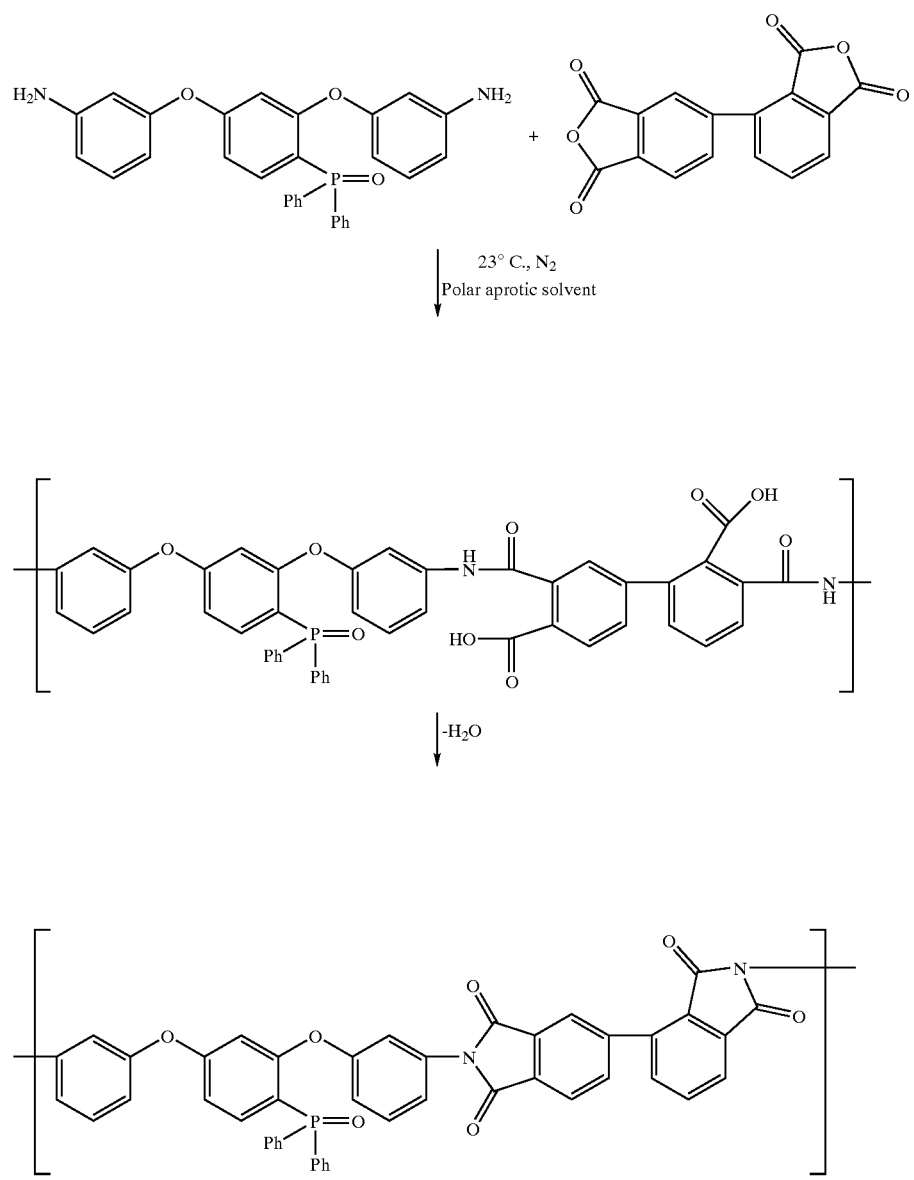

Into a 100 mL three neck round bottom flask equipped with a mechanical stirrer, nitrogen gas inlet and condenser was placed the diamine (3.0000 g, $6.0912 \times 10^{-3}$ mole) and m-cresol (10.0 g). Once dissolved 2,3,3',4'-biphenyl tetra-carboxylic dianhydride (1.7922 g, $6.0912 \times 10^{-3}$ mole) was added along with additional m-cresol (9.2 g) and 0.5 mL of isoquinoline to give a solution with a concentration of 20% (w/v) solids. The orange solution was stirred at 200° C. for four hours under a nitrogen atmosphere. The polymer was precipitated in a blender containing a 50/50 mixture of water/methanol, filtered, washed with excess water and dried in a vacuum oven at 150° C. overnight to afford a white, fibrous material. A 0.5 g/dL solution in DMAc had a viscosity of 0.49 dL/g. A film cast from DMAc (20% solids w/w) onto plate glass using a doctor blade was allowed to dry to a tack-free state in a dust free chamber. The film on the glass plate was placed in a forced air oven for 30 minutes each at 75, 100, 125, 150 and 200° C. and one hour each at 225 and 250° C. The transparent low color film was subsequently removed from the glass. The film exhibited good flexibility and a $T_g$ of 230° C. as DSC at a heating rate of 20° C./min.

Example 33

Preparation of Polyimide from 4,4'-perfluoroisopropylidiene dianhydride and [2,4-bis(4-aminophenoxy)phenyl]diphenylphosphine oxide Using 1:1 Stoichiometry

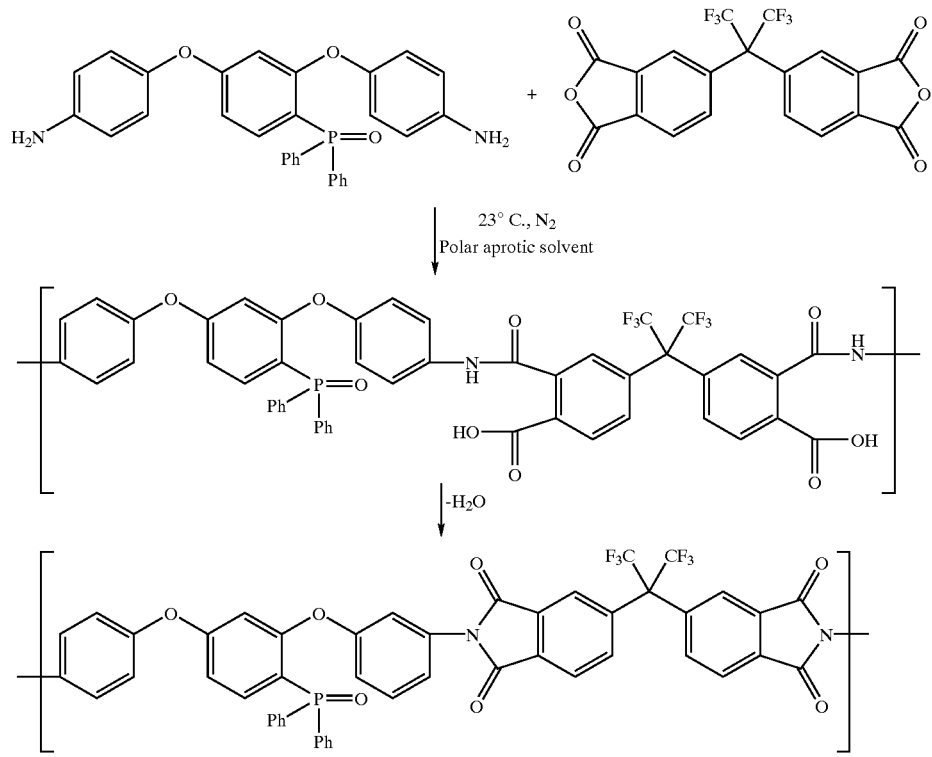

Into a 100 mL three neck round bottom flask equipped with a mechanical stirrer, nitrogen gas inlet and drying tube filled with calcium sulfate was placed [2,4-bis(4-aminophenoxy)phenyl]diphenylphosphine oxide (1,3,4-APPO, 2.0367 g, $4.1353 \times 10^{-3}$ mol) and NMP (8.0 mL). Once dissolved, perfluoroisopropylidiene dianhydride (1.8371 g, $4.1353 \times 10^{-3}$ mol) was added along with additional NMP (7.0 mL) to give a solution with a concentration of 20% solids. The light yellow solution was stirred overnight at room temperature under a nitrogen atmosphere. A 0.5% (w/v) solution in NMP exhibited an inherent viscosity of 0.31 dL/g at 25° C. The remaining polymer solution was chemically imidized by the addition of 1.27 g of acetic anhydride and 0.98 g of pyridine. The solution was stirred at room temperature overnight. The polymer was precipitated in a blender containing a 50/50 mixture of water/methanol, filtered, washed with excess water and dried in a vacuum oven at 110° C. overnight to afford a quantitative yield of an amber colored material.

Example 34

Preparation of Polyimide from 2,3,3',4'-biphenyltetracarboxylic dianhydride and [2,5-bis(4-aminophenoxy)phenyl]diphenylphosphine oxide Using 1:1 Stoichiometry

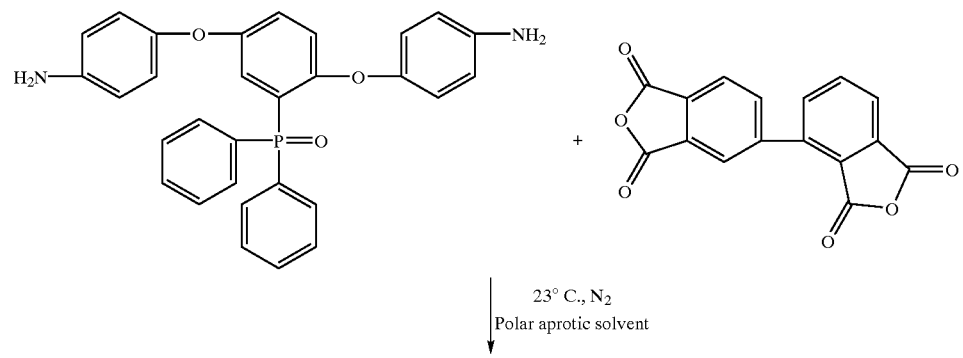

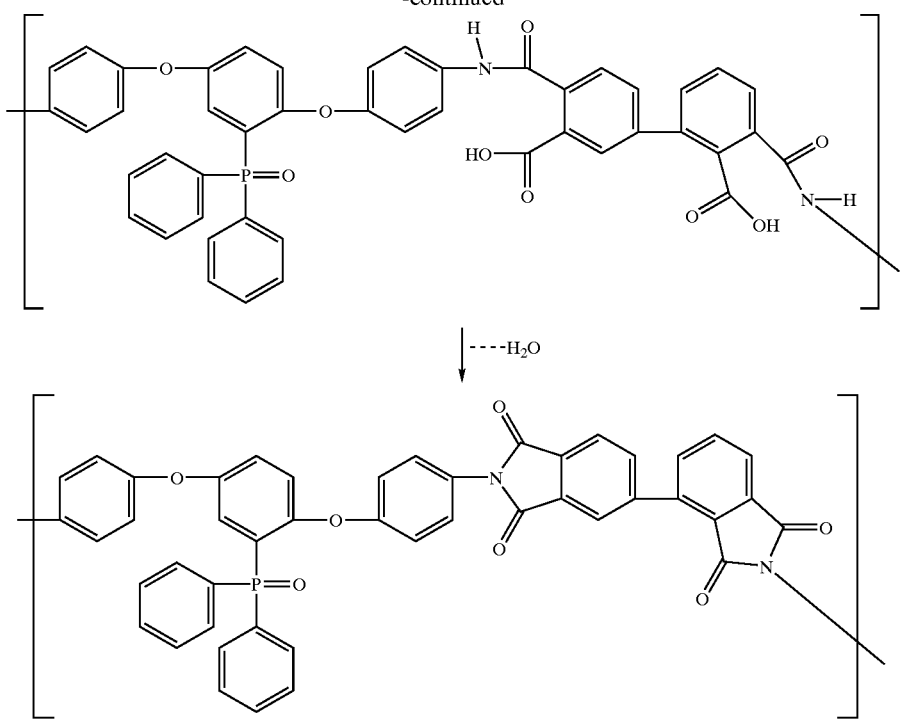

Into a 100 mL three neck round bottom flask equipped with a mechanical stirrer, nitrogen gas inlet and drying tube filled with calcium sulfate was placed [2,5-bis(3-aminophenoxy)phenyl]diphenylphosphine oxide (4,4'-APPO, 2.0465 g, 0.0042 mol) and N,N-dimethylacetamide (DMAc, 4.0 mL). Once dissolved, 2,3,3',4'-biphenyl tetracarboxylic dianhydride (1.2225 g, 0.0042 mol) was added as a slurry in 5.0 mL DMAc and rinsed in with additional DMAc (5.0 mL) to give a solution with a concentration of 19.86% solids. The light orange solution was stirred overnight at room temperature under a nitrogen atmosphere. A 0.5% (w/v) solution in DMAc exhibited an inherent viscosity of 0.59 dL/g at 25° C. The solution was centriguged and cast on plate glass in a low humidity chamber. The film on plate glass was placed in a forced air oven for 1 hour each at 100, 200, and 300° C. The transparent light amber film was subsequently removed from the glass. The film exhibited good flexibility and a $T_g$ of 259° C. as determined by DSC at a heating rate of 20° C./min. Unoriented thin film tensile properties at room temperature were: 15.8 ksi strength, 491 ksi modulus, and 13% elongation at break. For a film thickness of 1.5 mil, the thermal emissivity ($\epsilon$) was 0.622 and the solar absorptance ($\alpha$) was 0.159. The ratio $\alpha/\epsilon$ was 0.256.

Example 35

Preparation of Polyimide from 3,3',4,4'-biphenyltetracarboxylic dianhydride and [2,5-bis(4-aminophenoxy)phenyl] diphenylphosphine oxide Using 1:1 Stoichiometry

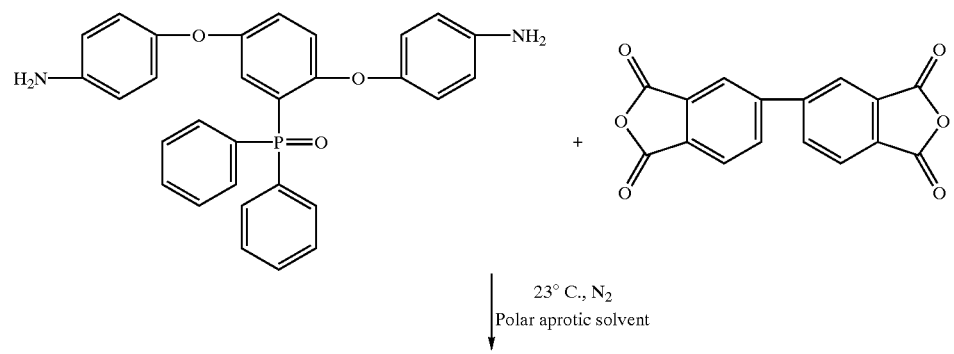

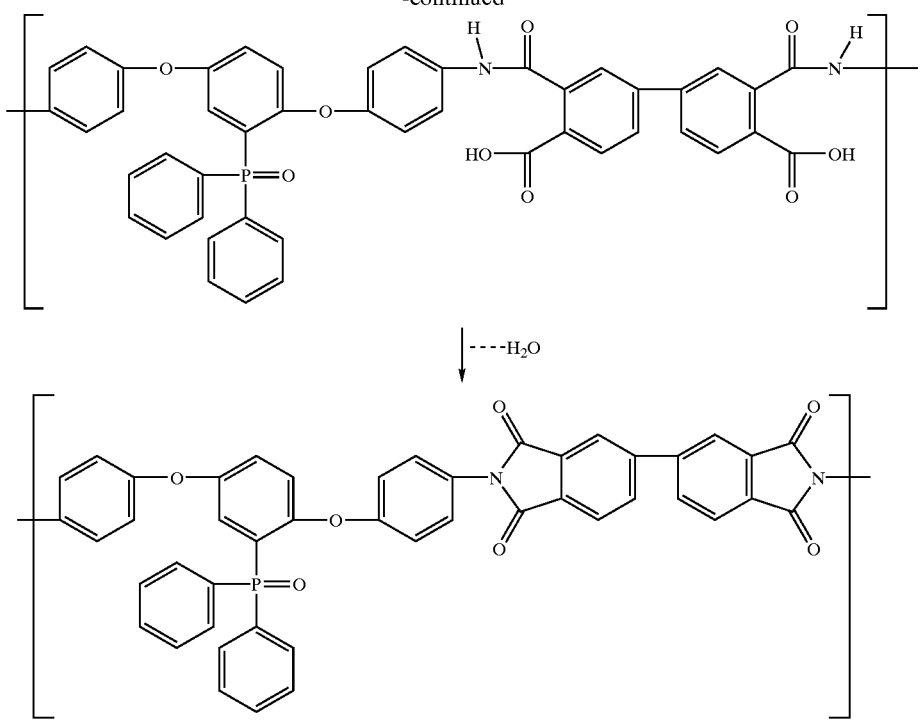

Into a 100 mL three neck round bottom flask equipped with a mechanical stirrer, nitrogen gas inlet and drying tube filled with calcium sulfate was placed [2,5-bis(3-aminophenoxy)phenyl]diphenylphosphine oxide (4,4'-APPO, 2.0119 g 0.0041 mol) and N,N-dimethylacetamide (DMAc, 4.0 mL). Once dissolved, 3,3',4,4'-biphenyl tetracarboxylic dianhydride (1.2019 g, 0.0041 mol) was added as a slurry in 5.0 mL DMAc and rinsed in with additional DMAc (5.0 mL) to give a solution with a concentration of 19.59% solids. The light orange solution was stirred overnight at room temperature under a nitrogen atmosphere. A 0.5% (w/v) solution in DMAc exhibited an inherent viscosity of 1.00 dL/g at 25° C. The solution was centriguged and cast on plate glass in a low humidity chamber. The film on plate glass was placed in a forced air oven for 1 hour each at 100, 200, and 300° C. The transparent light amber film was subsequently removed from the glass. The film exhibited good flexibility and a $T_g$ of 258° C. as determined by DSC at a heating rate of 20° C./min. Unoriented thin film tensile properties at room temperature were: 21.9 ksi strength, 630 ksi modulus, and 31% elongation at break. For a film thickness of 0.9 mil, the thermal emissivity ($\epsilon$) was 0.533 and the solar absorptance ($\alpha$) was 0.153. The ratio $\alpha/\epsilon$ was 0.287.

Example 36

Preparation of Polyimide from 4,4'-perfluoroisopropylidiene dianhydride and [2,5-bis(4-aminophenoxy)phenyl]diphenylphosphine oxide Using 1:1 Stoichiometry

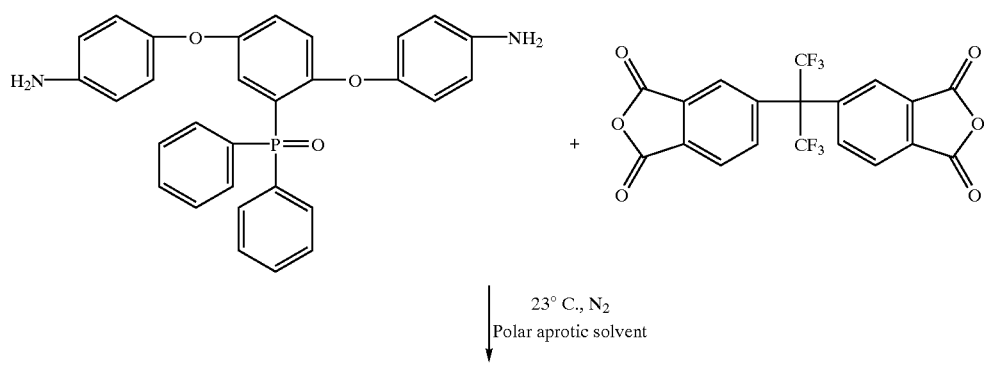

-continued

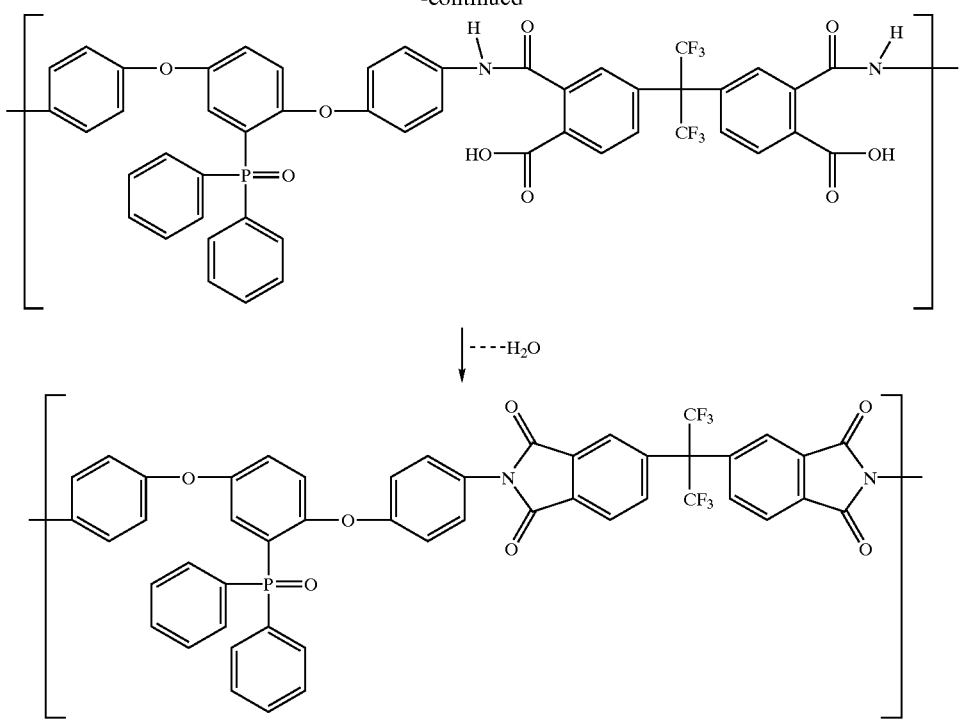

Into a 100 mL three neck round bottom flask equipped with a mechanical stirrer, nitrogen gas inlet and drying tube filled with calcium sulfate was placed [2,5-bis(3-aminophenoxy)phenyl]diphenylphosphine oxide (4,4'-APPO, 1.7277 g, 0.0035 mol) and N,N-dimethylacetamide (DMAC, 3.0 mL). Once dissolved, 4,4'-perfluoroisopropylidiene dianhydride (1.5584 g, 0.0035 mol) was added as a slurry in 5.0 mL DMAc and rinsed in with additional DMAc (6.0 mL) to give a solution with a concentration of 19.95% solids. The light orange solution was stirred overnight at room temperature under a nitrogen atmosphere. A 0.5% (w/v) solution in DMAc exhibited an inherent viscosity of 0.65 dL/g at 25° C. The solution was centriguged and cast on plate glass in a low humidity chamber. The film on plate glass was placed in a forced air oven for 1 hour each at 100, 200, and 300° C. The transparent light amber film was subsequently removed from the glass. The film exhibited good flexibility and a $T_g$ of 257° C. as determined by DSC at a heating rate of 20° C./min. Unoriented thin film tensile properties at room temperature were: 19.6 ksi strength, 570 ksi modulus, and 10% elongation at break. For a film thickness of 1.3 mil, the thermal emissivity ($\epsilon$) was 0.606 and the solar absorptance ($\alpha$) was 0.145. The ratio $\alpha/\epsilon$ was 0.239.

Example 37

Preparation of Polyimide from 4,4'-oxydiphthalic anhydride and [2,5-bis(4-aminophenoxy)phenyl]diphenylphosphine oxide Using 1:1 Stoichiometry

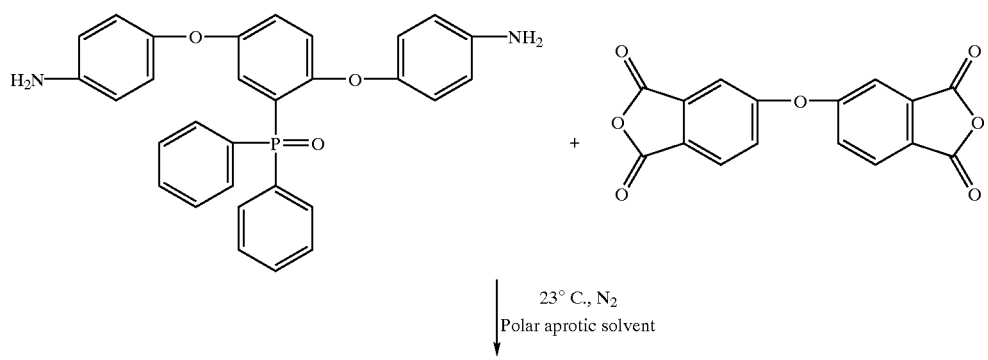

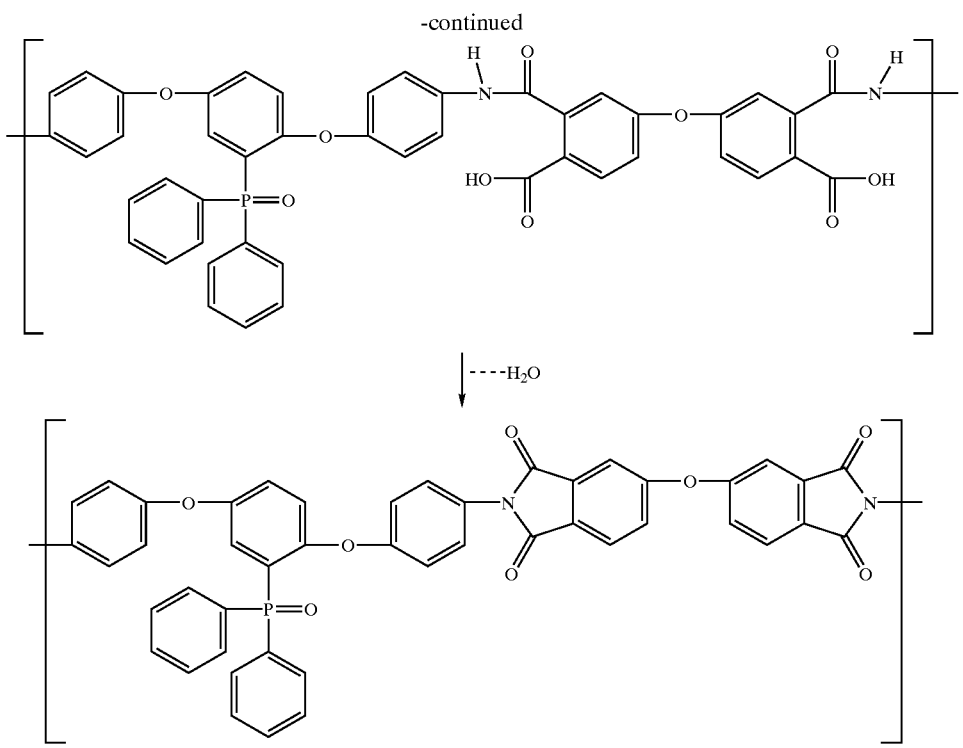

Into a 100 mL three neck round bottom flask equipped with a mechanical stirrer, nitrogen gas inlet and drying tube filled with calcium sulfate was placed [2,5-bis(3-aminophenoxy)phenyl]diphenylphosphine oxide (4,4'-APPO, 2.3840 g, 0.0048 mol) and N,N-dimethylacetamide (DMAc, 5.0 mL). Once dissolved, 4,4'-oxydiphthalic anhydride (1.5016 g, 0.0048 mol) was added as a slurry in 7.0 mL DMAc and rinsed in with additional DMAc (5.0 mL) to give a solution with a concentration of 19.53% solids. The light orange solution was stirred overnight at room temperature under a nitrogen atmosphere. A 0.5% (w/v) solution in DMAc exhibited an inherent viscosity of 0.80 dL/g at 25° C. The solution was centriguged and cast on plate glass in a low humidity chamber. The film on plate glass was placed in a forced air oven for 1 hour each at 100, 200, and 300° C. The transparent light amber film was subsequently removed from the glass. The film exhibited good flexibility and a $T_g$ of 236° C. as determined by DSC at a heating rate of 20° C./min. Unoriented thin film tensile properties at room temperature were: 18.1 ksi strength, 542 ksi modulus, and 14% elongation at break. For a film thickness of 1.5 mil, the thermal emissivity ($\epsilon$) was 0.622 and the solar absorptance ($\alpha$) was 0.165. The ratio $\alpha/\epsilon$ was 0.266.

Example 38

Preparation of Polyimide from 4,4'-benzophenenonetetracarboxylic dianhydride and [2,5-bis(4-aminophenoxy)phenyl]diphenylphosphine oxide Using 1:1 Stoichiometry

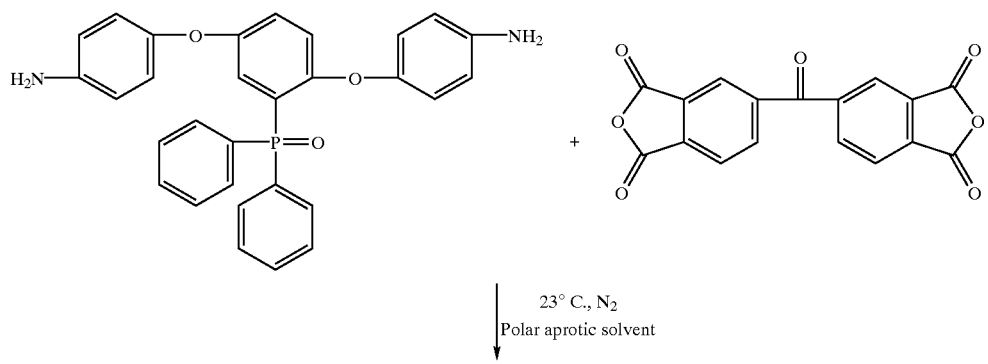

-continued

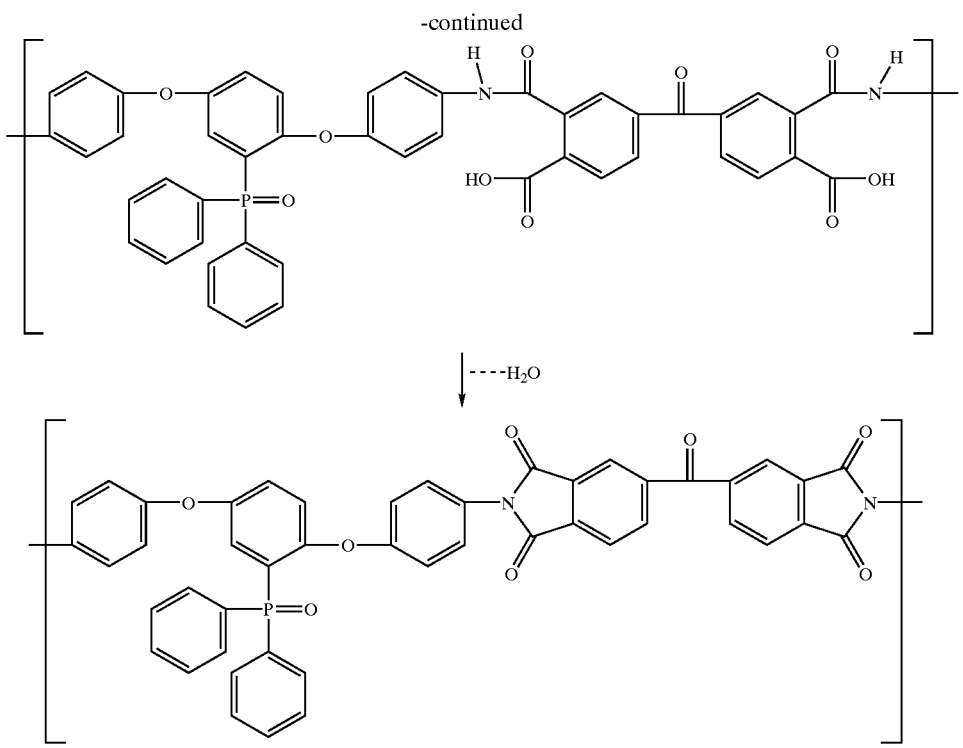

↓ ----H₂O

Into a 100 mL three neck round bottom flask equipped with a mechanical stirrer, nitrogen gas inlet and drying filled with calcium sulfate was placed [2,5-bis(3-aminophenoxy)phenyl]diphenylphosphine oxide (4,4'-APPO, 2.1134 g, 0.0043 mol) and N,N-dimethylacetamide (DMAc, 5.0 mL). Once dissolved, 4,4'-benzophenone tetracarboxylic dianhydride (1.3827 g, 0.0043 mol) was added as a slurry in 5.0 mL DMAc and rinsed in with additional DMAc (5.0 mL) to give a solution with a concentration of 19.83% solids. The light orange solution was stirred overnight at room temperature under a nitrogen atmosphere. A 0.5% (w/v) solution in DMAc exhibited an inherent viscosity of 1.18 dL/g at 25° C. The solution was centrifuged and cast on plate glass in a low humidity chamber. The film on plate glass was placed in a forced air oven for 1 hour each at 100, 200, and 300° C. The transparent light amber film was subsequently removed from the glass. The film exhibited good flexibility and a $T_g$ of 248° C. as determined by DSC at a heating rate of 20° C./min. Unoriented thin film tensile properties at room temperature were: 19.4 ksi strength, 563 ksi modulus, and 9% elongation at break. For a film thickness of 1.3 mil, the thermal emissivity ($\epsilon$) was 0.591 and the solar absorptance ($\alpha$) was 0.200. The ratio $\alpha/\epsilon$ was 0.338.

Example 39

Preparation of Polyimide from Pyromellitic Dianhydride and [2,5-bis(4 aminophenoxy)phenyl]diphenylphosphine oxide Using 1:1 Stoichiometry

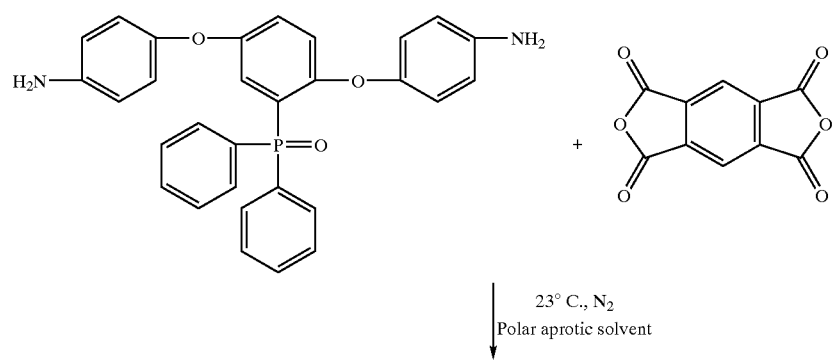

↓ 23° C., N₂
Polar aprotic solvent

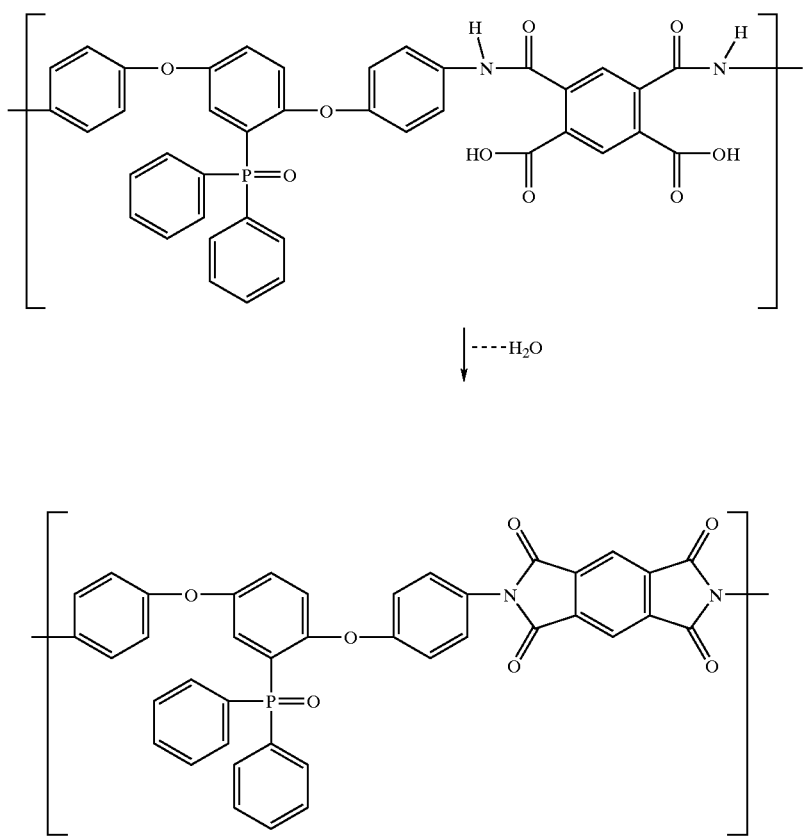

↓ ---- H₂O

Into a 100 mL three neck round bottom flask equipped with a mechanical stirrer, nitrogen gas inlet and drying tube filled with calcium sulfate was placed [2,5-bis(3-aminophenoxy)phenyl]diphenylphosphine oxide (4,4'-APPO, 2.2136 g, 0.0045 mol) and N,N-dimethylacetamide (DMAc, 4.0 mL). Once dissolved, pyromellitic dianhydride (0.9803 g, 0.0045 mol) was added as a slurry in 5.0 mL DMAc and rinsed in with additional DMAc (5.0 mL) to give a solution with a concentration of 19.50% solids. The light orange solution was stirred overnight at room temperature under a nitrogen atmosphere. A 0.5% (w/v) solution in DMAc exhibited an inherent viscosity of 0.78 dL/g at 25° C. The solution was centriguged and cast on plate glass in a low humidity chamber. The film on plate glass was placed in a forced air oven for 1 hour each at 100, 200, and 300° C. The transparent amber film was subsequently removed from the glass. The film exhibited good flexibility and a $T_g$ of 281° C. as determined by DSC at a heating rate of 20° C./min. Unoriented thin film tensile properties at room temperature were: 18.4 ksi strength, 553 ksi modulus, and 15% elongation at break. For a film thickness of 1.5 mil, the thermal emissivity ($\epsilon$) was 0.650 and the solar absorptance ($\alpha$) was 0.218. The ratio $\alpha/\epsilon$ was 0.335.

Example 40

Preparation of Polyimide from 4,4'-oxydiphthalic anhydride and (2,6-diamino-4-trifluoromethylphenyl)diphenylphosphine oxide Using 1:1 Stoichiometry

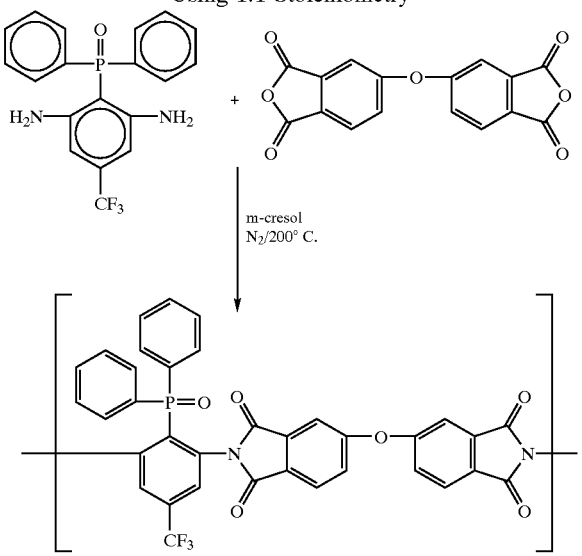

Into a 100 mL three neck round bottom flask equipped with a mechanical stirrer, nitrogen gas inlet and drying tube filled with calcium sulfate was placed (2,6-diamino-4-trifluoromethylphenyl)diphenylphosphine oxide (1.6385 g, 0.0045 mol), 4,4'-oxydiphthalic anhydride (1.3507 g, 0.0044 mol), and m-cresol (12.0 mL) to give a solution with a concentration of 19.41% solids. The orange solution was stirred for ~24 hours at ~200° C. A 0.5% (w/v) solution of the polyimide in DMAc exhibited an inherent viscosity of 0.14 dL/g at 25° C. The Tg was 295° C. as determined by DSC at a heating rate of 20° C./min on a powdered sample.

Example 41

Preparation of Polyimide from 4,4'-(2,5-diphenylphosphineoxidephenylenedioxy)diphthalic anhydride and 1,4-bis(4-aminophenoxy)benzene Using 1:1 Stoichiometry Into a 100 mL three neck round bottom flask equipped with a mechanical stirrer, nitrogen gas inlet, and drying tube filled with calcium sulfate was placed 1,4-bis(4-aminophenoxy)benzene (0.4831 g, 0.0017 mol), 4,4'-(2,5-diphenylphosphineoxidephenylenedioxy)diphthalic anhydride (0.9956 g, 0.0017 mol), and 6 mL of DMAc to give a solution with a concentration of 20% solids. The resulting clear solution was stirred overnight at room temperature under a nitrogen atmosphere. A 0.5% (w/v) solution in DMAc exhibited an inherent viscosity of 0.64 dL/g at 25° C. The remaining polymer solution was cast upon a clean glass plate, which was dried to a tack free state in a low humidity chamber. The film was placed in a forced air oven for 30 minutes each at 50, 100, and 150° C. and one hour each at 200, 250, and 300° C. The transparent yellow film was subsequently removed from the glass. The film exhibited good flexibility and a $T_g$ of 220° C. as determined by DSC at a heating rate of 20° C./min.

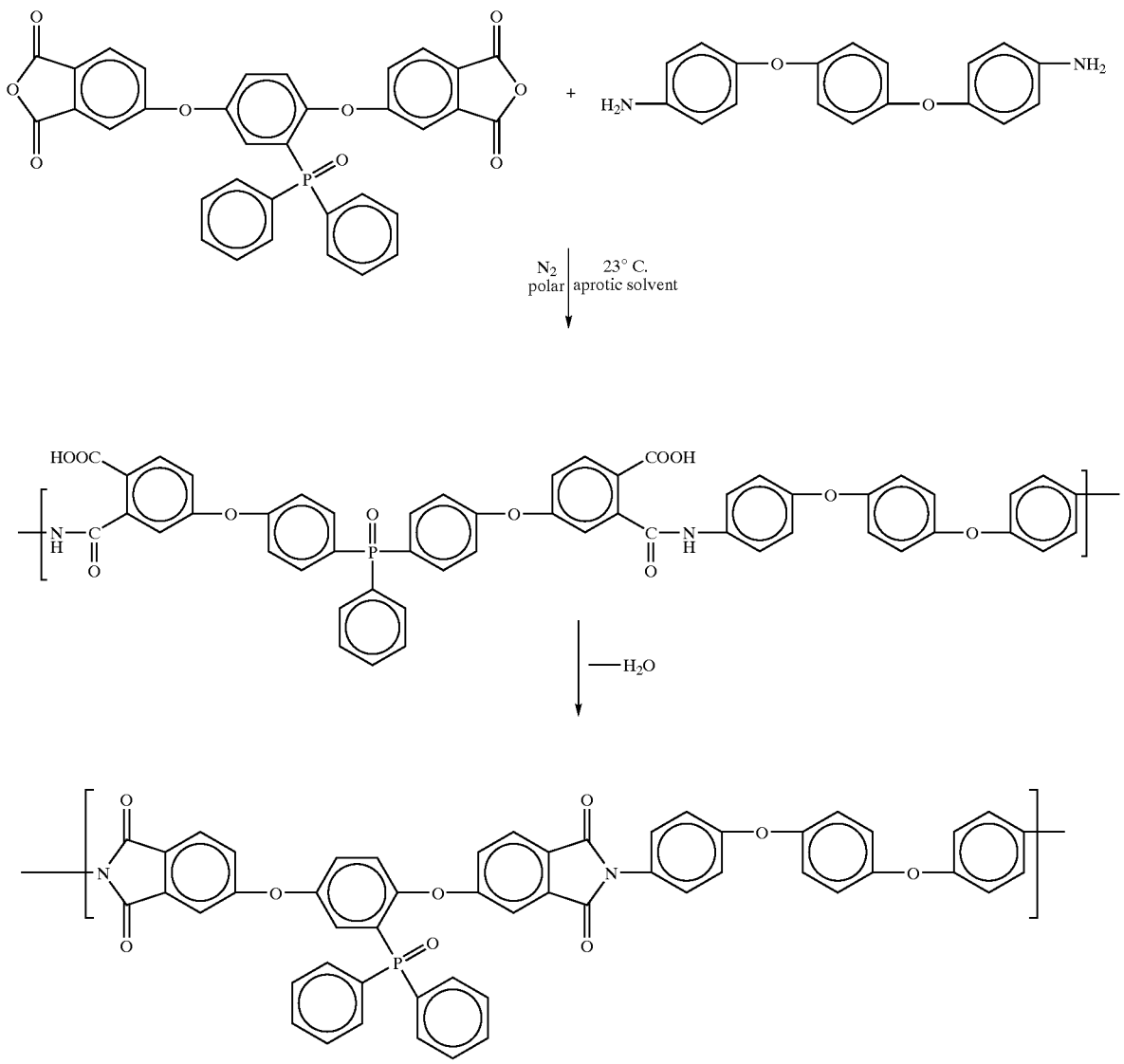

Example 42

Preparation of Polyimide from 4,4'-(2,5-diphenylphosphineoxidephenylenedioxy)diphthalic anhydride and 1,3-bis(4-aminophenoxy)benzene Using 1:1 Stoichiometry

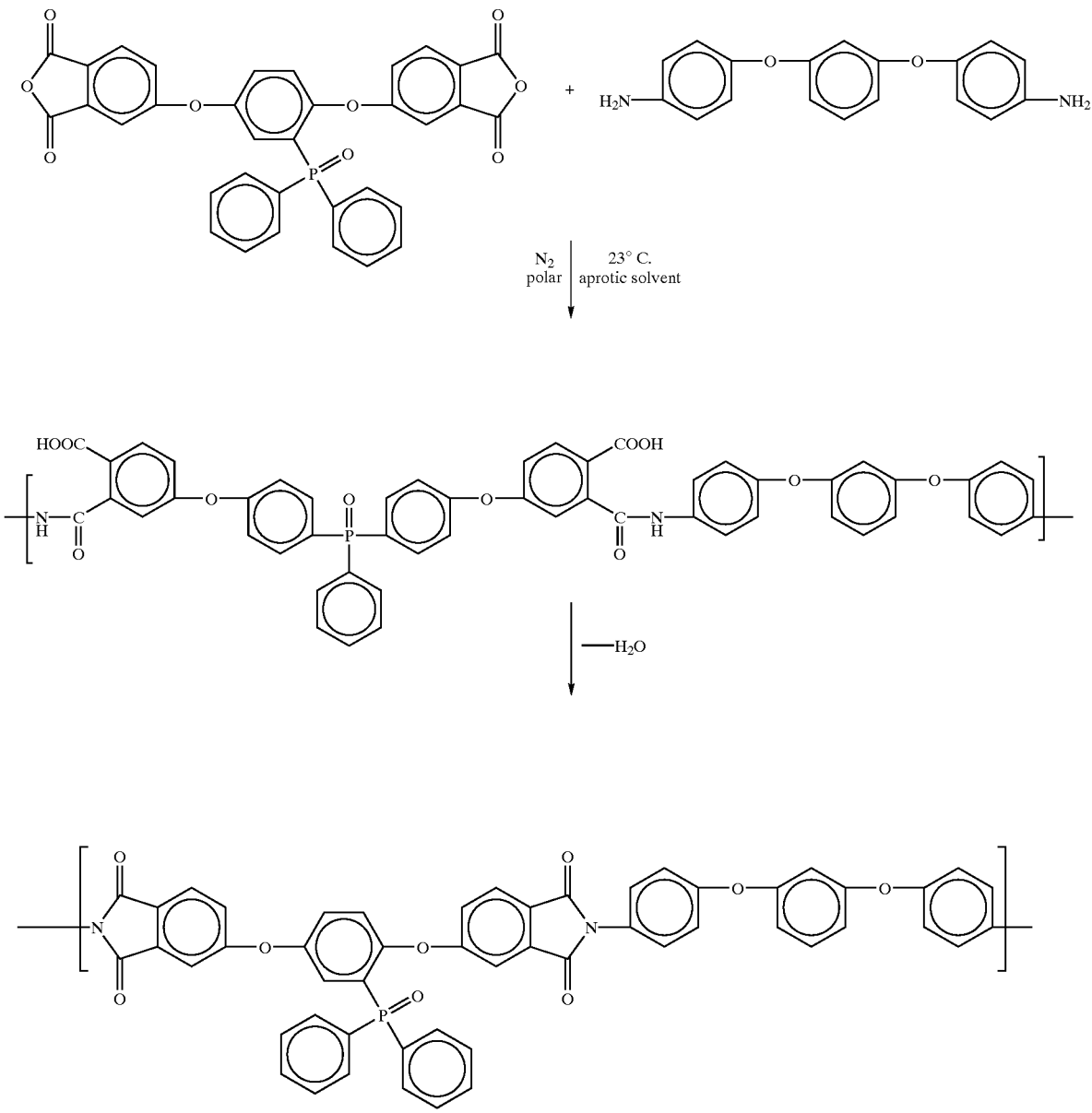

Into a 100 mL three neck round bottom flask equipped with a mechanical stirrer, nitrogen gas inlet, and drying tube filled with calcium sulfate was placed 1,3-bis(4-aminophenoxy)benzene (1.0145 g, 0.0035 mol), 4,4'-(2,5-diphenylphosphineoxidephenylenedioxy)diphthalic anhydride (2.0909 g, 0.0035 mol), and 12.5 mL of DMAc to give a solution with a concentration of 20% solids. The resulting clear solution was stirred overnight at room temperature under a nitrogen atmosphere. A 0.5% (w/v) solution in DMAc exhibited an inherent viscosity of 0.49 dL/g at 25° C. The remaining polymer solution was cast upon a clean glass plate, which was dried to a tack free state in a low humidity chamber. The film was placed in a forced air oven for 30 minutes each at 50, 100, and 150° C. and one hour each at 175, 200, 250, and 300° C. The transparent yellow film was subsequently removed from the glass. The film exhibited good flexibility and a $T_g$ of 207° C. as determined by DSC at a heating rate of 20° C./min.

Example 43

Preparation of Polyimide from 4,4'-(2,5-diphenylphosphineoxidephenylenedioxy)diphthalic anhydride and 1,3-bis(3-aminophenoxy)benzene Using 1:1 Stoichiometry

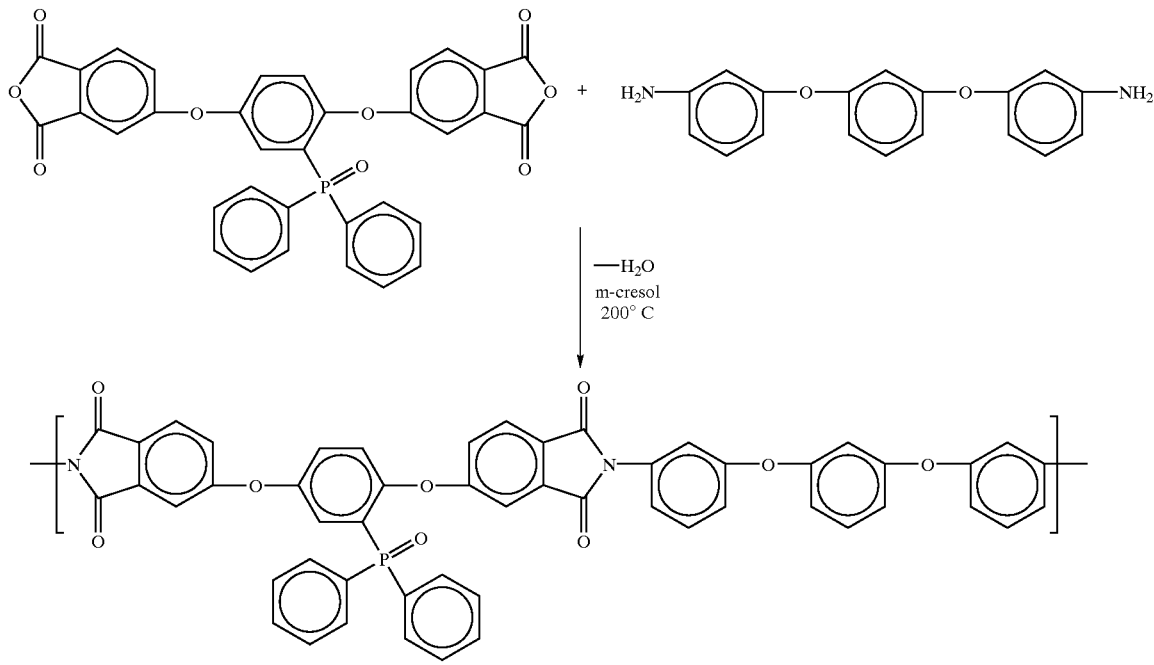

Into a 100 mL three neck round bottom flask equipped with a mechanical stirrer, nitrogen gas inlet, and condenser was placed 1,3-bis(3-aminophenoxy)benzene (0.7294 g, 0.0025 mol), 4,4'-(2,5-diphenylphosphineoxidephenylenedioxy) diphthalic anhydride (1.5033 g, 0.0025 mol), and 8.5 mL of m-cresol. The mixture was heated to 190° C. with an oil bath to give a solution with a concentration of 20% solids. The reaction was stirrer at 190° C. under nitrogen for 14 hours. The reaction was cooled and 10 mL of DMAc was added to dilute the viscous yellow solution, and the resulting mixture was precipitated into methanol. The white fibrous solid was collected, stirred in 300 mL of refluxing methanol twice, and stirred in 300 mL of refluxing water for 30 minutes. The solid was collected and dried for 2 hours at 150° C. in a vacuum oven (1.94 g, 90% yield). A 0.5% (w/v) solution in DMAc exhibited an inherent viscosity of 0.53 dL/g at 25° C. The remaining solid was used to cast a film from a 20% solids solution in DMAc on to plate glass. The film was dried overnight in a low humidity chamber and then was heated in a forced air oven for one hour each at 50, 100, 150, 175, and 200° C. The transparent colorless film was subsequently removed from the glass. The film exhibited good flexibility and a $T_g$ of 182° C. as determined by DSC at a heating rate of 20° C./min.

Example 44

Preparation of Polyimide from 4,4'-(2,5-diphenylphosphineoxidephenylenedioxy)diphthalic anhydride and [2,4-bis(3-aminophenoxy)phenyl] diphenylphosphine oxide Using 1:1 Stoichiometry

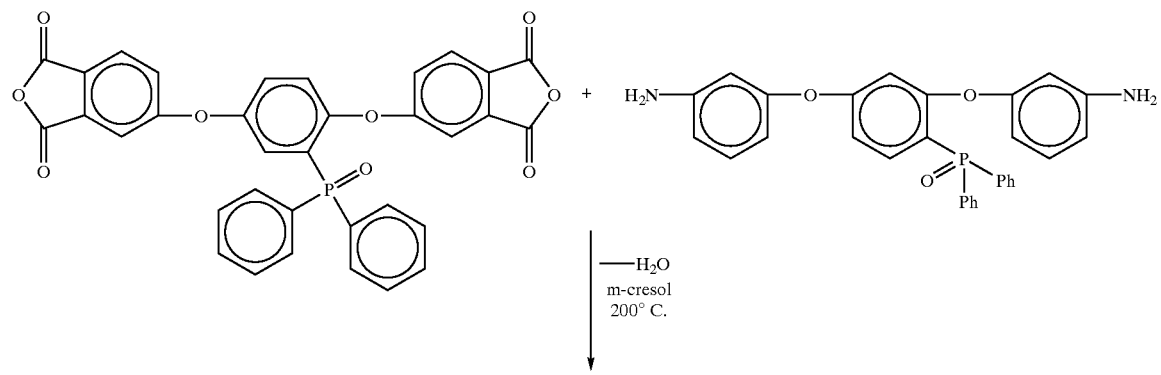

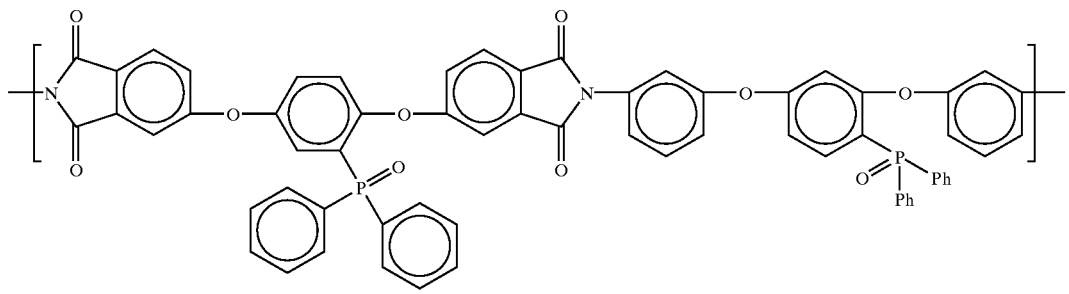

Into a 100 mL three neck round bottom flask equipped with a mechanical stirrer, nitrogen gas inlet, and condenser was placed [2,4-bis(3-aminophenoxy)phenyl]diphenylphosphine oxide (1.3148 g, 0.0027 mol), 4,4'-(2,5-diphenylphosphineoxidephenylenedioxy)diphthalic anhydride (1.6080 g, 0.0027 mol), and 10 mL of m-cresol. The mixture was heated to 200° C. with an oil bath to give a solution with a concentration of 22% solids. The reaction was stirrer at 200° C. under nitrogen for 14 hours. The reaction was cooled and 10 mL of DMAc was added to dilute the viscous yellow solution, and the resulting mixture was precipitated into methanol. The white fibrous solid was collected, stirred in 400 mL of refluxing methanol twice, and stirred in 500 mL of refluxing water for an hour. The solid was taken up in 13 mL of DMAc and the resulting solution was precipitated into water. The white fibrous precipitate was collected and dried for 6 hours at 125° C. in a vacuum oven (2.63 g, 94% yield). A 0.5% (w/v) solution in DMAc exhibited an inherent viscosity of 0.55 dL/g at 25° C. A solution of 2.13 g polymer in 9 mL of DMAc was cast onto plate glass. The film was dried overnight in a low humidity chamber and then was heated in a forced air oven for one hour each at 50, 100, 150, 175, 200 and 220° C. The transparent colorless film was subsequently removed from the glass. The film exhibited good flexibility and a $T_g$ of 203° C. as determined by DSC at a heating rate of 20° C./min.

Example 45

Preparation of a poly(amide acid) Solution and Polyimide Film from [2,4-bis(3-aminophenoxy)phenyl]-diphenylphosphine oxide and Oxydiphthalic Dianhydride Endcapped with Phthalic Anhydride with a Calculated Molecular Weight of 20,000 grams/mole

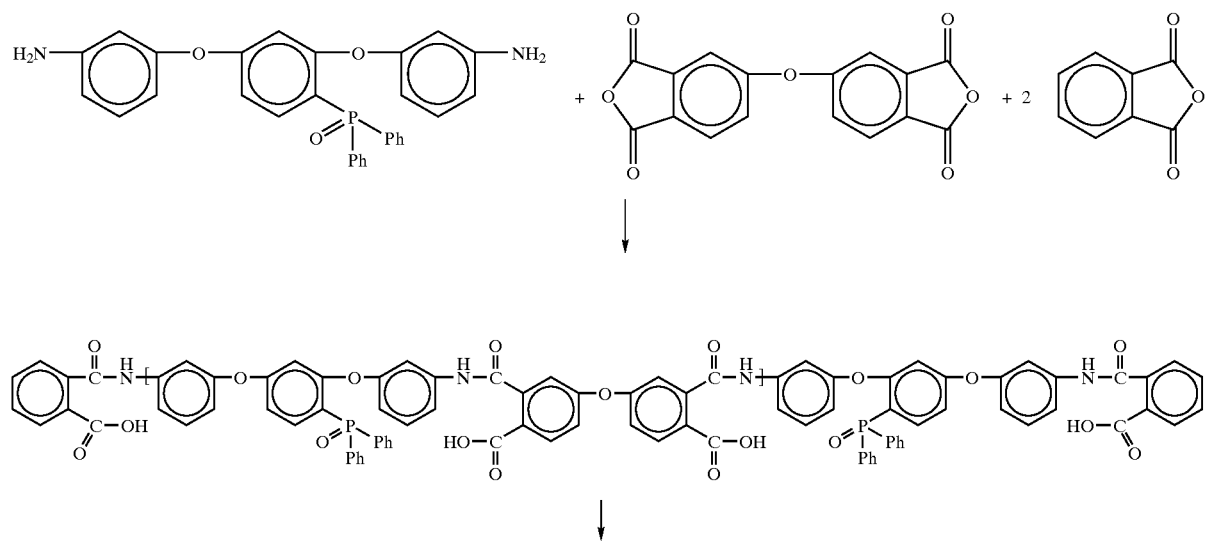

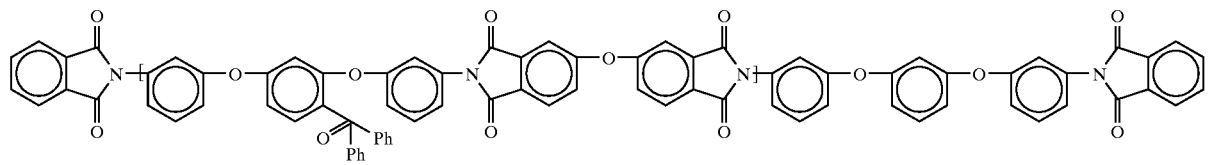

Into a 100 mL three neck round bottom flask equipped with a mechanical stirrer, nitrogen gas inlet and drying tube filled with calcium sulfate was [2,4-bis(3-aminophenoxy)phenyl]diphenylphosphine oxide (3.0697 g, 6.2328×10$^{-3}$ mole) and N,N-dimethylacetamide (10.0 g). The diamine dissolved within a few minutes and oxydiphthalic dianhydride powder (1.8608 g, 5.9984×10$^{-3}$ mole) was added followed by phthalic anhydride (0.0695 g, 4.6888×10$^{-4}$ mole) along with additional N,N-dimethylacetamide (10 g) to give a solution with a concentration of 20% solids weight/weight. The light yellow solution was stirred overnight at room temperature under a nitrogen atmosphere. A 0.5% solution in N,N-dimethylacetamide exhibited an inherent viscosity of 0.39 dL/g at 25° C. A thin film was cast at 15 mils thick onto plate glass using a doctor blade and allowed to dry to a tack-free state in a dust free chamber. The film on plate glass was stage dried in a forced air oven for 1 hour each at 100, 200 and 250° C. The brittle yellow film exhibited a $T_g$ of 196° C.

Example 46

Preparation of a poly(amide acid) Solution and a Polyimide Film from [2,4-bis(3-aminophenoxy)phenyl]-diphenylphosphine oxide and Oxydiphthalic Dianhydride Endcapped with Phenylethynylphthalic Anhydride with an Estimated Molecular Weight of 5,000 grams/mole

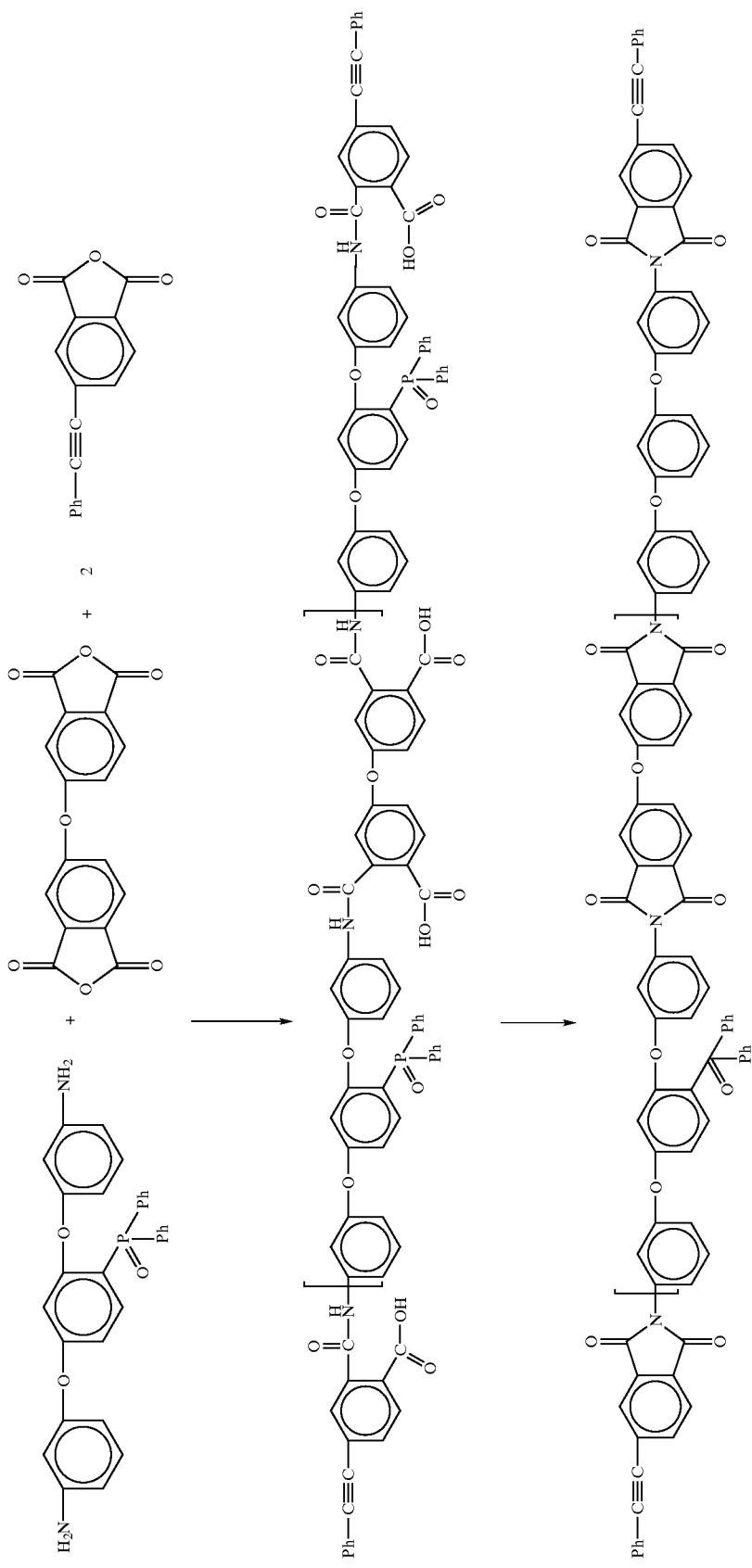

Into a 100 mL three neck round bottom flask equipped with a mechanical stirrer, nitrogen gas inlet and drying tube filled with calcium sulfate was [2,4-bis(3-aminophenoxy)phenyl]diphenylphosphine oxide (2.9894 g, 6.0698×10$^{-3}$ mole) and N,N-dimethylacetamide (7.0 g). The diamine dissolved within a few minutes and oxydiphthalic dianhydride powder (1.6148 g, 5.2053×10$^{-3}$ mole) was added followed by phenylethynylphthalic anhydride (0.4292 g, 1.7289×10$^{-3}$ mole) along with additional N,N-dimethylacetamide (6.74 g) to give a solution with a concentration of 30% solids weight/weight. The light yellow solution was stirred overnight at room temperature under a nitrogen atmosphere. A 0.5% solution in N,N-dimethylacetamide exhibited an inherent viscosity of 0.21 dL/g at 25° C. A thin film was cast at 15 mils thick onto plate glass using a doctor blade. The film on plate glass was stage dried in a forced air oven for 1 hour each at 100, 200, 300 and 371° C. The brittle dark film exhibited a T$_g$ 190° C.

The invention described herein produces polyimides and copolyimides with a unique combination of properties that make these materials particularly useful for a variety of applications on spacecraft. It pertains to the synthesis of diamines and dianhydrides that are subsequently used to prepare polyimides and copolyimides that exhibit low color, low solar absorptivity, high optical transparency, atomic oxygen resistance, VUV and UV resistance, solubility in organic solvents in the imide form, high T$_g$s, and high thermal stability. This combination of properties in aromatic polyimides or copolyimides is unprecedented.

We claim:

1. Poly(amide acid)s comprising the general structural formula:

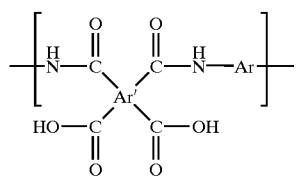

wherein Ar is a member selected from the group consisting of:

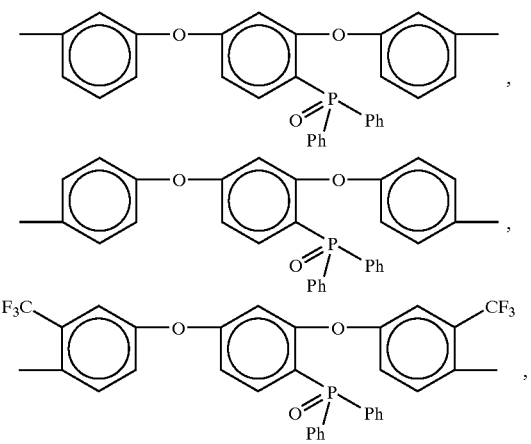

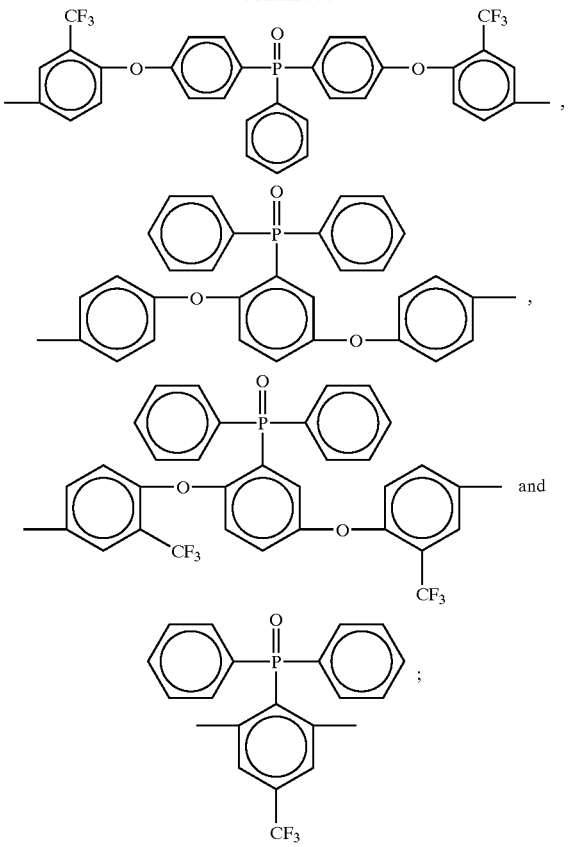

wherein Ar' is selected from the group consisting of:

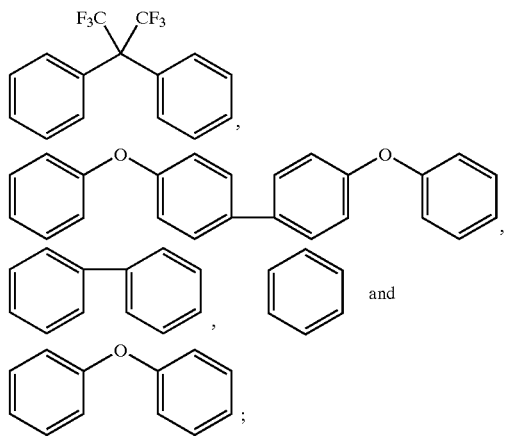

wherein Ph is phenyl, and wherein the number average molecular weight approximately ranges from 700 g/mole to 100,000 g/mole.

2. The poly(amide acid)s of claim 1, wherein said poly(amide acid)s are endcapped with a member selected from the group consisting of an optionally substituted monofunctional amine and an optionally substituted monofunctional anhydride compound.

* * * * *